(12) United States Patent
Devoe et al.

(10) Patent No.: US 9,859,582 B2
(45) Date of Patent: Jan. 2, 2018

(54) SOLID OXIDE FUEL CELL DEVICE AND SYSTEM

(71) Applicants: Alan Devoe, La Jolla, CA (US); Lambert Devoe, San Diego, CA (US)

(72) Inventors: Alan Devoe, La Jolla, CA (US); Lambert Devoe, San Diego, CA (US)

(*) Notice: Subject to any disclaimer, the term of this patent is extended or adjusted under 35 U.S.C. 154(b) by 346 days.

(21) Appl. No.: 14/595,453

(22) Filed: Jan. 13, 2015

(65) Prior Publication Data

US 2015/0194689 A1    Jul. 9, 2015

Related U.S. Application Data

(63) Continuation of application No. 13/617,087, filed on Sep. 14, 2012, now Pat. No. 8,932,776, which is a
(Continued)

(51) Int. Cl.
*H01M 8/10* (2016.01)
*H01M 8/1004* (2016.01)
(Continued)

(52) U.S. Cl.
CPC ....... *H01M 8/1004* (2013.01); *H01M 8/0258* (2013.01); *H01M 8/0267* (2013.01);
(Continued)

(58) Field of Classification Search
CPC ............. H01M 8/0297; H01M 8/1286; H01M 8/2425; H01M 8/243; H01M 8/2435;
(Continued)

(56) References Cited

U.S. PATENT DOCUMENTS 3,120,456 A    2/1964    Broers
3,446,672 A    5/1969    Giner
(Continued)

FOREIGN PATENT DOCUMENTS

DE    19624887 A1    1/1997
DE    10117985       10/2002
(Continued)

OTHER PUBLICATIONS

Fuel Cell Energy, Timeline, www.fce.com/site/products/sofc/timeline1.html and www.fce.com/site/products/sofc/timeline2.html, 4 pp., printed Aug. 28, 2005.
(Continued)

*Primary Examiner* — Mark F Huff
*Assistant Examiner* — Monique Wills
(74) *Attorney, Agent, or Firm* — Wood Herron & Evans LLP

(57) ABSTRACT

The invention provides tubular solid oxide fuel cell devices and a fuel cell system incorporating a plurality of the fuel devices, each device including an elongate tube having a reaction zone for heating to an operating reaction temperature, and at least one cold zone that remains at a low temperature below the operating reaction temperature when the reaction zone is heated. An electrolyte is disposed between anodes and cathodes in the reaction zone, and the anode and cathode each have an electrical pathway extending to an exterior surface in a cold zone for electrical connection at low temperature. In one embodiment, the tubular device is a spiral rolled structure, and in another embodiment, the tubular device is a concentrically arranged device. The system further includes the devices positioned with their reaction zones in a hot zone chamber and their cold zones extending outside the hot zone chamber. A heat source is coupled to the hot zone chamber to heat the reaction zones to the operating reaction temperature, and fuel and air supplies are coupled to the tubes in the cold zones.

17 Claims, 45 Drawing Sheets

Related U.S. Application Data continuation of application No. 11/747,066, filed on May 10, 2007, now Pat. No. 8,293,415, which is a continuation of application No. 11/557,894, filed on Nov. 8, 2006, now Pat. No. 7,981,565, and a continuation of application No. 11/557,901, filed on Nov. 8, 2006, now Pat. No. 7,842,429, and a continuation of application No. 11/557,935, filed on Nov. 8, 2006, now Pat. No. 7,838,137, and a continuation of application No. 11/557,934, filed on Nov. 8, 2006, now Pat. No. 7,883,816.

(60) Provisional application No. 60/747,013, filed on May 11, 2006.

(51) Int. Cl.
| | |
|---|---|
| *H01M 8/0258* | (2016.01) |
| *H01M 8/0267* | (2016.01) |
| *H01M 8/241* | (2016.01) |
| *H01M 8/0297* | (2016.01) |
| *H01M 8/1286* | (2016.01) |
| *H01M 8/2425* | (2016.01) |
| *H01M 8/2485* | (2016.01) |
| *H01M 8/04007* | (2016.01) |
| *H01M 8/04082* | (2016.01) |
| *H01M 8/1246* | (2016.01) |
| *H01M 8/243* | (2016.01) |
| *H01M 8/2435* | (2016.01) |
| *H01M 8/124* | (2016.01) |

(52) U.S. Cl.
CPC ..... *H01M 8/0297* (2013.01); *H01M 8/04007* (2013.01); *H01M 8/04201* (2013.01); *H01M 8/1246* (2013.01); *H01M 8/1286* (2013.01); *H01M 8/241* (2013.01); *H01M 8/2425* (2013.01); *H01M 8/2485* (2013.01); *H01M 8/243* (2013.01); *H01M 8/2435* (2013.01); *H01M 2008/1293* (2013.01); *Y02E 60/521* (2013.01); *Y02E 60/525* (2013.01)

(58) Field of Classification Search
CPC ........... H01M 8/1246; H01M 8/04007; H01M 8/04201; H01M 8/1004; H01M 2008/1293; Y02E 60/521; Y02E 60/525
See application file for complete search history.

(56) References Cited

U.S. PATENT DOCUMENTS

| | | | |
|---|---|---|---|
| 4,395,468 A | 7/1983 | Isenberg | |
| 4,413,041 A | 11/1983 | Hegedus | |
| 4,414,337 A | 11/1983 | Ichikawa et al. | |
| 4,463,687 A | 8/1984 | Zimmerman et al. | |
| 4,490,444 A | 12/1984 | Isenberg | |
| 4,591,470 A | 5/1986 | Goto et al. | |
| 4,808,491 A | 2/1989 | Reichner | |
| 4,876,163 A | 10/1989 | Reichner | |
| 4,894,297 A * | 1/1990 | Singh | H01M 4/8621 429/468 |
| 4,913,982 A | 4/1990 | Kotchick et al. | |
| 4,943,494 A | 7/1990 | Riley | |
| 5,034,288 A | 7/1991 | Bossel | |
| 5,185,219 A | 2/1993 | Ishihara et al. | |
| 5,317,805 A | 6/1994 | Hoopman et al. | |
| 5,330,859 A | 7/1994 | McPheeters et al. | |
| 5,356,728 A | 10/1994 | Balachandran et al. | |
| 5,380,601 A | 1/1995 | Jaspers et al. | |
| 5,770,326 A | 6/1998 | Limaye | |
| 5,827,620 A | 10/1998 | Kendall | |
| 5,864,743 A | 1/1999 | Tuchinskiy et al. | |
| 6,007,932 A | 12/1999 | Steyn | |
| 6,025,084 A | 2/2000 | Kawasaki et al. | |
| 6,291,089 B1 | 9/2001 | Piascik et al. | |
| 6,444,339 B1 | 9/2002 | Eshraghi | |
| 6,458,477 B1 | 10/2002 | Hsu | |
| 6,767,662 B2 | 7/2004 | Jacobson et al. | |
| 6,841,284 B2 | 1/2005 | Brown et al. | |
| 6,846,511 B2 | 1/2005 | Visco et al. | |
| 6,949,307 B2 | 9/2005 | Cable et al. | |
| 7,838,137 B2 | 11/2010 | Devoe et al. | |
| 7,842,429 B2 | 11/2010 | Devoe et al. | |
| 7,883,816 B2 | 2/2011 | Devoe et al. | |
| 7,981,565 B2 | 7/2011 | Devoe et al. | |
| 7,989,113 B2 | 8/2011 | Matsuzaki et al. | |
| 8,029,937 B2 | 10/2011 | Devoe et al. | |
| 8,153,318 B2 | 4/2012 | Devoe et al. | |
| 8,227,128 B2 | 7/2012 | Devoe et al. | |
| 8,257,884 B2 | 9/2012 | Devoe et al. | |
| 8,278,013 B2 | 10/2012 | Devoe et al. | |
| 8,293,415 B2 | 10/2012 | Devoe et al. | |
| 8,293,417 B2 | 10/2012 | Devoe et al. | |
| 8,293,429 B2 | 10/2012 | Devoe et al. | |
| 8,309,266 B2 | 11/2012 | Devoe et al. | |
| 2001/0044043 A1 | 11/2001 | Badding et al. | |
| 2002/0018924 A1 | 2/2002 | Saito et al. | |
| 2002/0102450 A1 | 8/2002 | Badding et al. | |
| 2002/0146523 A1 | 10/2002 | Devoe et al. | |
| 2002/0146611 A1 | 10/2002 | Kawasaki et al. | |
| 2002/0197520 A1 | 12/2002 | Quick et al. | |
| 2003/0013046 A1 | 1/2003 | Fonash et al. | |
| 2003/0235738 A1 | 12/2003 | Zheng | |
| 2003/0235745 A1 | 12/2003 | Mook et al. | |
| 2004/0020781 A1 | 2/2004 | Dordi et al. | |
| 2004/0020782 A1 | 2/2004 | Cohen et al. | |
| 2004/0067404 A1 | 4/2004 | Lazaroff et al. | |
| 2004/0072054 A1 | 4/2004 | Cochran et al. | |
| 2004/0081878 A1 | 4/2004 | Mardilovich et al. | |
| 2004/0086767 A1 | 5/2004 | Lazaroff et al. | |
| 2004/0110054 A1 | 6/2004 | Bourgeois et al. | |
| 2004/0183055 A1 | 9/2004 | Chartier et al. | |
| 2004/0185318 A1 | 9/2004 | Novak | |
| 2004/0185321 A1 | 9/2004 | Sutherland et al. | |
| 2004/0247972 A1 | 12/2004 | Kendall et al. | |
| 2004/0258972 A1 | 12/2004 | Du et al. | |
| 2005/0000621 A1 | 1/2005 | Devoe et al. | |
| 2005/0042490 A1 | 2/2005 | Finnerty et al. | |
| 2005/0116190 A1 | 6/2005 | Adams et al. | |
| 2005/0208363 A1 | 9/2005 | Taylor et al. | |
| 2005/0221132 A1 | 10/2005 | Hirai et al. | |
| 2006/0003213 A1 | 1/2006 | Ketcham et al. | |
| 2006/0035130 A1 | 2/2006 | Noda et al. | |
| 2006/0147778 A1 | 7/2006 | Matsuzaki et al. | |
| 2006/0175194 A1 | 8/2006 | Bagby et al. | |
| 2006/0246337 A1 | 11/2006 | Sarkar et al. | |
| 2006/0263665 A1 | 11/2006 | Schaevitz et al. | |
| 2007/0104991 A1 | 5/2007 | Devoe et al. | |
| 2007/0105003 A1 | 5/2007 | Devoe et al. | |
| 2007/0141424 A1 * | 6/2007 | Armstrong | H01M 8/0252 429/457 |
| 2007/0243445 A1 | 10/2007 | Digiuseppe | |
| 2007/0264542 A1 | 11/2007 | Devoe et al. | |
| 2008/0171237 A1 * | 7/2008 | Devoe | H01M 8/0297 429/434 |
| 2008/0233462 A1 | 9/2008 | Curello et al. | |
| 2008/0289180 A1 | 11/2008 | Brantley et al. | |
| 2009/0123810 A1 | 5/2009 | Devoe et al. | |
| 2009/0226781 A1 | 9/2009 | Devoe et al. | |
| 2011/0045386 A1 | 2/2011 | Cable et al. | |
| 2011/0117471 A1 | 5/2011 | Devoe et al. | |
| 2011/0200910 A1 | 8/2011 | Wachsman et al. | |

FOREIGN PATENT DOCUMENTS

| | | |
|---|---|---|
| EP | 0321069 | 6/1989 |
| EP | 0387643 | 9/1990 |
| EP | 0442742 | 8/1991 |
| EP | 0756347 | 1/1997 |
| EP | 1333519 | 8/2003 |
| EP | 1445817 | 8/2004 |

(56) References Cited

FOREIGN PATENT DOCUMENTS

| | | |
|---|---|---|
| EP | 1447871 A1 | 8/2004 |
| EP | 1612876 | 1/2006 |
| EP | 1650821 | 4/2006 |
| FR | 2877496 | 5/2006 |
| JP | 01320778 | 12/1989 |
| JP | 02075167 | 3/1990 |
| JP | 08050914 | 2/1996 |
| JP | 08507896 | 8/1996 |
| JP | 10189017 | 7/1998 |
| JP | 2000164239 | 6/2000 |
| JP | 2002151100 A | 5/2002 |
| JP | 2002151101 A | 5/2002 |
| JP | 2002184429 A | 6/2002 |
| JP | 2004030972 | 1/2004 |
| JP | 2004134323 | 4/2004 |
| JP | 2004152645 | 5/2004 |
| JP | 2005518645 A | 6/2005 |
| WO | 9422178 | 9/1994 |
| WO | 0124300 A1 | 4/2001 |
| WO | 0225763 | 3/2002 |
| WO | 0229917 A1 | 4/2002 |
| WO | 03001624 | 1/2003 |
| WO | 03005462 | 1/2003 |
| WO | 03036746 | 5/2003 |
| WO | 03071624 A2 | 8/2003 |
| WO | 03/081703 A2 | 10/2003 |
| WO | 03096469 | 11/2003 |
| WO | 2004082050 | 9/2004 |
| WO | 2006048573 | 5/2006 |
| WO | 2007005767 | 1/2007 |
| WO | 2007056518 | 5/2007 |
| WO | 2007134209 | 11/2007 |
| WO | 2008141171 A2 | 11/2008 |
| WO | 2009062127 | 5/2009 |
| WO | 2009111771 A1 | 9/2009 |

OTHER PUBLICATIONS

Fuelcell Energy, Inc. et al., Thermally Integrated High Power Density SOFC Generator, SECA Annual Meeting, Pacific Grove, CA, Apr. 18-21, 2005, 42 pp., Distributed Energy Corporation.
Vora, S.D., SECA Program at Siemens Westinghouse, Sixth Annual SECA Workshop, Pacific Grove, CA, Apr. 18, 2005, 44 pp., Siemens Westinghouse Power Corporation.
Acumentrics Corporation, How Acumentrics Fuel Cells Work, 2004, 12 pp.
Vora, Shailesh D., Small-Scale Low-Cost Solid Oxide Fuel Cell Power Systems, Office of Fossil Energy Fuel Cell Program, FY 2004 Annual Report, pp. 33-35.
Zurich University of Applied Sciences, Hexis Co-Generation System, Nov. 8-9, 2004, 2 pp., Berlin.
Subhash C. Singhal et al., High Temperature Solid Oxide Fuel Cells: Fundamentals, Design and Applications, Chapter 1, Introduction to SOFCs, 2003, pp. 1-22.
Subhash C. Singhal et al., High Temperature Solid Oxide Fuel Cells: Fundamentals, Design and Applications, Chapter 2, History, 2003, pp. 23-51.
Subhash C. Singhal et al., High Temperature Solid Oxide Fuel Cells: Fundamentals, Design and Applications, Chapter 8, Cell and Stack Designs, 2003, pp. 197-228.
Nissan Motor Co Ltd, English translation of Patent Abstract of Japan Publication No. 2004-134323 entitled Solid Oxide Fuel Cell, published Apr. 30, 2004, 2 pp.
Siemens, Siemens Power Generation: Next Generation SOFC, www.powergeneration.siemens.com/en/fuelcells/seca/index.cfm?session=1142501x39517655, 2 pp. <http://www.powergeneration.siemens.com/en/fuelcells/seca/index.cfm?session=1142501x39517655>, 2007.
SOFCo-EFS Fuel Cell and Fuel Processor Solutions, Solid Oxide Fuel Cell Technology and SOFCo-EFS, www.sofco-efs.com/technology/sofctech/, 2 pp. <http://www.sofco-efs.com/technology/sofctech/>, printed Aug. 28, 2005.
Ben Wiens Energy Science, Solid Oxide Fuel Cell (SOFC), The Future of Fuel Cells, www.benwiens.com/energy4.html, 2 pp. <http://www.benwiens.com/energy4.html>, printed Aug. 28, 2005.
Ceramic Fuel Cells Limited, CFCLs Stack Design, www.cfcl.com.au/html/p_stack_design.htm, 3 pp. <http://www.cfcl.com.au/html/p_stack_design.htm>, printed Aug. 28, 2005.
Miwa, Taiichiro et al., Japan-Finland Cooperation in Technological Research & Development: R& D Status of Fuel Cell in Japan, Jun. 15, 2005, 19 pp., DIA Research Martech Inc., Espoo, Finland.
Norrick, Dan, 10kWe SOFC Power System Commercialization Program Progress, SECA Annual Workshop, Pacific Grove, CA, Apr. 20, 2005, 67 pp., Cummins Power Generation.
Shaffer, Steven, Development Update on Delphi's Solid Oxide Fuel Cell System, 2005 SECA Review Meeting, Pacific Grove, CA, Apr. 20, 2005, 41 pp., Delphi.
GE Hybrid Power Generation Systems, SECA Solid Oxide Fuel Cell Program, Sixth SECA Annual Workshop, Pacific Grove, CA, Apr. 18-21, 2005, 28 pp., GE Energy.
Tokyo Gas Co., Ltd, Environmental Affairs Dept, Environmental Report 2004, Environmental Technology Development, Measures Taken Within the Tokyo Gas Group, pp. 28-29, Tokyo, Japan.
Bessette, Norman, Status of the Acumentrics SOFC Program, SEC Annual Workshop, Boston, MA, May 11, 2004, 47 pp., Acumentrics Corporation.
Kyocera Corporation, 1kW Solid Oxide Fuel Cell (SOFC) for Small-Scale Power Generation: Worlds Highest Efficiency for 1kW Class Power Generation, News Release, http://global.kyocera.com/news/2003/1205.html, Dec. 18, 2003, 4 pp. <http://global.kyocera.com/news/2003/1205.html>.
Talbot, David, Flying the Efficient Skies, Technology Review, www.technologyreview.com/articles/03/06innovation80603.0.asp, Jun. 2003, 1 pp.
De Guire, Eileen J., Solid Oxide Fuel Cells, Internet article, www.csa.com/hottopics/fuecel/overview.php, CSA Illumina, Apr. 2003, 8 pp. <http://www.csa.com/hottopics/fuecel/overview.php>.
Lawrence Livermore National Laboratory, Solid-Oxide Fuel Cells Stack Up to Efficient, Clean Power, S&TR, Research Highlights, Sep. 2002, 3 pp.
NGK Insulators, Ltd, Machine Translation of JP Patent Publication JP2002-184429, 15 pp.
NGK Insulators, Ltd. Translation of Japanese Patent Application Publication JP2002-151100, 7 pp.
NGK Insulators, Ltd, Translation of Japanese Patent Application Publication JP2002-151101, 10 pp.
Patent Office of India, First Examination Report issued in counterpart Indian Patent Application No. 9118/DELNP/2008, dated Sep. 2, 2016, 9 pp.

\* cited by examiner

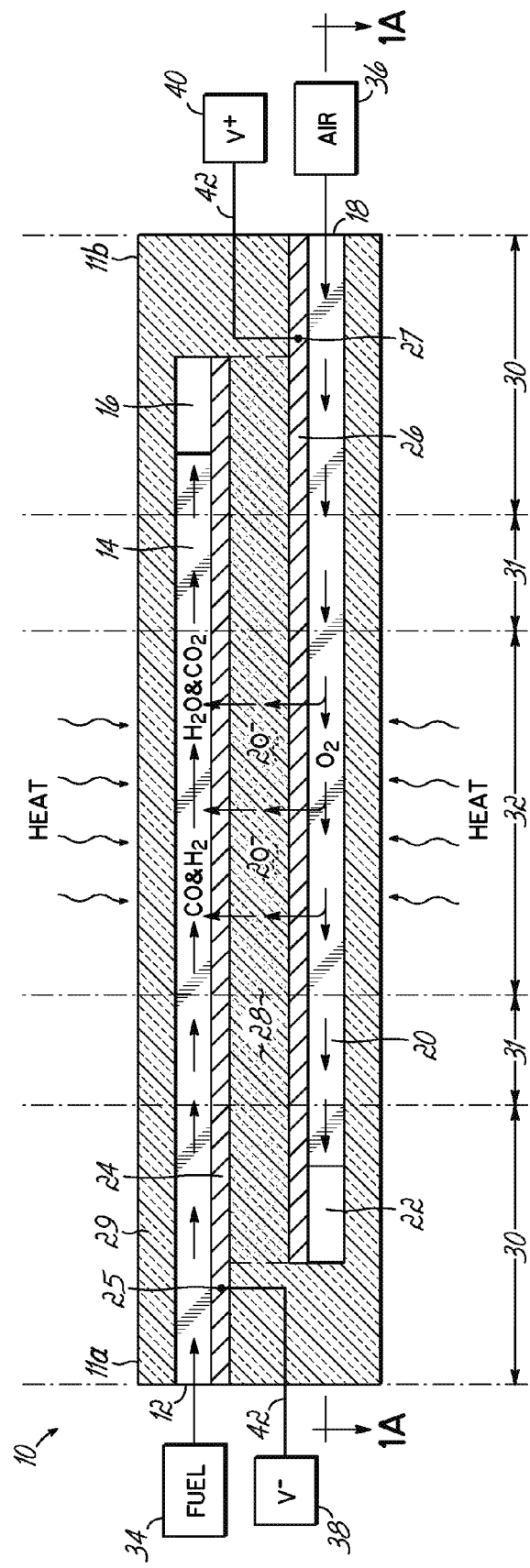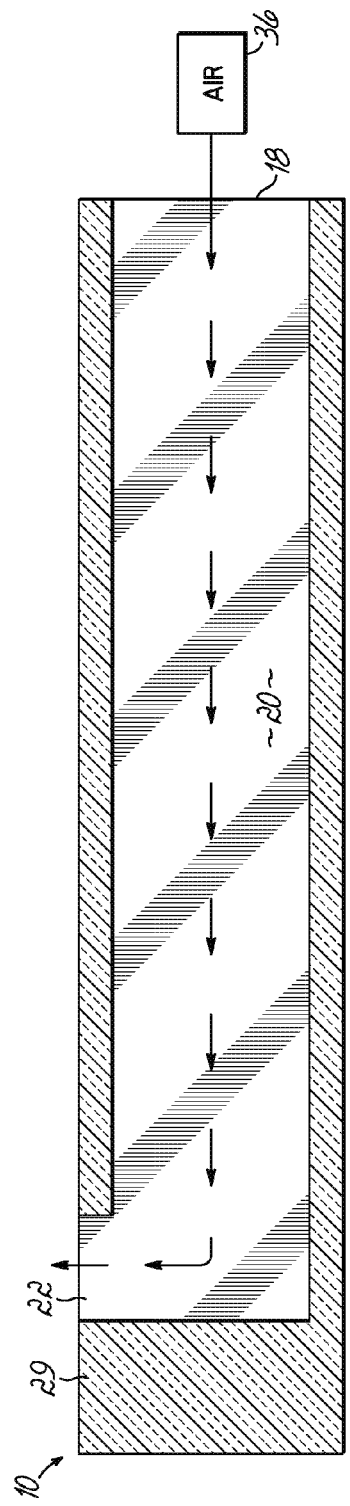
FIG. 1
FIG. 1A

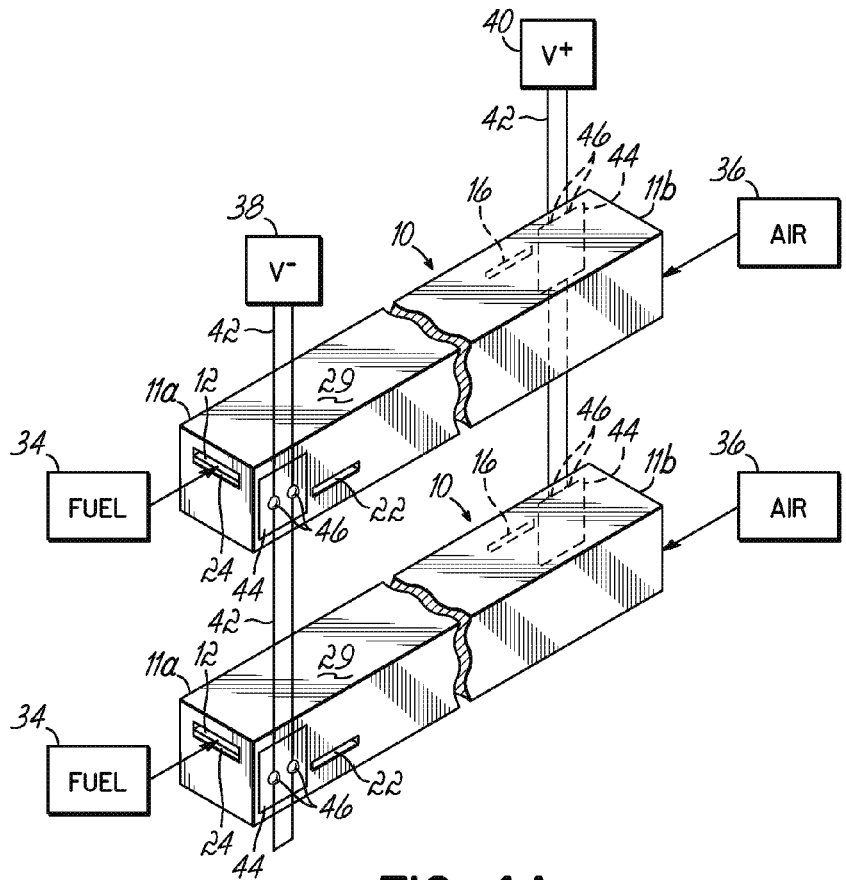
FIG. 4A
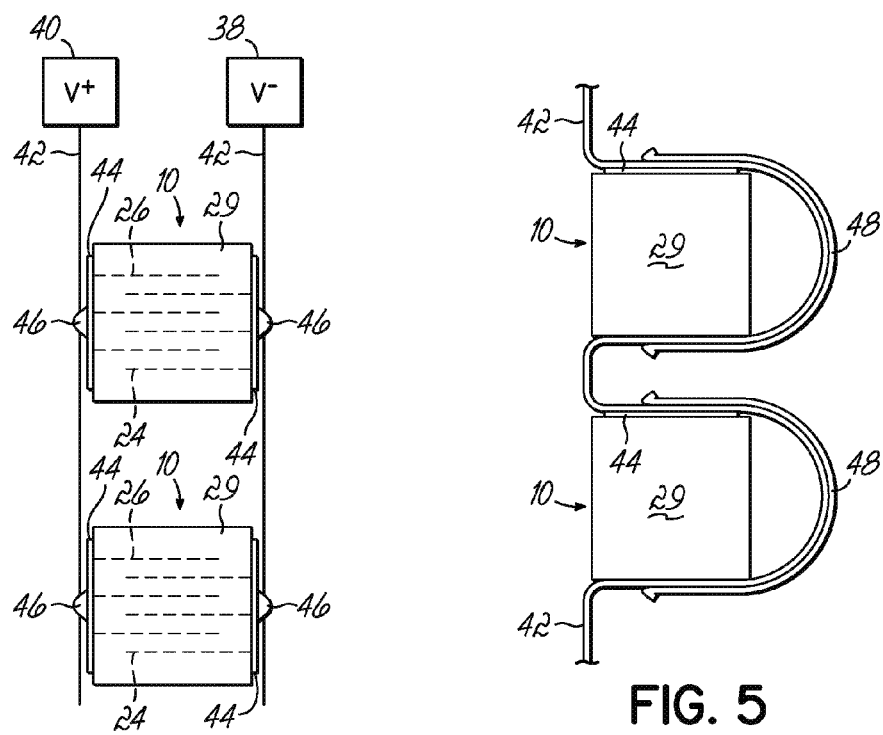
FIG. 4B
FIG. 5

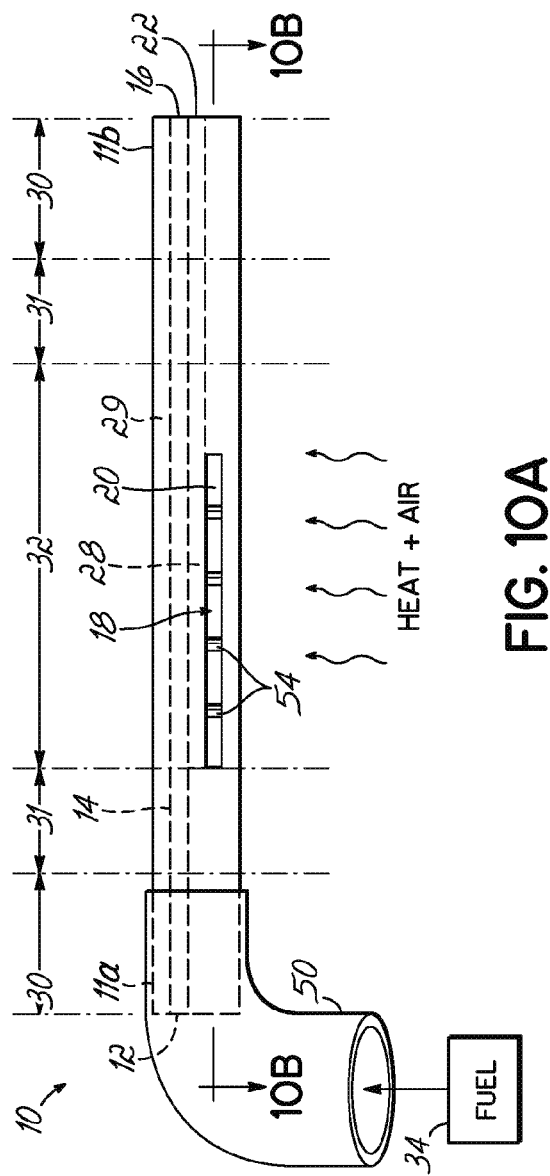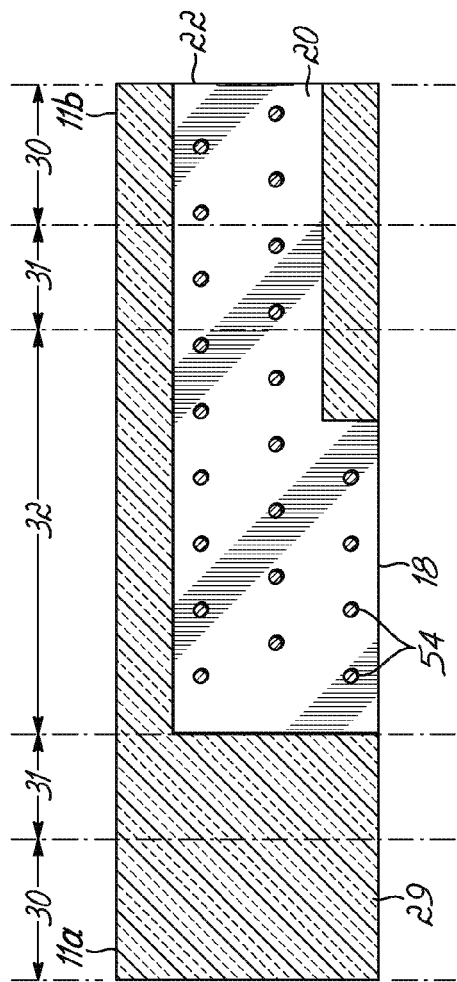
FIG. 10A
FIG. 10B

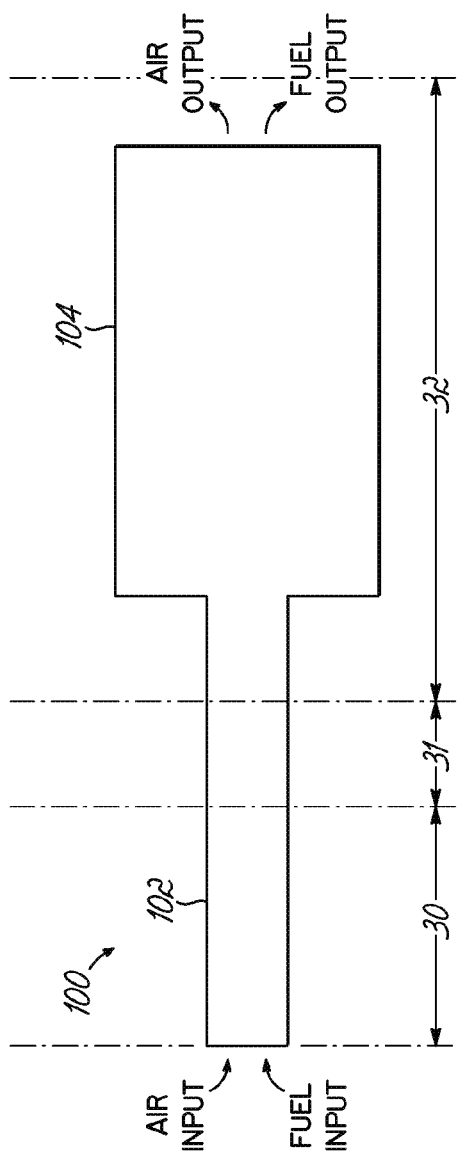
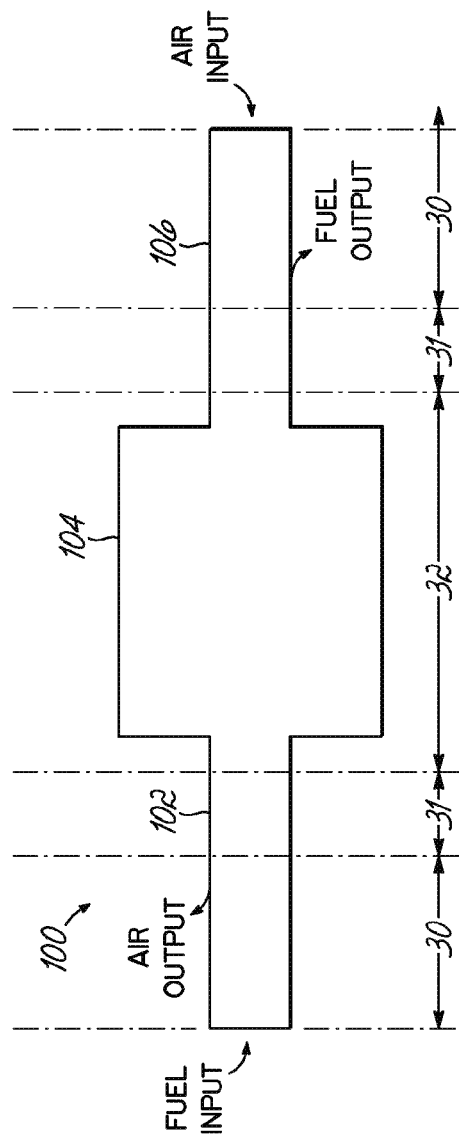
FIG. 25A
FIG. 25B

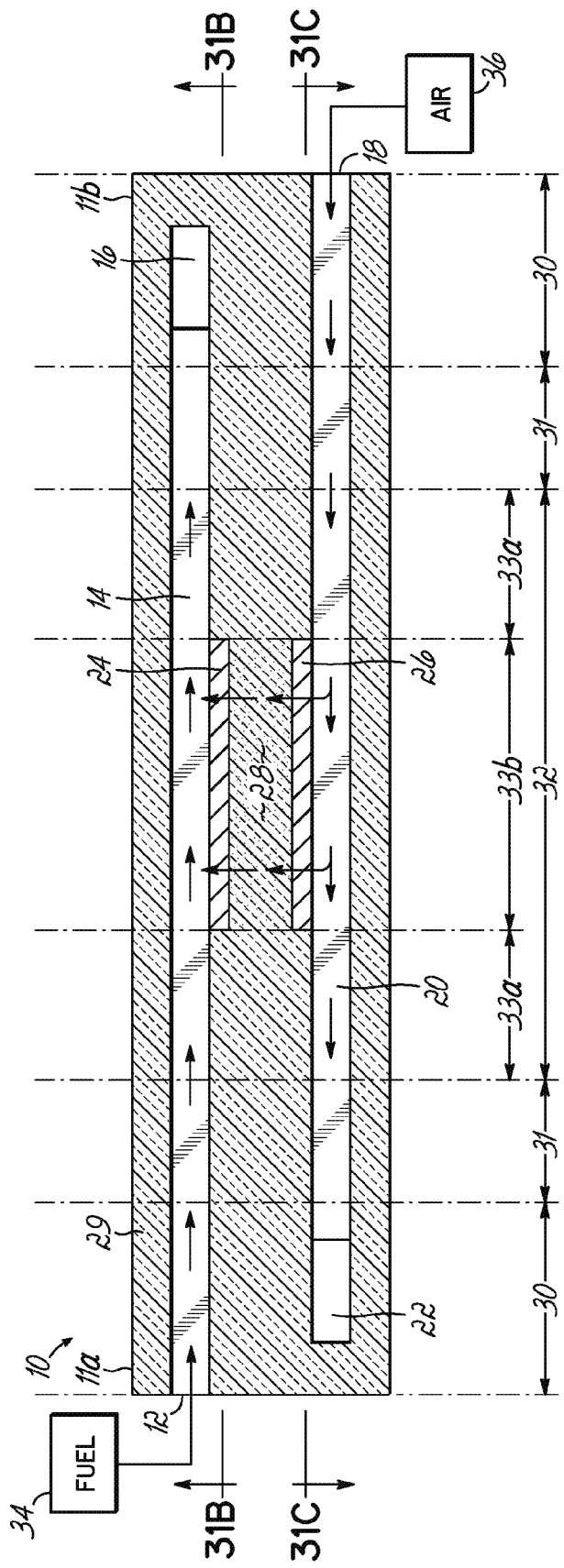

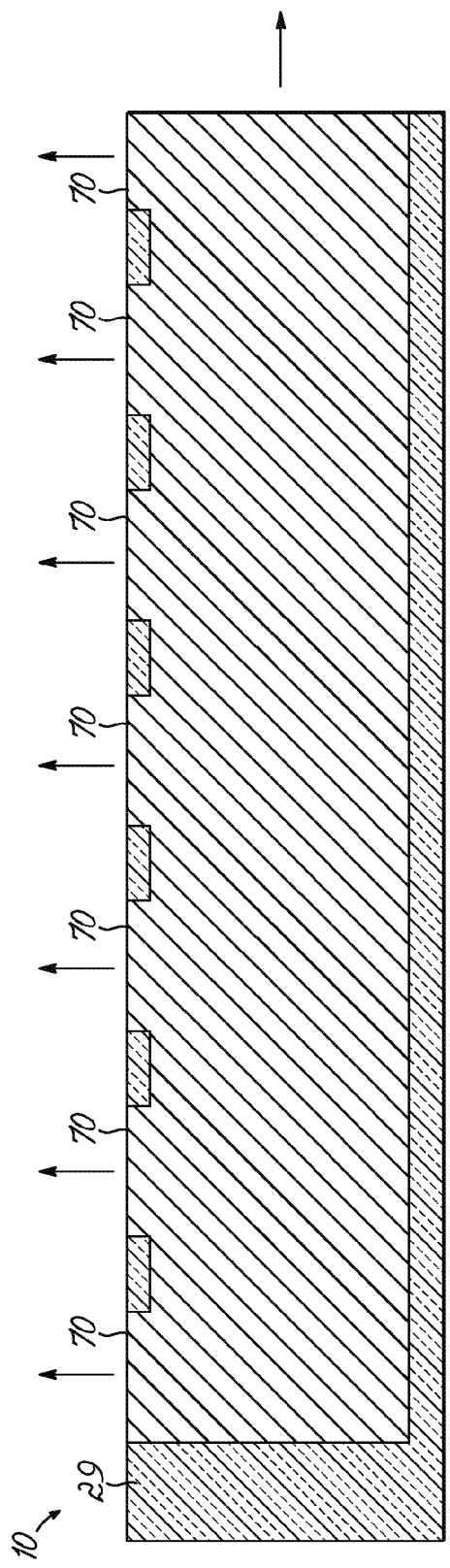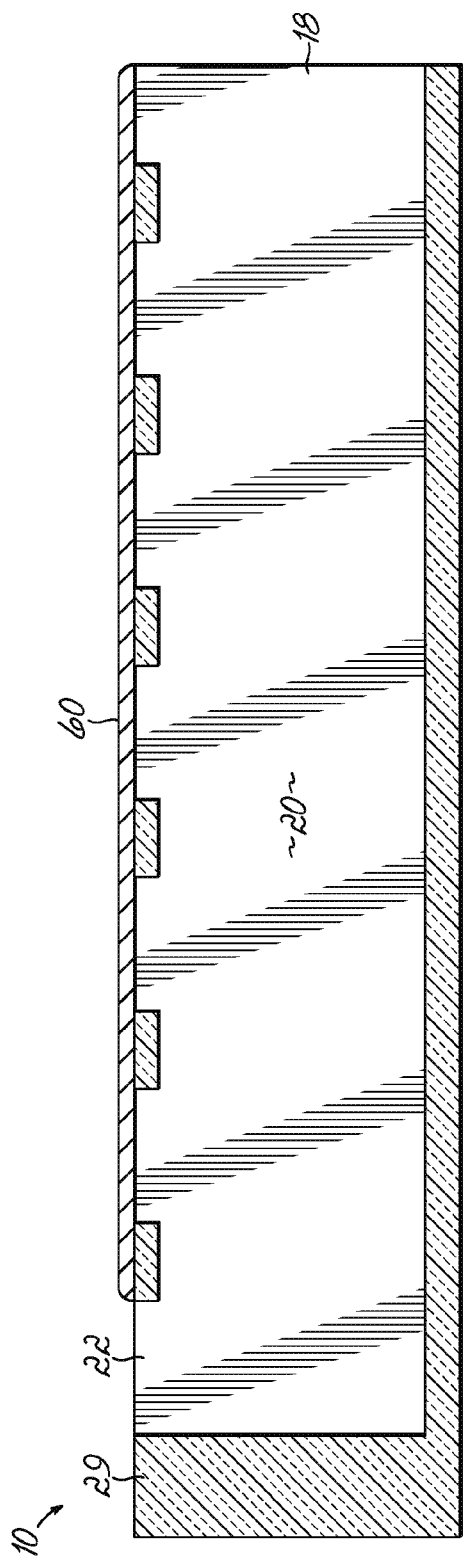

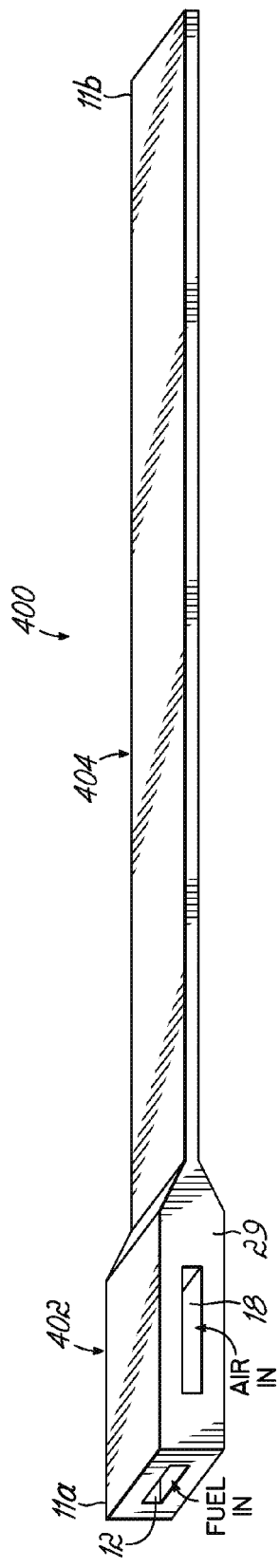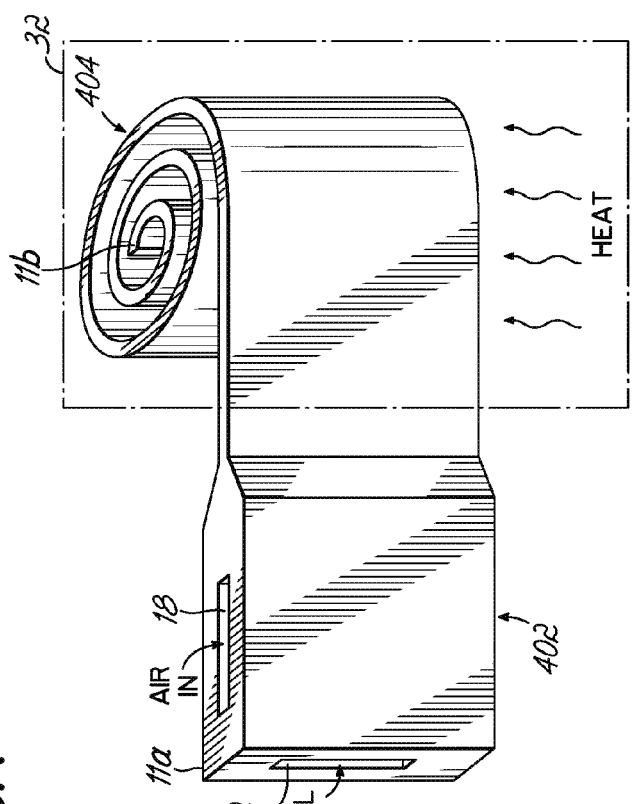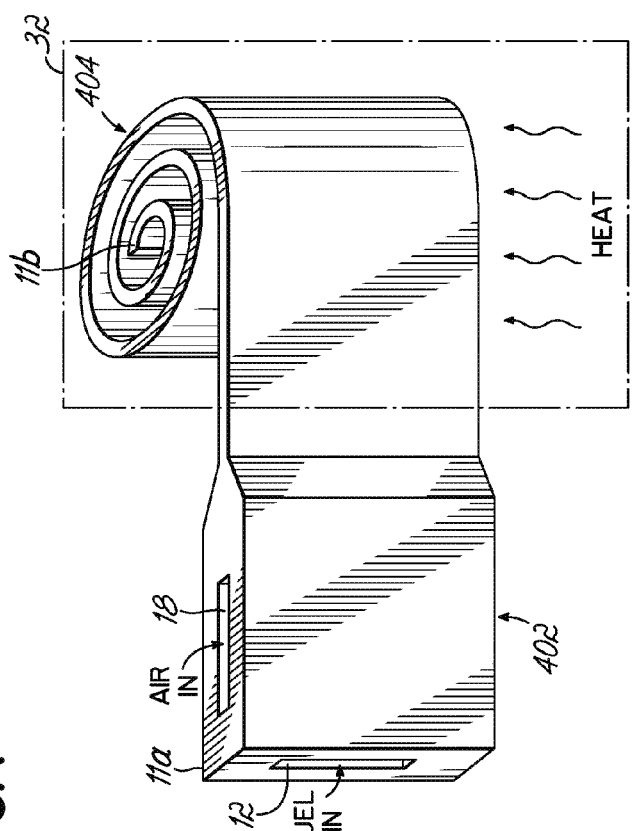
FIG. 48A
FIG. 48B
FIG. 48C

SOLID OXIDE FUEL CELL DEVICE AND SYSTEM

CROSS-REFERENCE TO RELATED APPLICATIONS

This application is a continuation of U.S. Pat. No. 8,932,776 issued Jan. 13, 2015 and entitled SOLID OXIDE FUEL CELL DEVICE AND SYSTEM, which is a continuation of U.S. Pat. No. 8,293,415 issued Oct. 23, 2013 and entitled SOLID OXIDE FUEL CELL DEVICE AND SYSTEM, which claims the benefit of and priority to Provisional Application No. 60/747,013, filed May 11, 2006, and is a Continuation of U.S. Pat. Nos. 7,981,565; 7,842,429; 7,838,137; and 7,883,816, all of which are expressly incorporated herein by reference in their entirety.

FIELD OF THE INVENTION

This invention relates to solid oxide fuel cell devices and systems, and methods of manufacturing the devices and, more particularly, to a solid oxide fuel cell device in the form of a multi-layer monolithic SOFC Stick™.

BACKGROUND OF INVENTION

Ceramic tubes have found a use in the manufacture of Solid Oxide Fuel Cells (SOFCs). There are several types of fuel cells, each offering a different mechanism of converting fuel and air to produce electricity without combustion. In SOFCs, the barrier layer (the "electrolyte") between the fuel and the air is a ceramic layer, which allows oxygen atoms to migrate through the layer to complete a chemical reaction. Because ceramic is a poor conductor of oxygen atoms at room temperature, the fuel cell is operated at 700° C. to 1000° C., and the ceramic layer is made as thin as possible.

Early tubular SOFCs were produced by the Westinghouse Corporation using long, fairly large diameter, extruded tubes of zirconia ceramic. Typical tube lengths were several feet long, with tube diameters ranging from ¼ inch to ½ inch. A complete structure for a fuel cell typically contained roughly ten tubes. Over time, researchers and industry groups settled on a formula for the zirconia ceramic which contains 8 mol % $Y_2O_3$. This material is made by, among others, Tosoh of Japan as product TZ-8Y.

Another method of making SOFCs makes use of flat plates of zirconia, stacked together with other anodes and cathodes, to achieve the fuel cell structure. Compared to the tall, narrow devices envisioned by Westinghouse, these flat plate structures can be cube shaped, 6 to 8 inches on an edge, with a clamping mechanism to hold the entire stack together.

A still newer method envisions using larger quantities of small diameter tubes having very thin walls. The use of thin walled ceramic is important in SOFCs because the transfer rate of oxygen ions is limited by distance and temperature. If a thinner layer of zirconia is used, the final device can be operated at a lower temperature while maintaining the same efficiency. Literature describes the need to make ceramic tubes at 150 μm or less wall thickness.

There are several main technical problems that have stymied the successful implementation of SOFCs. One problem is the need to prevent cracking of the ceramic elements during heating. For this, the tubular SOFC approach is better than the competing "stack" type (made from large, flat ceramic plates) because the tube is essentially one-dimensional. The tube can get hot in the middle, for example, and expand but not crack. For example, a tube furnace can heat a 36" long alumina tube, 4" in diameter, and it will become red hot in the center, and cold enough to touch at the ends. Because the tube is heated evenly in the center section, that center section expands, making the tube become longer, but it does not crack. A ceramic plate heated in the center only would quickly break into pieces because the center expands while the outside remains the same size. The key property of the tube is that it is uniaxial, or one-dimensional.

A second key challenge is to make contact to the SOFC. The SOFC ideally operates at high temperature (typically 700-1000° C.), yet it also needs to be connected to the outside world for air and fuel, and also to make electrical connection. Ideally, one would like to connect at room temperature. Connecting at high temperature is problematic because organic material cannot be used, so one must use glass seals or mechanical seals. These are unreliable, in part, because of expansion problems. They can also be expensive.

Thus, previous SOFC systems have difficulty with at least the two problems cited above. The plate technology also has difficulty with the edges of the plates in terms of sealing the gas ports, and has difficulty with fast heating, as well as cracking. The tube approach resolves the cracking issue but still has other problems. An SOFC tube is useful as a gas container only. To work it must be used inside a larger air container. This is bulky. A key challenge of using tubes is that you must apply both heat and air to the outside of the tube; air to provide the $O_2$ for the reaction, and heat to accelerate the reaction. Usually, the heat would be applied by burning fuel, so instead of applying air with 20% $O_2$ (typical), the air is actually partially reduced (partially burned to provide the heat) and this lowers the driving potential of the cell.

An SOFC tube is also limited in its scalability. To achieve greater kV output, more tubes must be added. Each tube is a single electrolyte layer, such that increases are bulky. The solid electrolyte tube technology is further limited in terms of achievable electrolyte thinness. A thinner electrolyte is more efficient. Electrolyte thickness of 2 μm or even 1 μm would be optimal for high power, but is very difficult to achieve in solid electrolyte tubes. It is noted that a single fuel cell area produces about 0.5 to 1 volt (this is inherent due to the driving force of the chemical reaction, in the same way that a battery gives off 1.2 volts), but the current, and therefore the power, depend on several factors. Higher current will result from factors that make more oxygen ions migrate across the electrolyte in a given time. These factors are higher temperature, thinner electrolyte, and larger area.

SUMMARY OF THE INVENTION

The invention provides a solid oxide fuel cell device having an elongated tube with a reaction zone along a first lengthwise portion configured to be heated to an operating reaction temperature, and at least one cold zone along a second lengthwise portion configured to remain at a low temperature below the operating reaction temperature when the reaction zone is heated. A plurality of fuel and oxidizer passages extends lengthwise along at least a portion of each of the first and second lengthwise portions from respective fuel and oxidizer inlets to respective fuel and oxidizer outlets. An anode is associated with each fuel passage and a cathode is associated with each oxidizer passage in at least the reaction zone, the anodes and cathodes are positioned in opposing relation to each other, and a solid electrolyte is disposed between opposing anodes and cathodes.

In one embodiment, the invention provides a solid oxide fuel cell device comprising a spiral-rolled elongate tube having a tube length defined between a first tube end and an opposing second tube end, a first cold end region adjacent the first tube end, a second cold end region adjacent the second tube end, and a reaction zone between the first and second cold end regions. The reaction zone is configured to be heated to an operating reaction temperature, and the first and second cold end regions are configured to remain at a low temperature below the operating reaction temperature. The elongate tube further has a fuel inlet in the first cold end region and a respective fuel outlet in the reaction zone coupled therebetween by an elongate fuel passage at least partially extending through the reaction zone within the elongate tube, and an oxidizer inlet in the second cold end region and a respective oxidizer outlet in the reaction zone coupled therebetween by an elongate oxidizer passage at least partially extending through the reaction zone within the elongate tube in parallel and opposing relation to the elongate fuel passage. An anode resides adjacent the fuel passage in the reaction zone within the elongate tube and is electrically coupled to a first exterior contact surface on the elongate tube in at least one of the first and second cold end regions, a cathode resides adjacent the oxidizer passage in the reaction zone within the elongate tube and is electrically coupled to a second exterior contact surface on the elongate tube in at least one of the first and second cold end regions, and a solid electrolyte is positioned between the anode and cathode.

In another embodiment, the invention provides an elongate tube having a tube length defined between a first tube end and an opposing second tube end, a first cold end region adjacent the first tube end, a second cold end region adjacent the second tube end, and a reaction zone therebetween. The reaction zone is configured to be heated to an operating reaction temperature, and the first and second cold end regions are configured to remain at a low temperature below the operating reaction temperature. The elongate tube further has a plurality of spaced, concentric annular fuel passages extending from the first tube end at least partially through the reaction zone toward the second tube end, and a plurality of spaced, concentric annular oxidizer passages extending from the second tube end at least partially through the reaction zone toward the second tube end in alternating and concentric relation to the plurality of fuel passages. A fuel outlet resides in one of the reaction zone or the second cold end region extending from an innermost one of the plurality of fuel passages to an exterior surface of the elongate tube and is fluidically open to each of the plurality of fuel passages and fluidically closed to the plurality of oxidizer passages, and an oxidizer outlet resides in one of the reaction zone or the first cold end region extending from an innermost one of the plurality of oxidizer passages to the exterior surface of the elongate tube and is fluidically open to each of the plurality of oxidizer passages and fluidically closed to the plurality of fuel passages. An anode lines each of the plurality of fuel passages in the reaction zone and the first cold end region and is electrically coupled to a first exterior contact surface in the first cold end region, and a cathode lines each of the plurality of oxidizer passages in the reaction zone and the second cold end region and is electrically coupled to a second exterior contact surface in the second cold end region. An annular solid electrolyte layer is positioned between each of adjacent fuel and oxidizer passages separating opposing anodes and cathodes.

The invention further provides a fuel cell system incorporating a plurality of the fuel cell devices of either of the above described embodiments, each device positioned with the reaction zone in a hot zone chamber and having the first and second cold end regions extending outside the hot zone chamber. A heat source is coupled to the hot zone chamber and adapted to heat the reaction zones to the operating reaction temperature within the hot zone chamber. The system further includes fuel and air supplies coupled outside the hot zone chamber to the respective first and second cold end regions for supplying a fuel and air flow into the fuel and air passages. Methods of using the devices and system are also provided.

BRIEF DESCRIPTION OF THE INVENTION

The accompanying drawings, which are incorporated in and constitute a part of this specification, illustrate embodiments of the invention and, together with a general description of the invention given above, and the detailed description given below, serve to explain the invention.

FIGS. 1 and 1A depict, in side cross-sectional view and top cross-sectional view, respectively, one embodiment of a basic SOFC Stick™ device of the invention, having a single anode layer, cathode layer and electrolyte layer, and a hot zone between two end cold zones.

FIG. 4A depicts in perspective view a metallurgical bonding attachment means to a plurality of SOFC Stick™ devices to make electrical connection to positive and negative voltage nodes according to one embodiment of the invention.

FIG. 4B depicts in schematic end view a connection between multiple SOFC Stick™ devices according to one embodiment of the invention, where each SOFC Stick™ device includes a plurality of anodes and cathodes.

FIG. 5 depicts in schematic end view a mechanical attachment means for making the electrical connection to positive and negative voltage nodes according to one embodiment of the invention.

FIG. 9A depicts three fuel cell layers connected in parallel and FIG. 9B depicts three fuel cells connected in series.

FIG. 10A depicts in schematic side view a variation of the embodiment of FIG. 10, where the hot zone is positioned between opposing cold ends.

FIG. 10B depicts the SOFC Stick™ device of FIG. 10A in top cross-sectional view taken along line 10B-10B.

Figure 11:
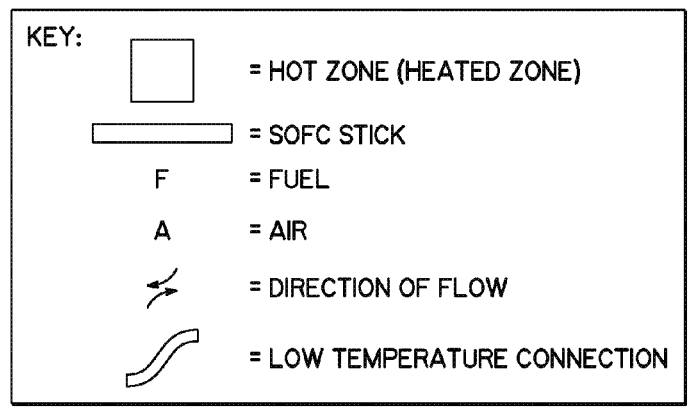
Figure 12:
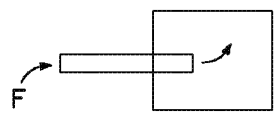
Figure 13:
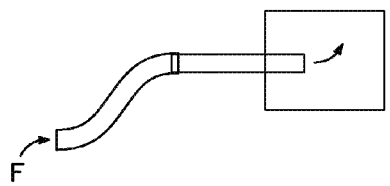
Figure 14:
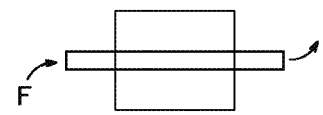
Figure 15:
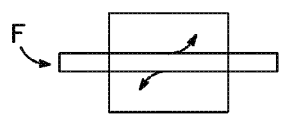
Figure 16:
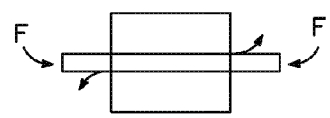
Figure 17:
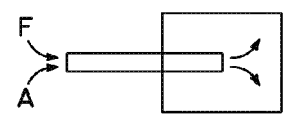
Figure 18:
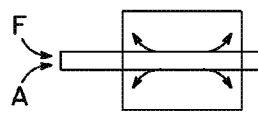
Figure 19:
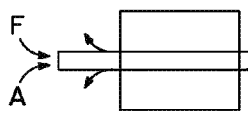
Figure 20:
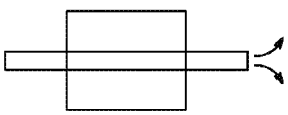
Figure 21:
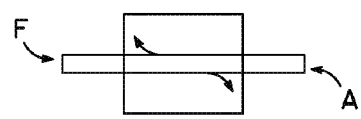
Figure 22:
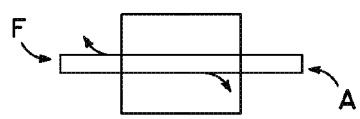
Figure 23:
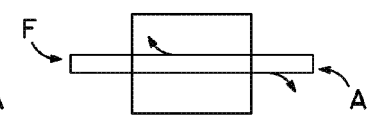
Figure 24:
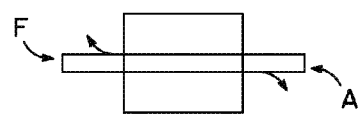

FIGS. 11-24 schematically depict various embodiments of the invention, where FIG. 11 provides a key for the components depicted in FIGS. 12-24.

Figure 27A:
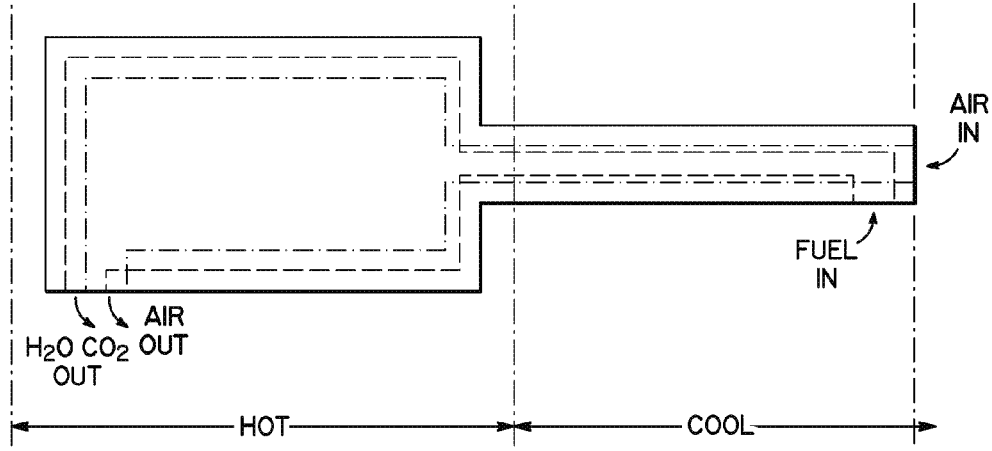
Figure 27B:
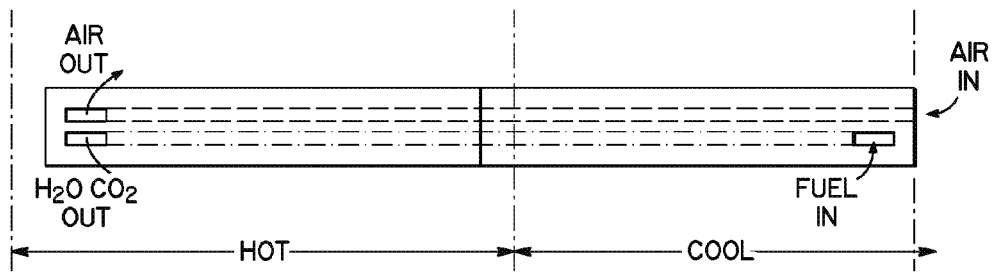

FIGS. 25A and 27A depict in schematic top plan view and FIG. 27B depicts in schematic side view an SOFC Stick™ device according to one embodiment of the invention having a panhandle design with an elongate section at one cold end and a large surface area section at the opposing hot end.

Figure 26A:
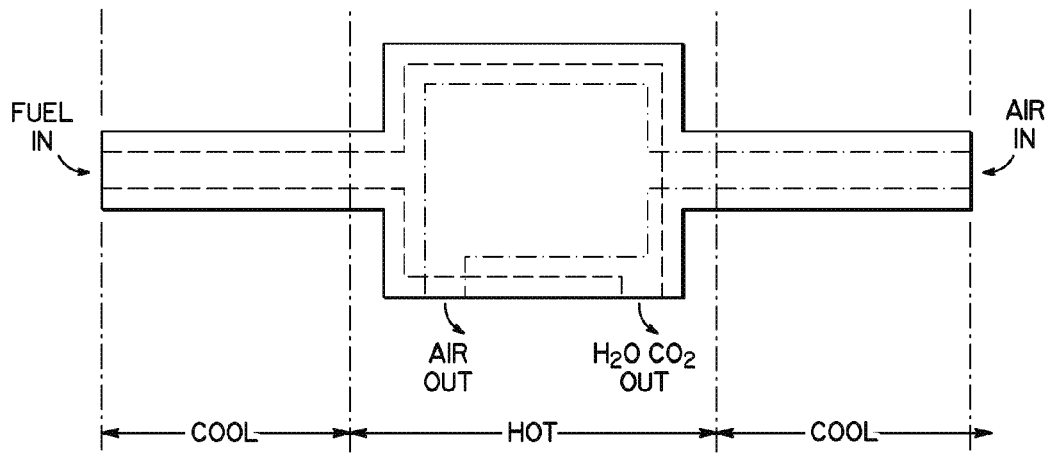
Figure 26B:
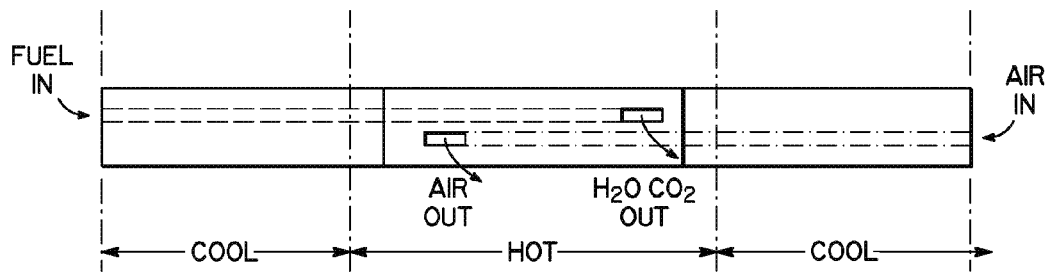

FIGS. 25B and 26A depict in schematic top plan view and FIG. 26B depicts in schematic side view an alternative embodiment of the panhandle design having two elongate sections at opposing cold ends with a center large surface area section in a central hot zone.

Figure 28A:
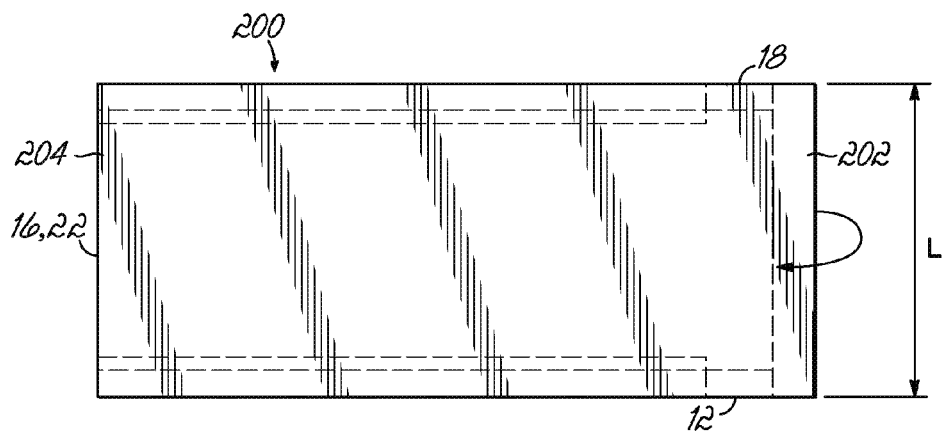
Figure 28B:
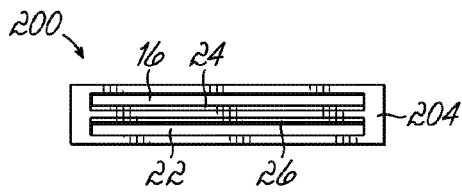
Figure 28C:
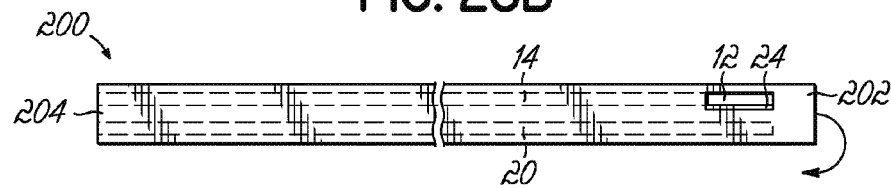
Figure 28D:
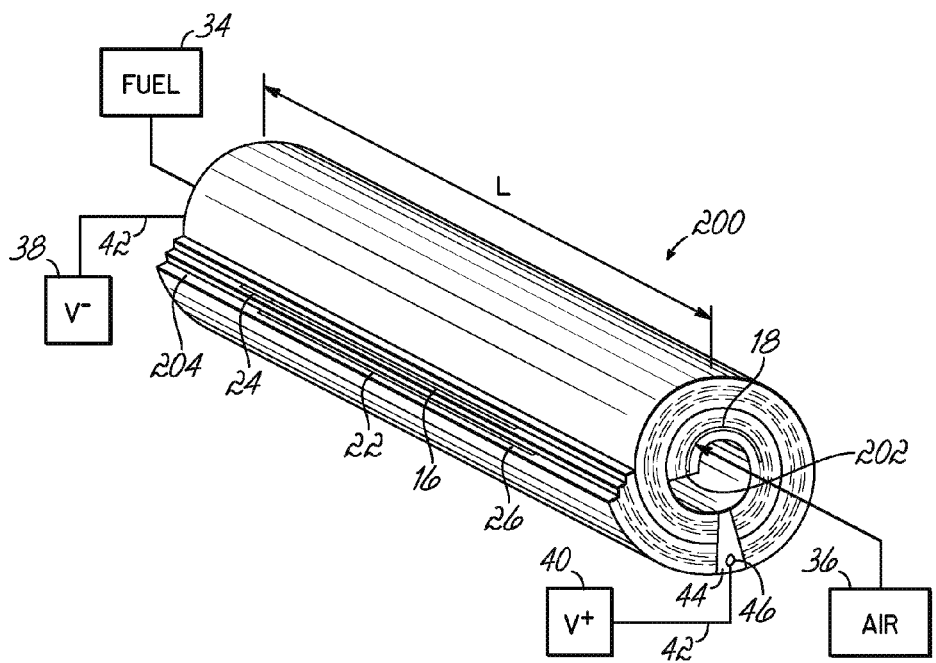

FIGS. 28A-28D depict an SOFC Stick™ device according to one embodiment of the invention, having a spiral or rolled, tubular configuration, where FIGS. 28A-28C depict the unrolled structure in schematic top view, end view and side view, respectively, and FIG. 28D depicts the spiral or rolled, tubular configuration in schematic perspective view.

Figure 29A:
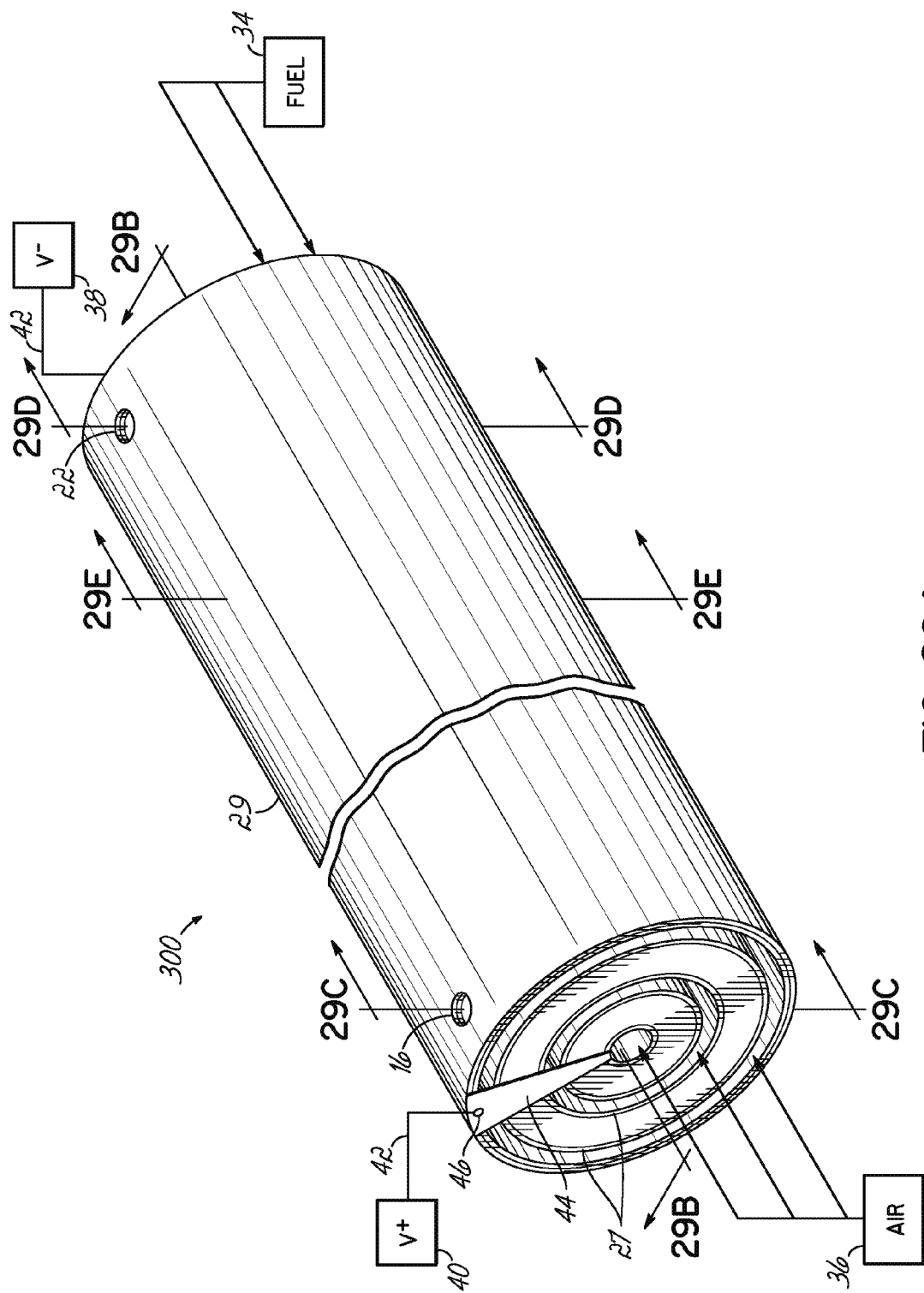
Figure 29B:
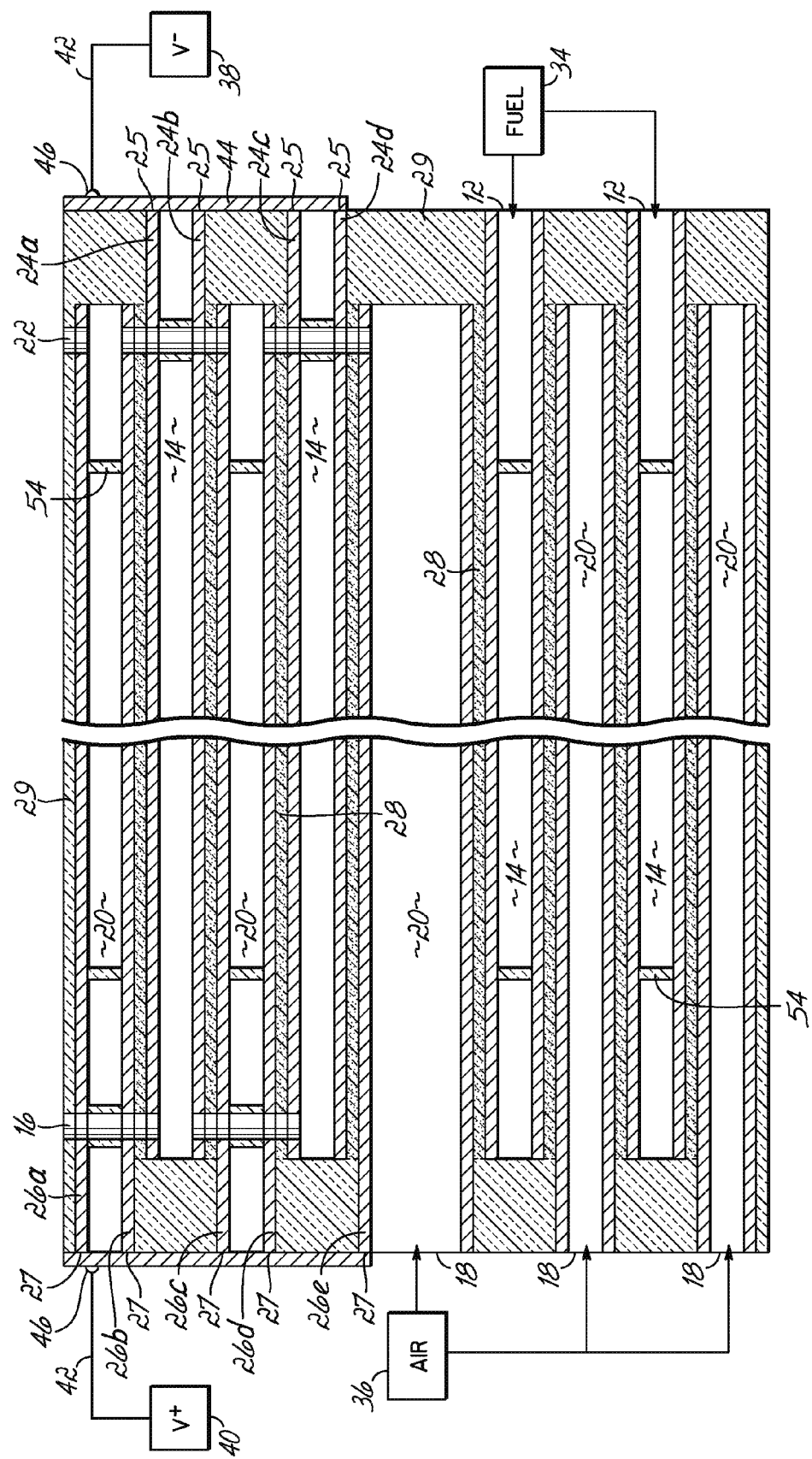
Figure 29C:
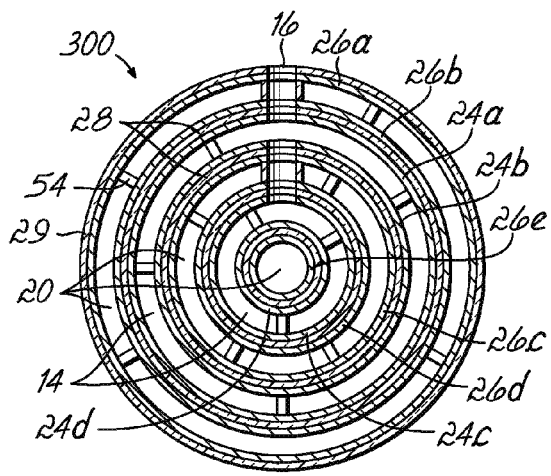
Figure 29D:
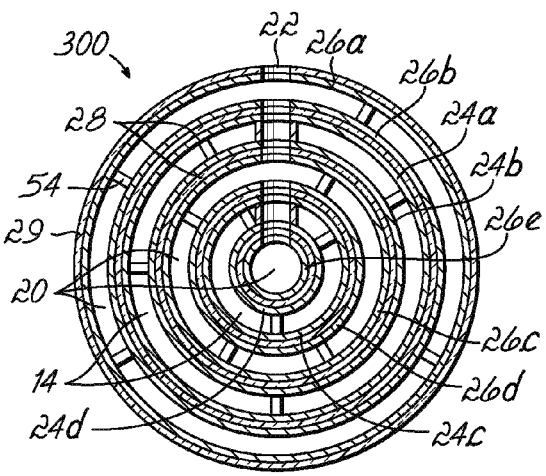
Figure 29E:
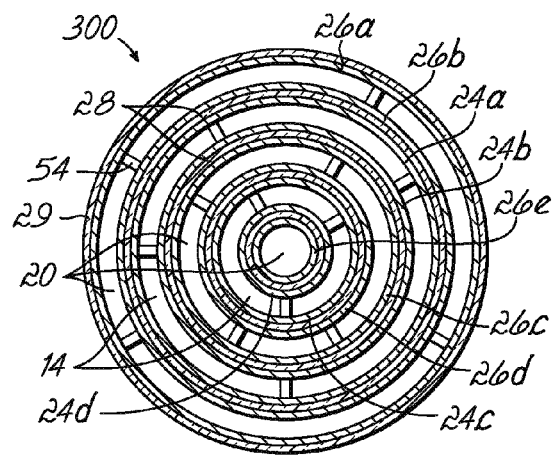
Figure 29F:
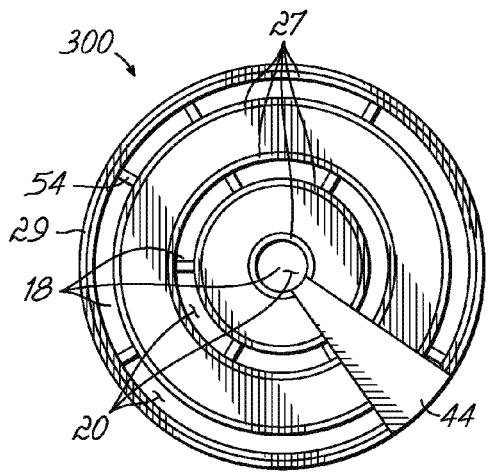
Figure 29G:
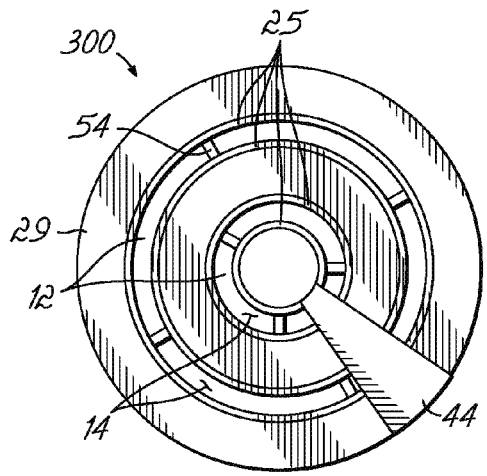

FIGS. 29A-29G depict another alternative embodiment of the invention wherein the SOFC Stick™ device has a tubular concentric form, and where FIG. 29A depicts the device in schematic isometric view, FIGS. 29B-29E depict cross-sectional views taken from FIG. 29A, FIG. 29F depicts an end view at the air input end, and FIG. 29G depicts an end view at the fuel input end.

Figure 30A:
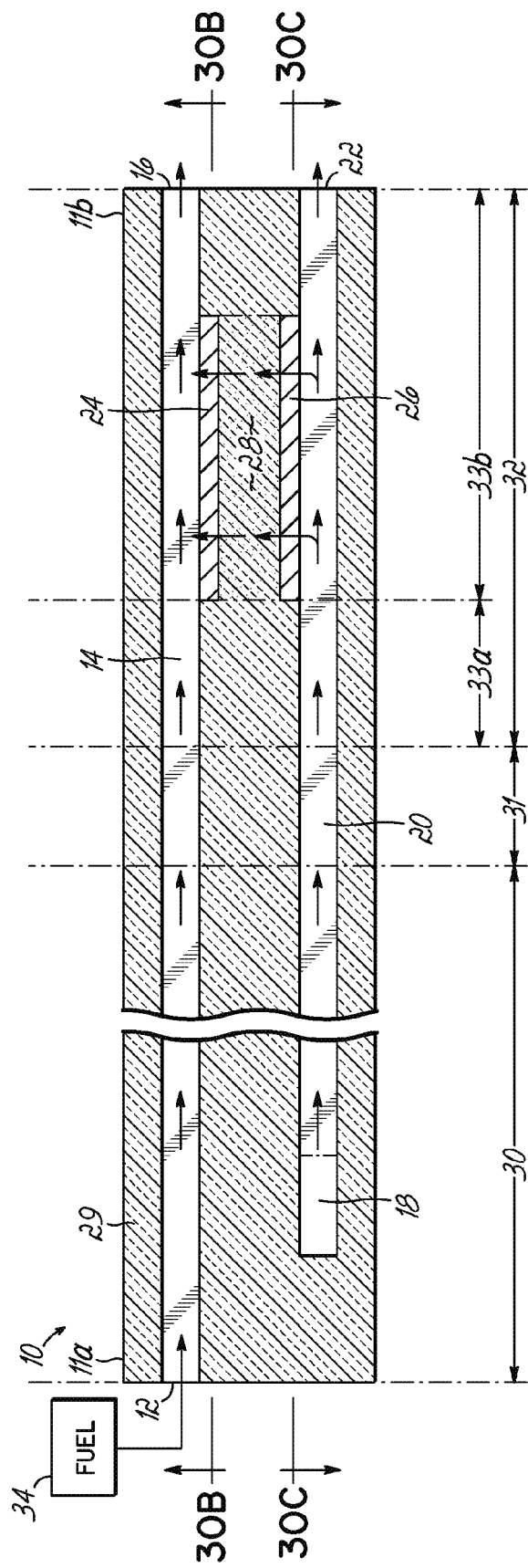
Figure 30B:
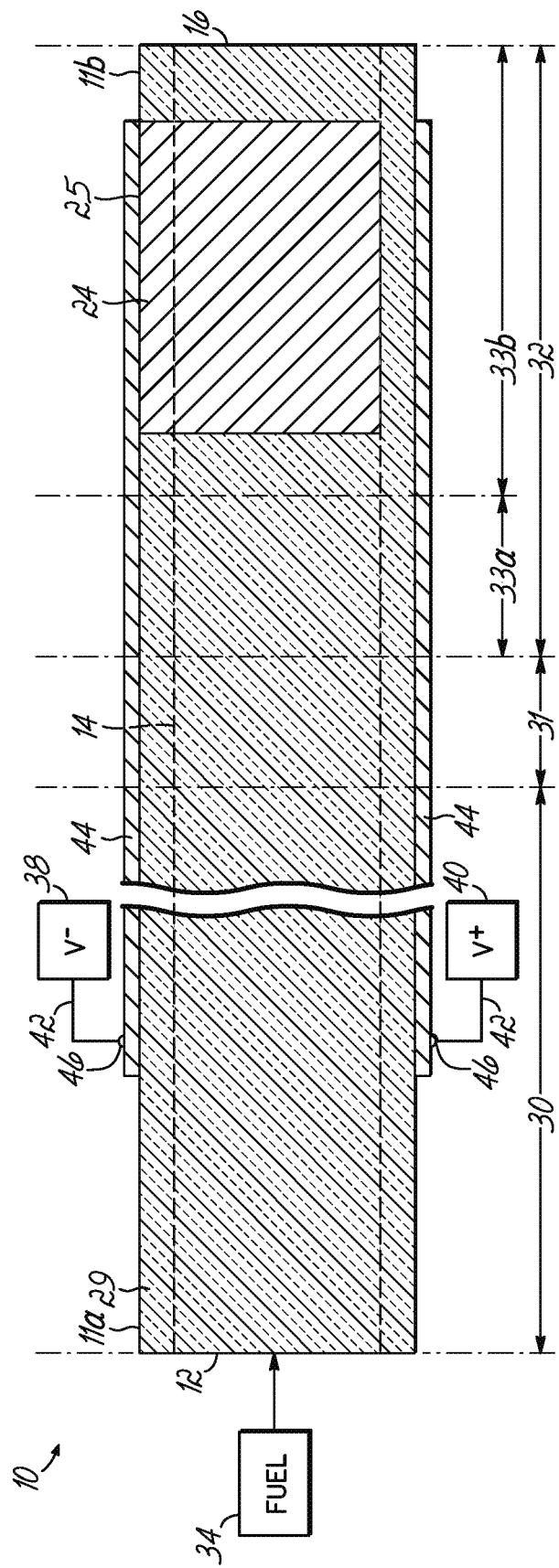
Figure 30C:
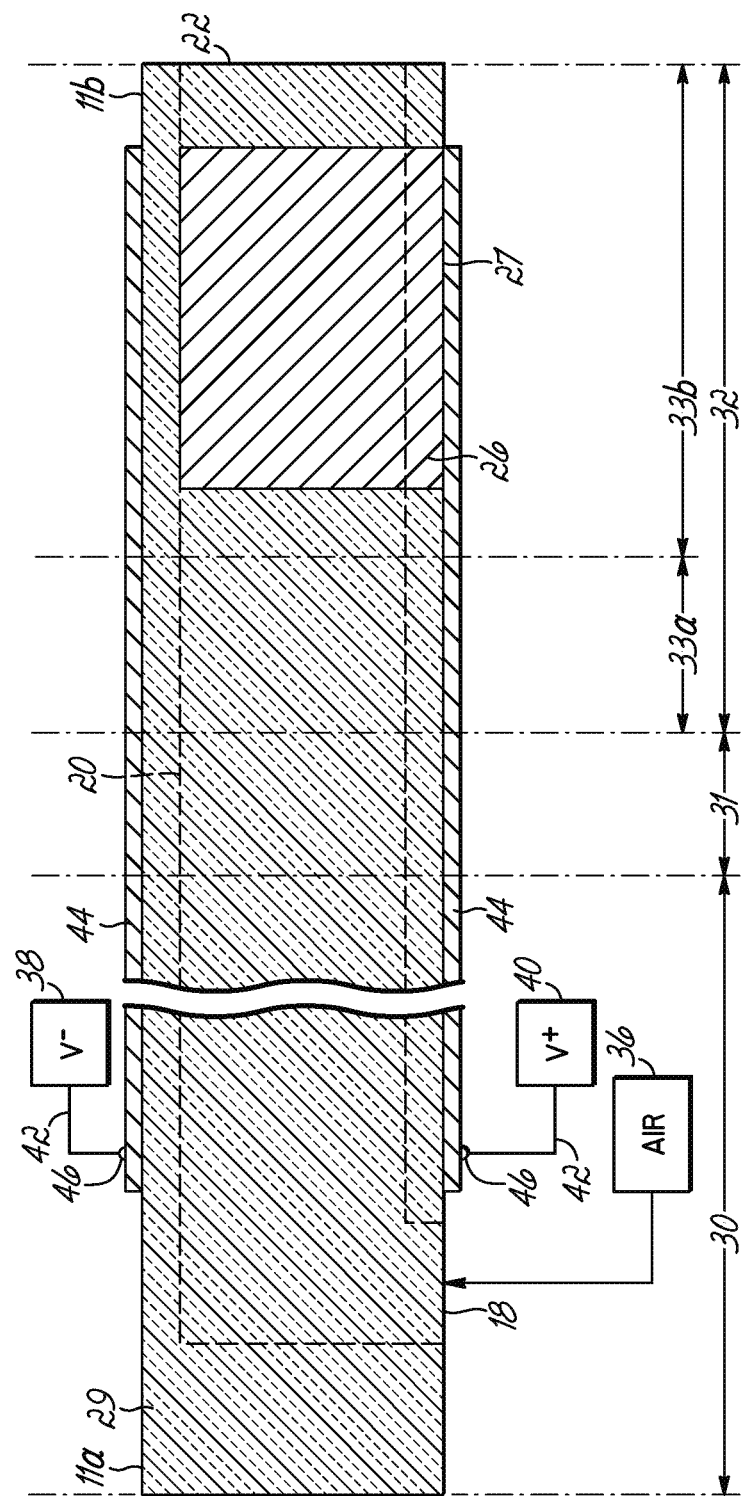

FIG. 30A depicts in schematic cross-sectional side view an embodiment of an SOFC Stick™ device of the invention having an integrated pre-heat zone preceding an active zone in the hot zone, and FIGS. 30B and 30C depict the device of FIG. 30A in schematic cross-sectional view taken along lines 30B-30B and 30C-30C, respectively.

Figure 31B:
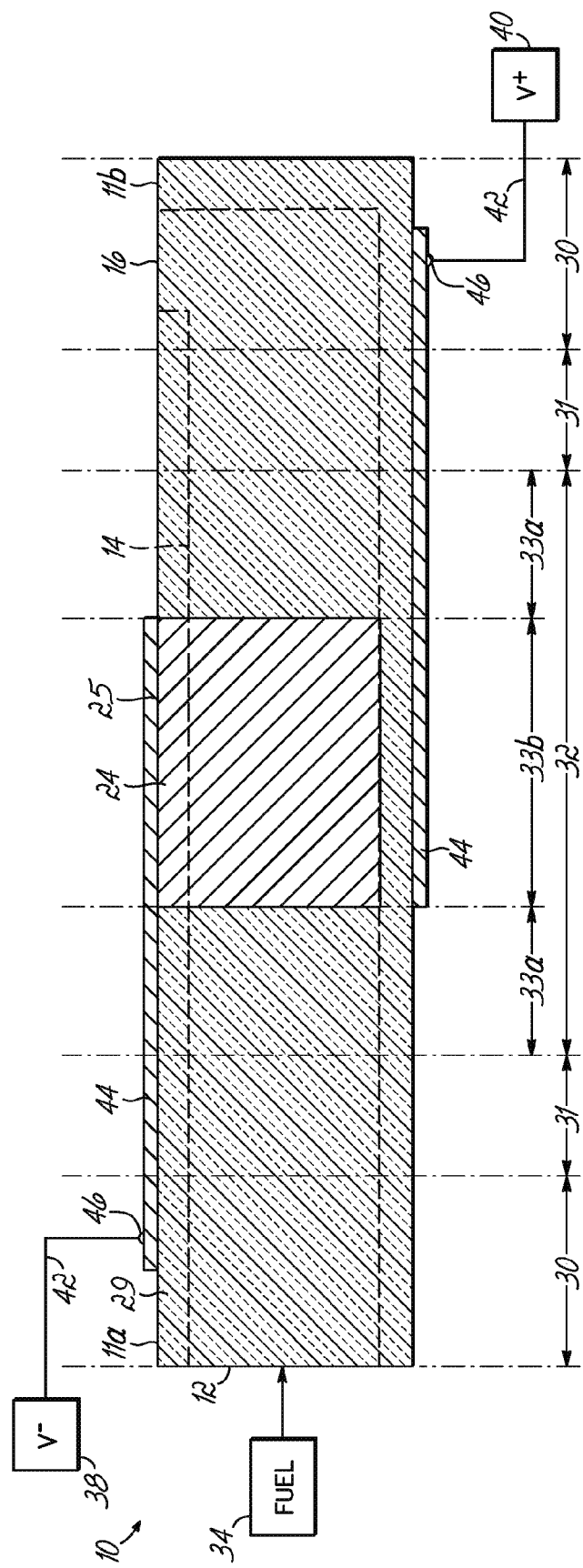
Figure 31C:
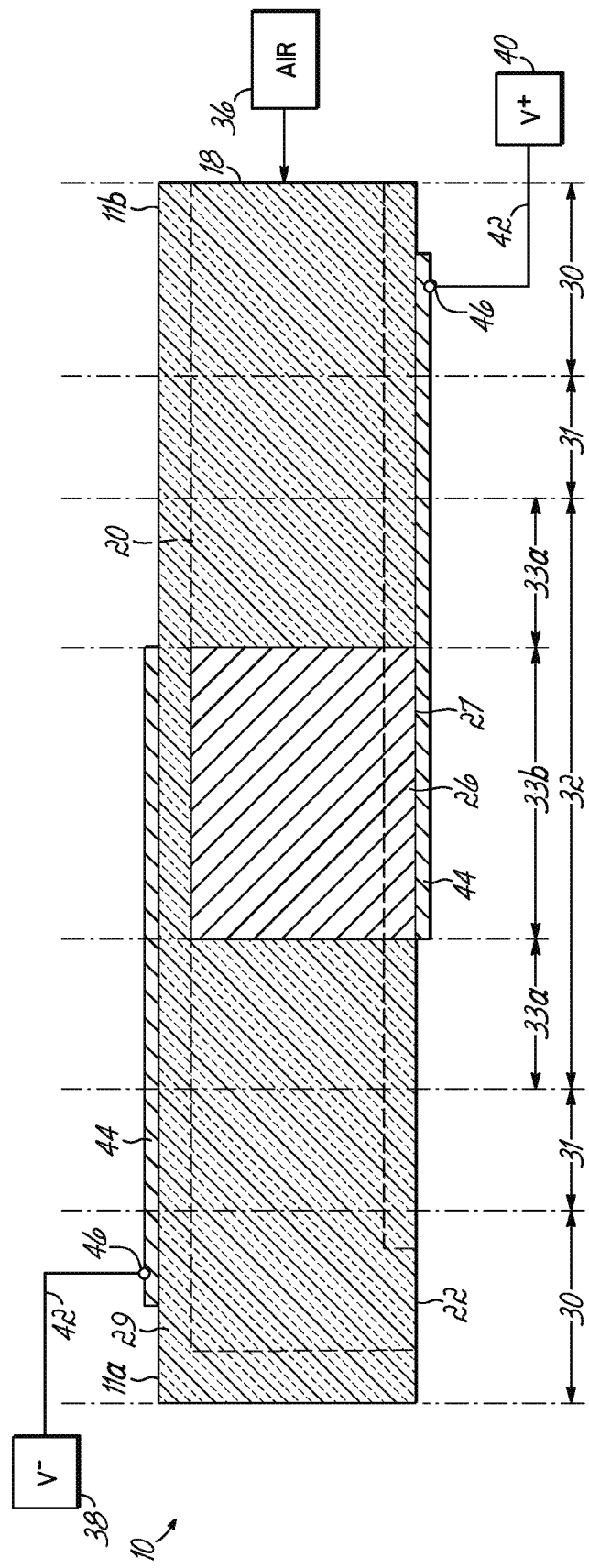

FIGS. 31A-31C are similar to FIGS. 30A-30C, but depict two cold zones with a central hot zone.

Figure 32A:
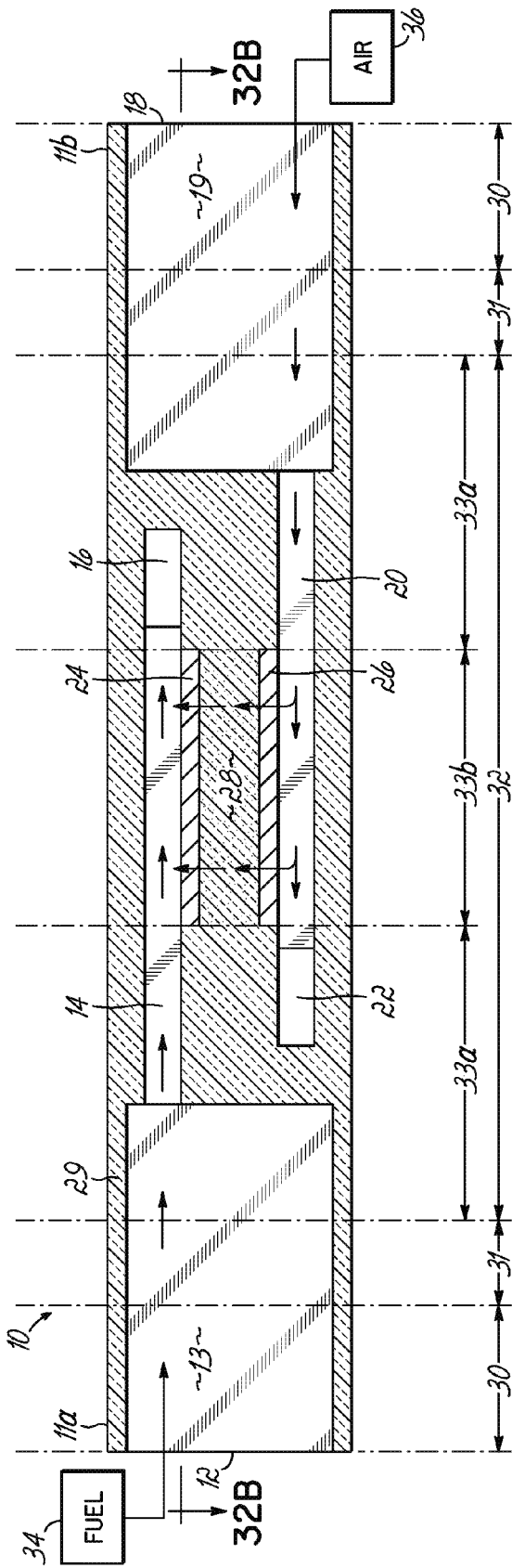
Figure 32B:
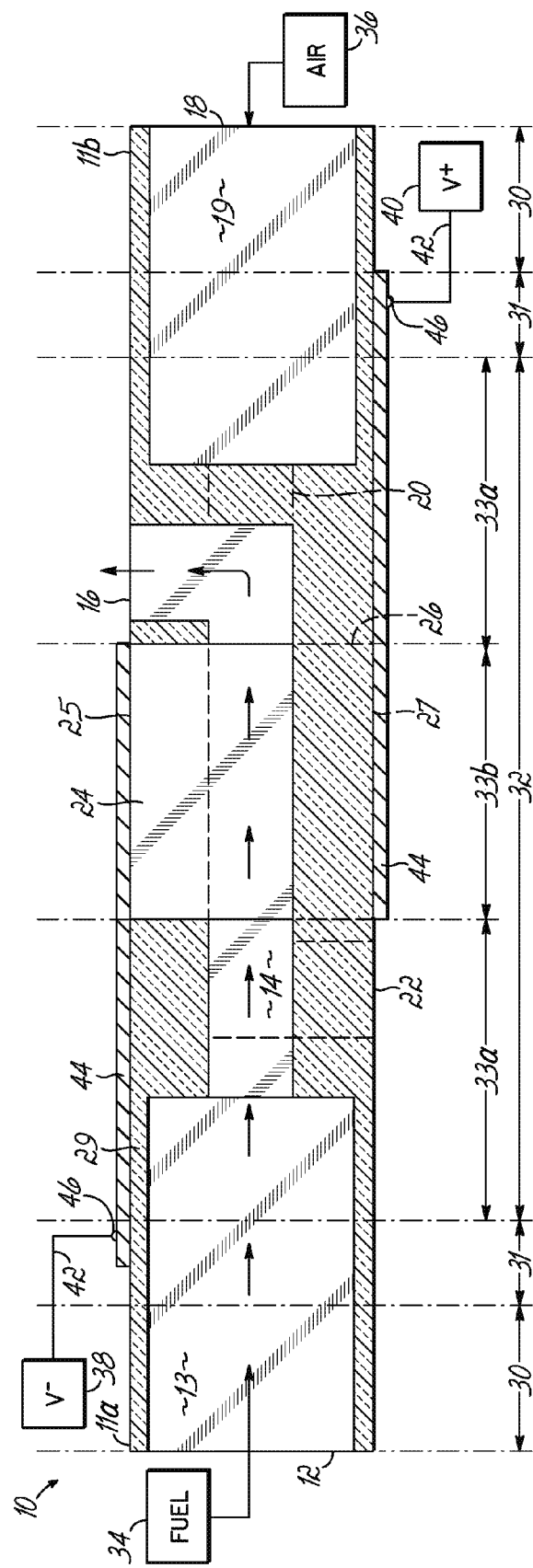

FIGS. 32A-32B depict in schematic cross-sectional side view and schematic cross-sectional top view taken along line 32B-32B of FIG. 32A, respectively, an embodiment similar to that depicted in FIGS. 31A-31C, but further including pre-heat chambers extending between the fuel inlet and the fuel passage and between the air inlet and the air passage, each pre-heat chamber extending from the cold zone into the pre-heat zone of the hot zone.

Figure 33A:
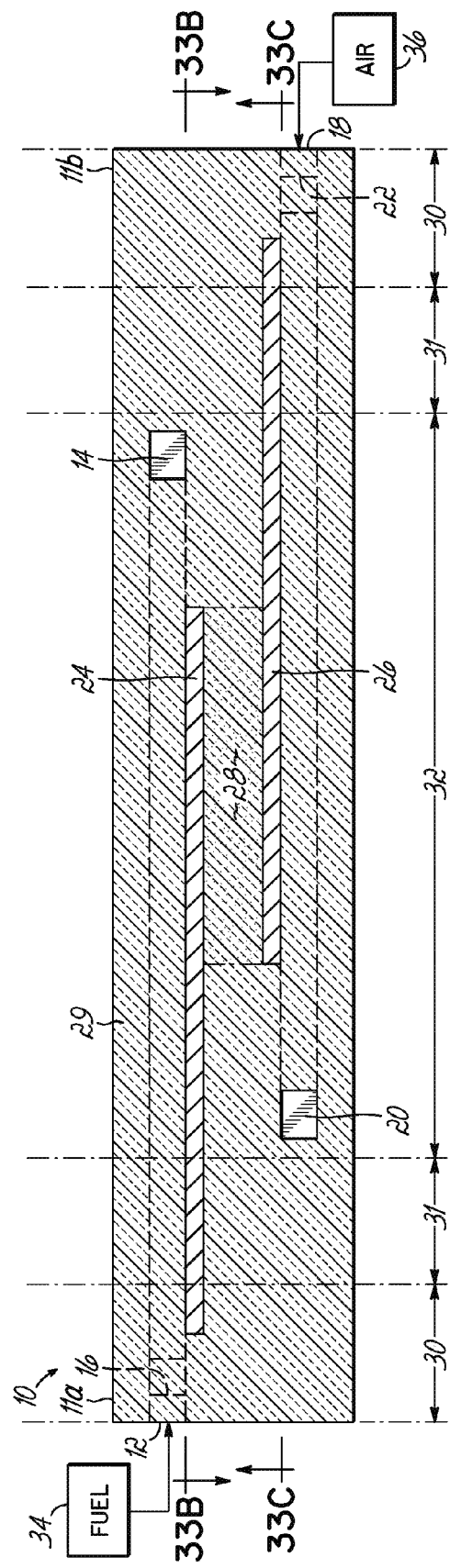
Figure 33B:
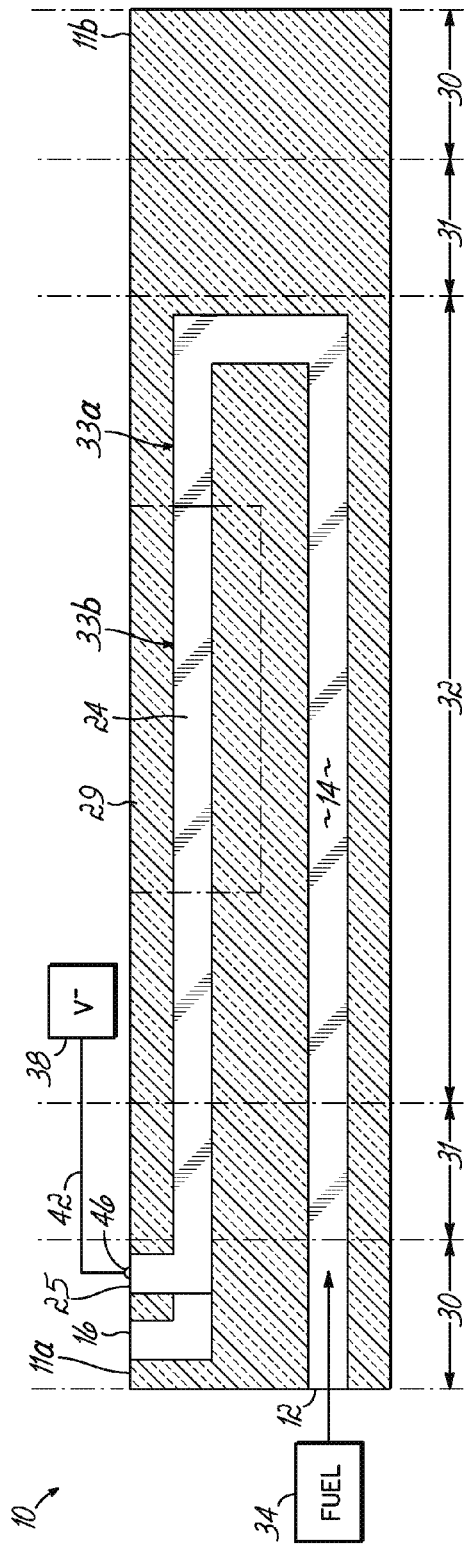
Figure 33C:
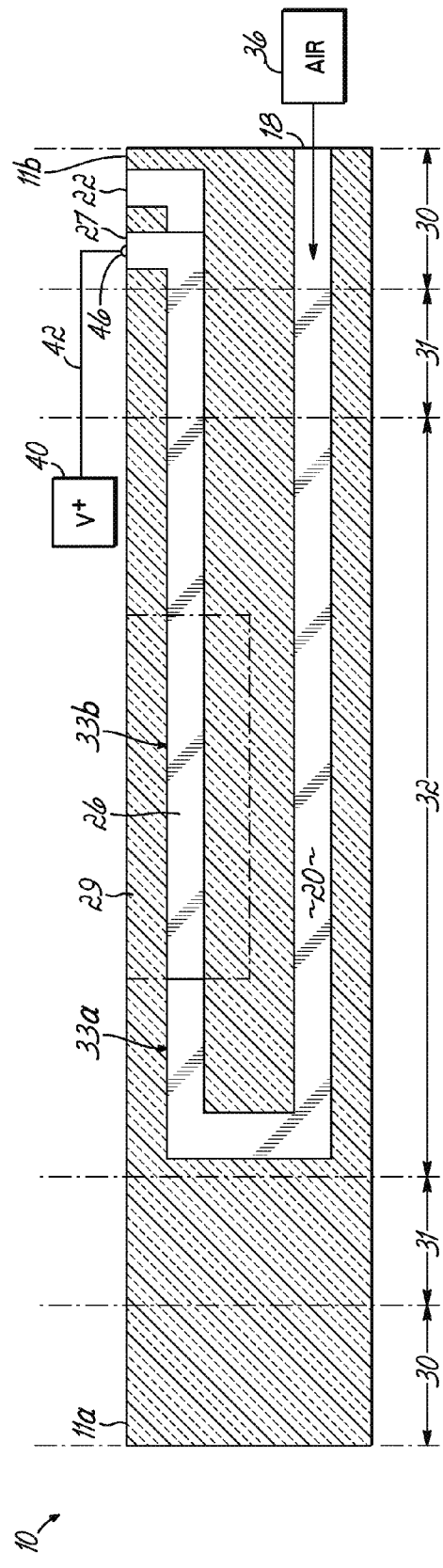

FIGS. 33A-33C depict another embodiment of the invention for pre-heating the air and fuel, where FIG. 33A is a schematic cross-sectional side view through the longitudinal center of the SOFC Stick™ device, FIG. 33B is a schematic cross-sectional top view taken along line 33B-33B of FIG. 33A, and FIG. 33C is a schematic cross-sectional bottom view taken along line 33C-33C of FIG. 33A.

Figure 34A:
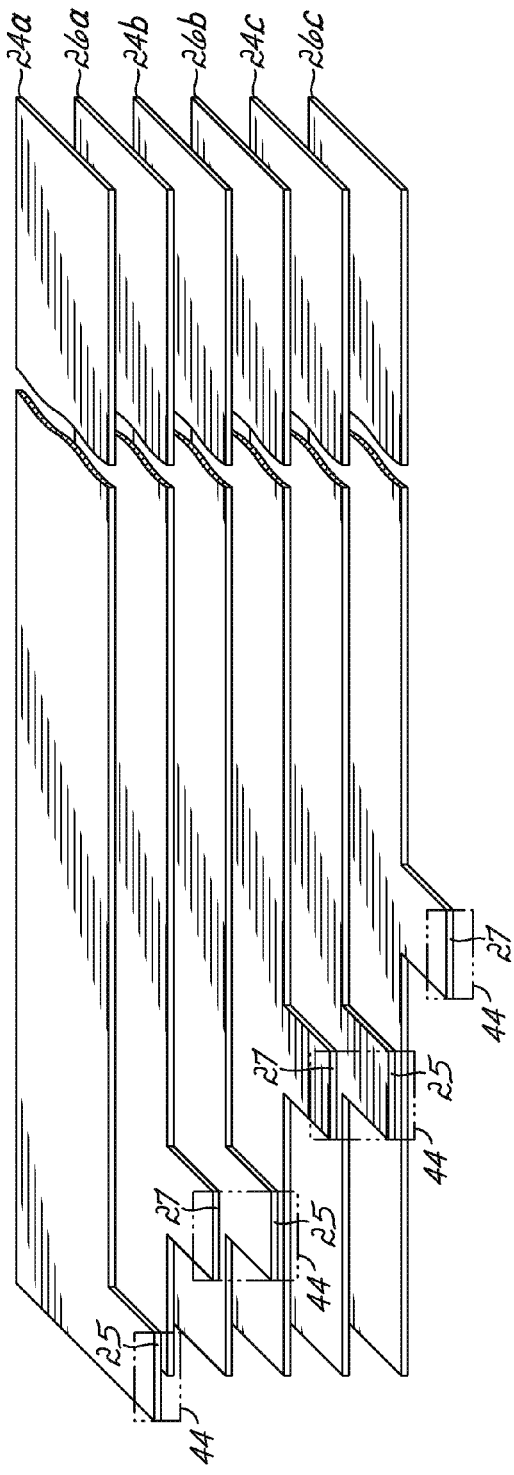
Figure 34B:
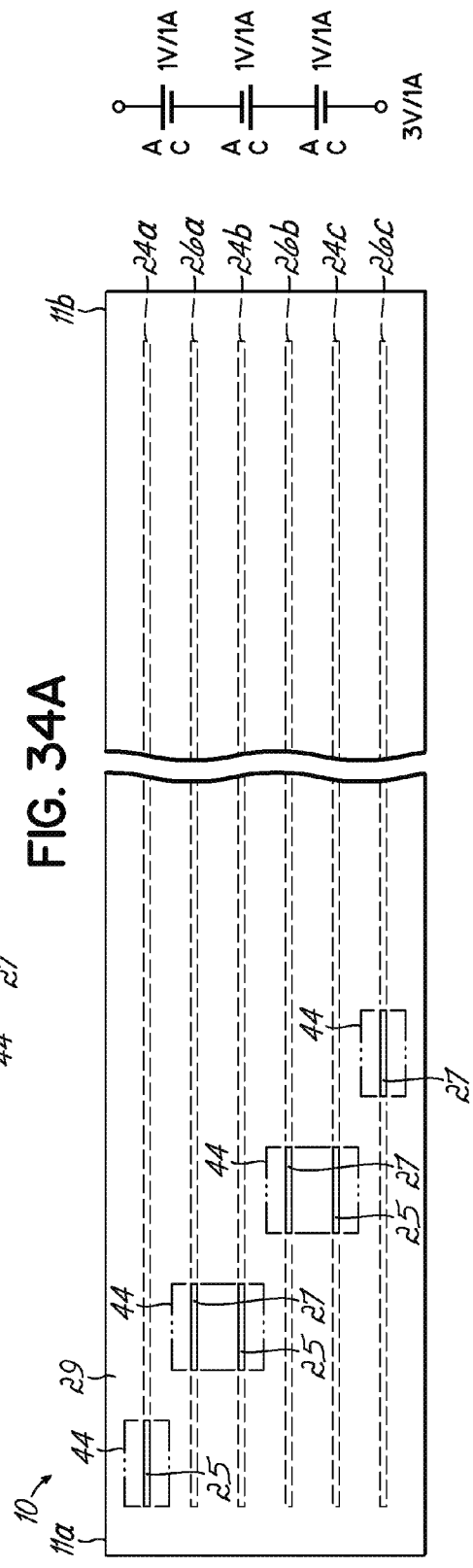

FIGS. 34A and 34B depict in schematic oblique front view and schematic side view, respectively, an embodiment of the invention having multiple anodes and cathodes interconnected externally in series.

Figure 35:
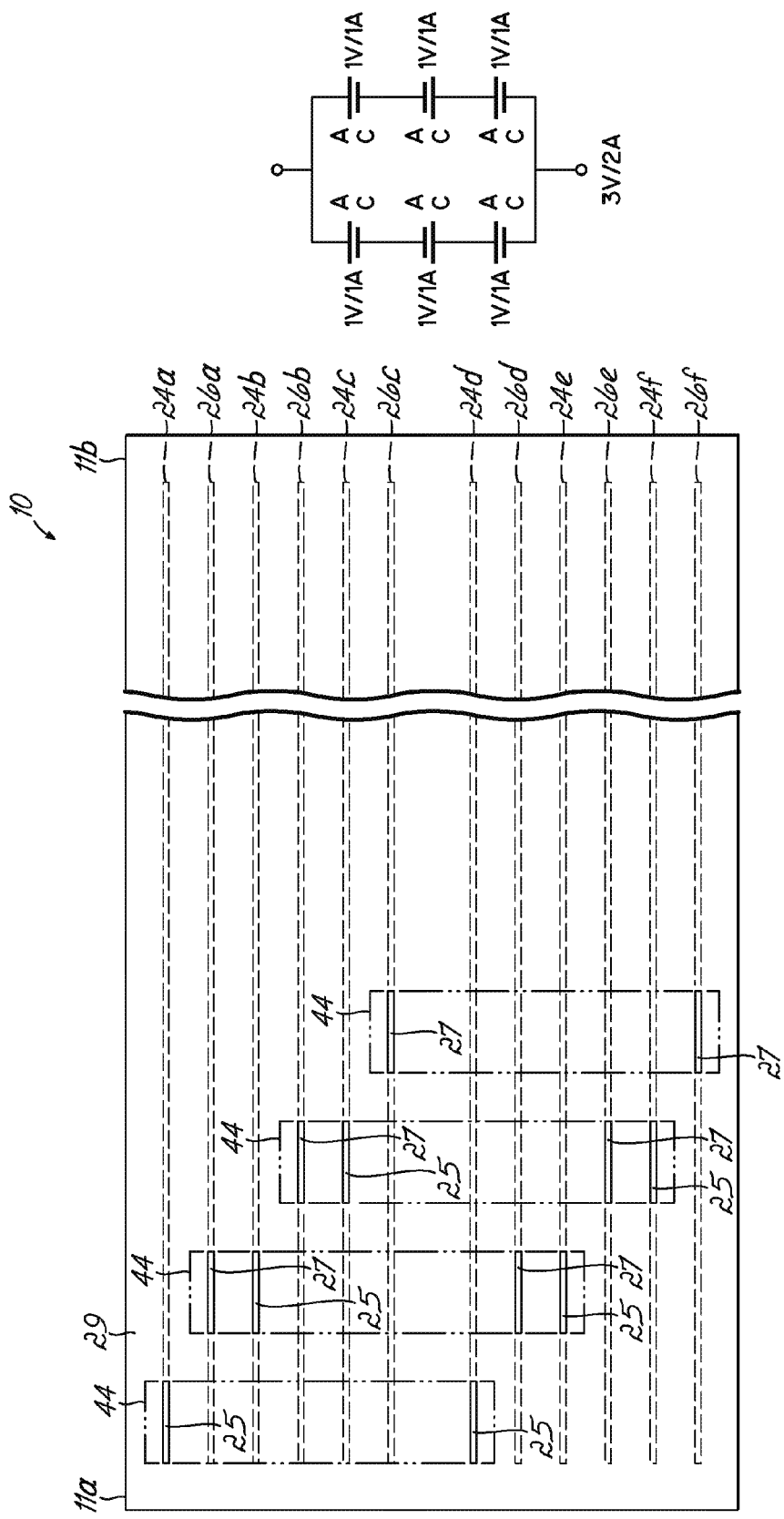

FIG. 35 depicts in schematic side view the structure of FIG. 34B doubled with the two structures connected externally by metal stripes to provide a series-parallel design.

Figure 36A:
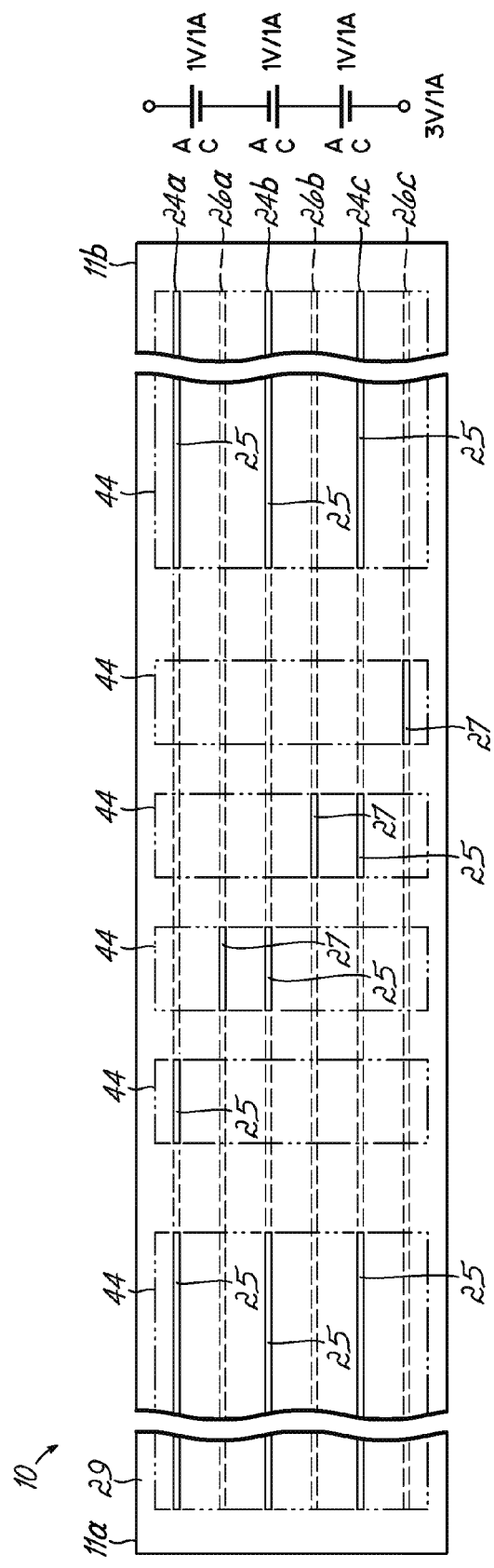
Figure 36B:
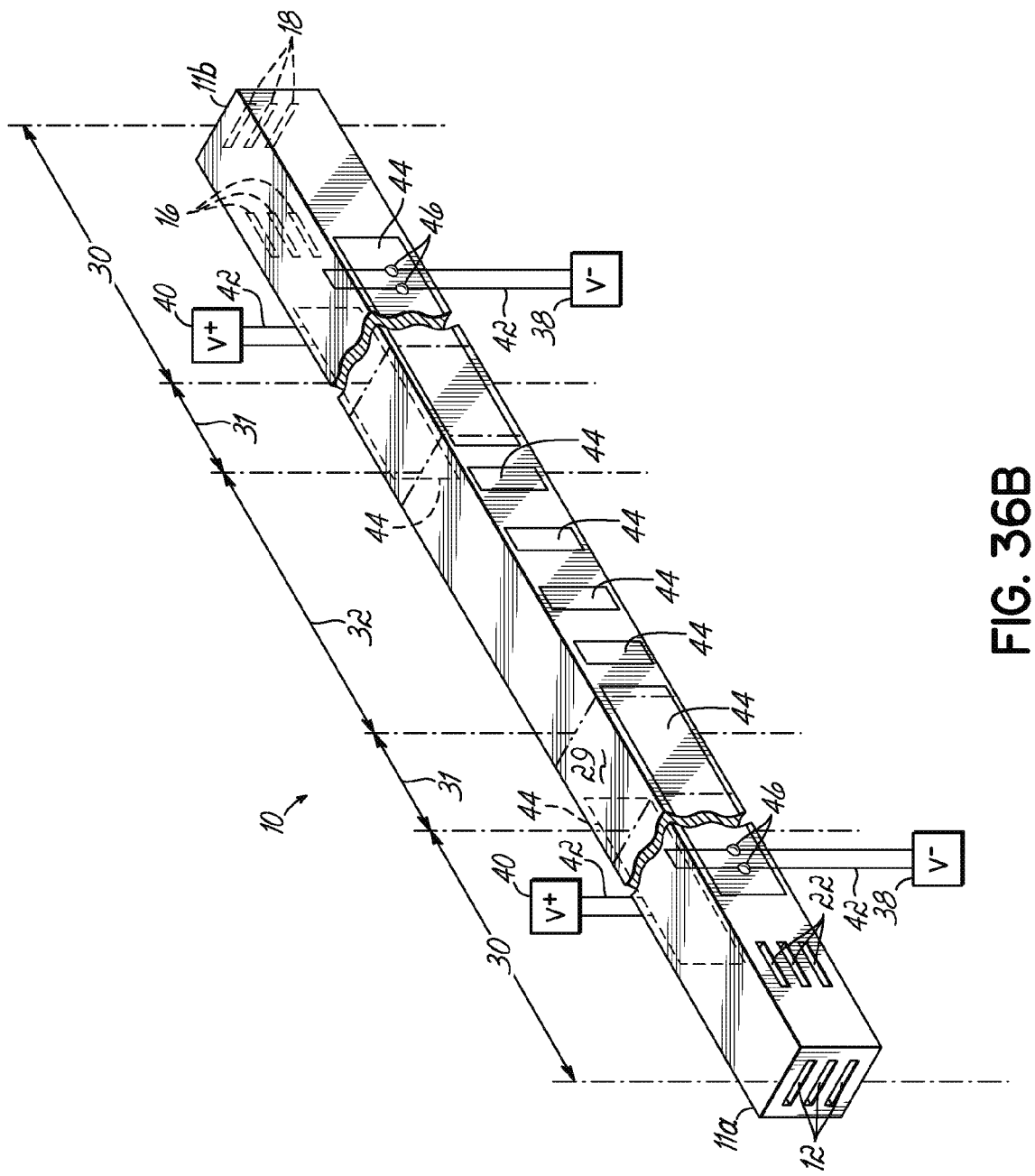

FIGS. 36A and 36B depict in schematic side view and perspective view another embodiment of the invention including metal stripes to connect anodes and cathodes in series and/or parallel in the hot zone and long metal stripes extending from the hot zone to the cold zone for making low temperature connection in the cold zones to the positive and negative voltage nodes.

Figure 37:
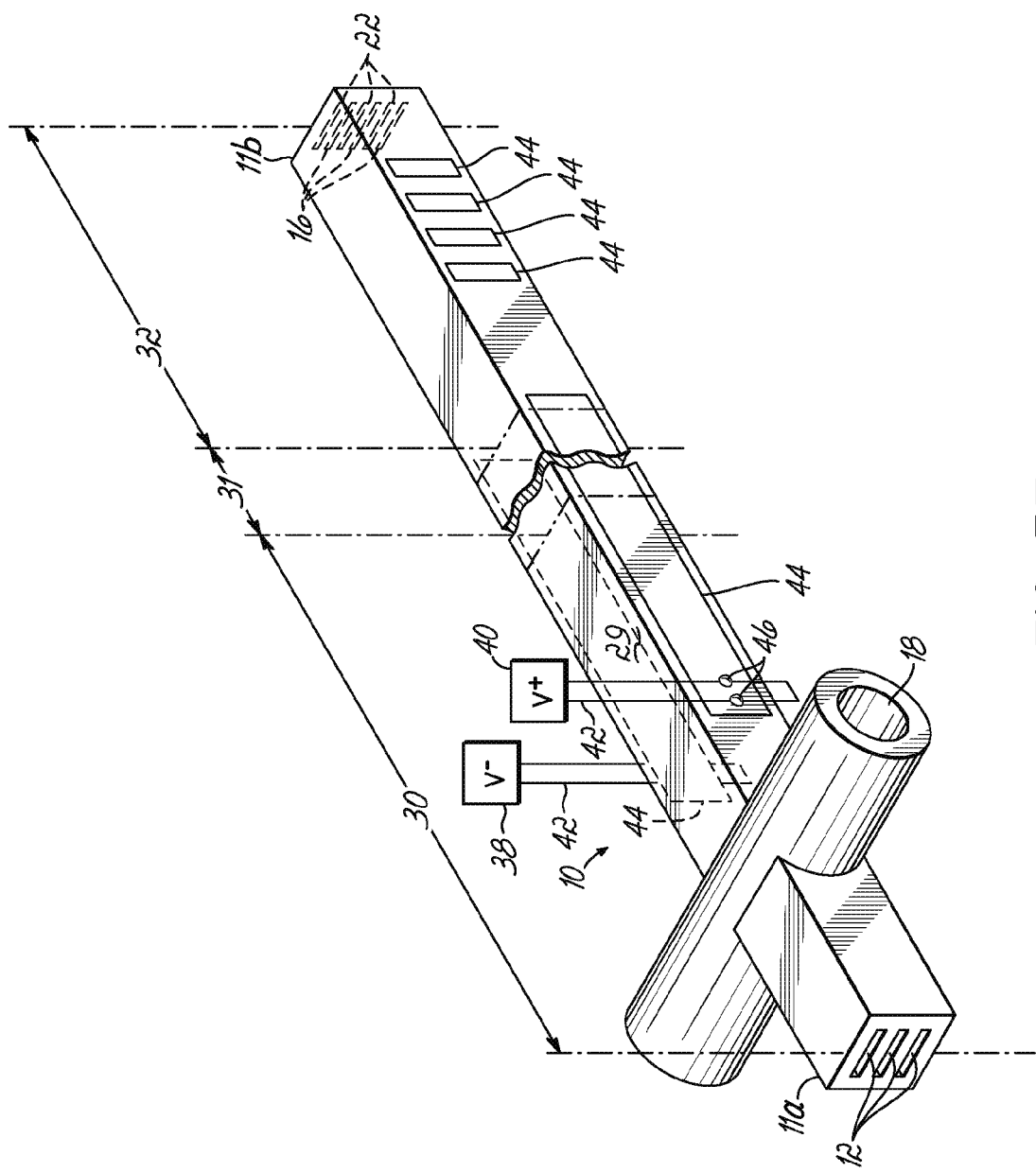

FIG. 37 depicts in schematic isometric view an embodiment similar to that of FIG. 36B, but having a single cold zone for the air and fuel supply connections and for the voltage node connection.

FIGS. 38A and 38B depict in schematic cross-sectional side view an embodiment of the invention having multiple exit gaps along the sides of the device for bake-out of organic material used to form passages within the structure.

Figure 39:
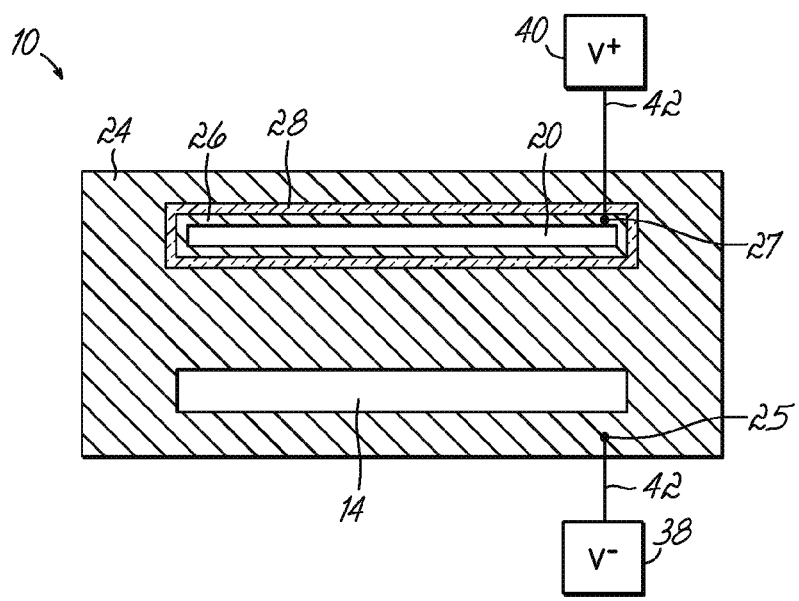

FIG. 39 depicts in schematic cross-sectional end view another embodiment of the invention in which anode material is used as the supporting structure, referred to as an anode-supported version of an SOFC Stick™ device.

Figure 40A:
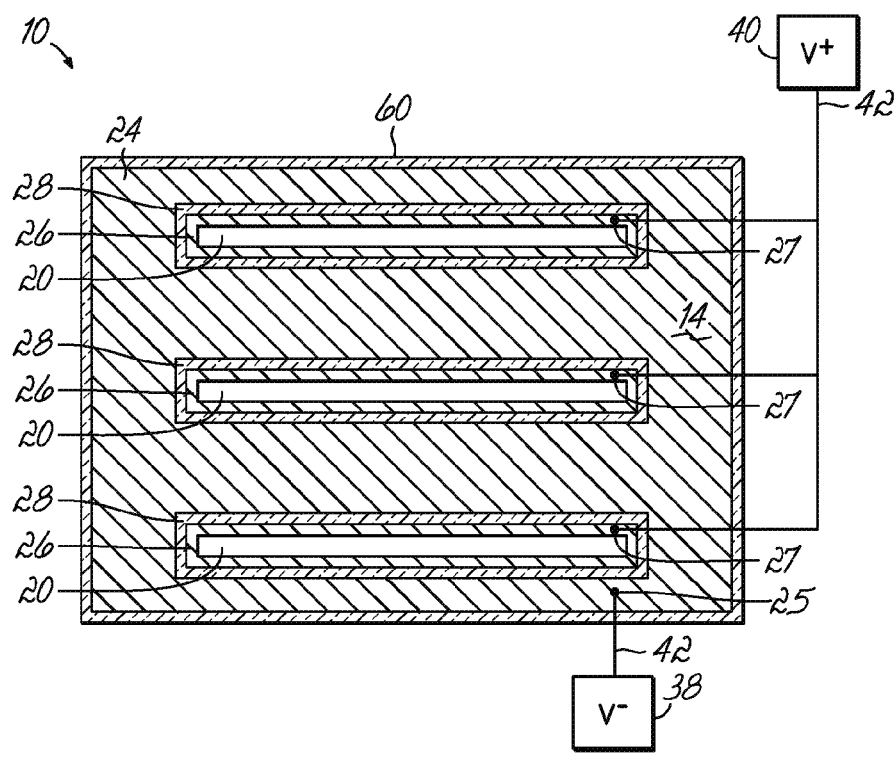
Figure 40B:
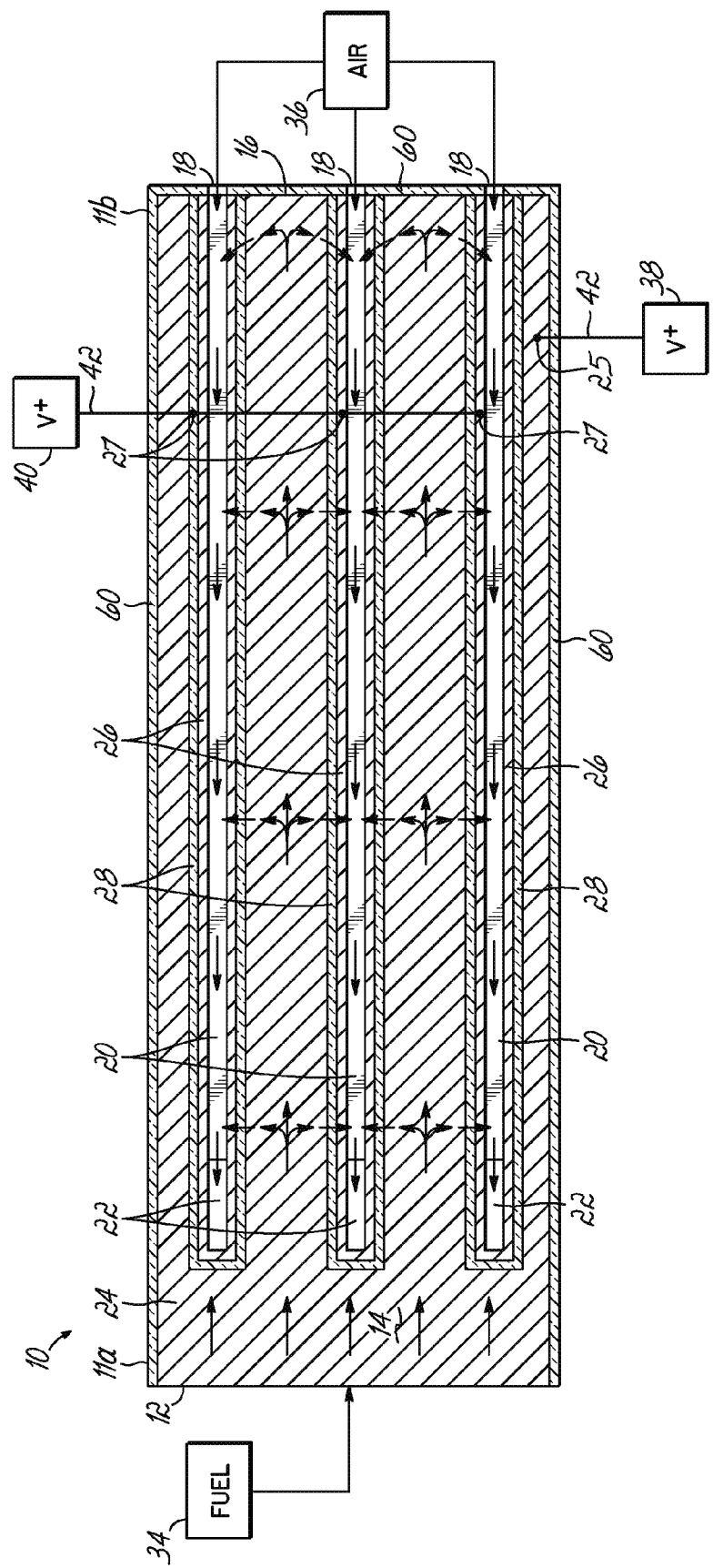

FIGS. 40A and 40B depict in schematic cross-sectional end view and schematic cross-sectional side view, respectively, an anode-supported version according to another embodiment of an SOFC Stick™ device of the invention in which an open fuel passage is eliminated in favor of a porous anode that serves the function of conveying the fuel through the device.

Figure 41A:
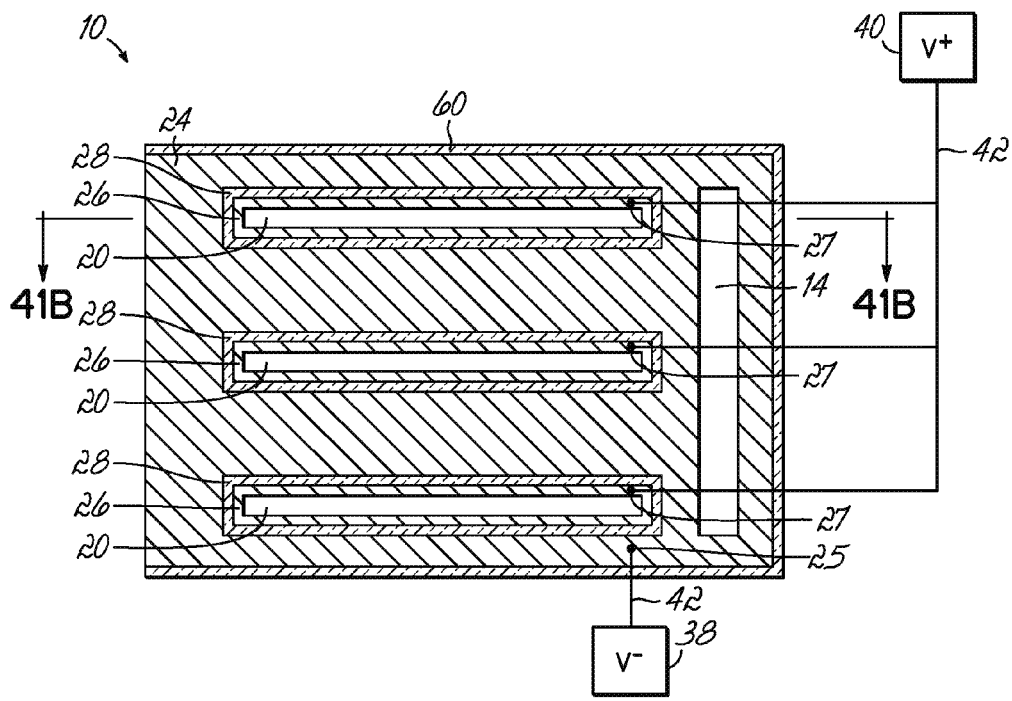
Figure 41B:
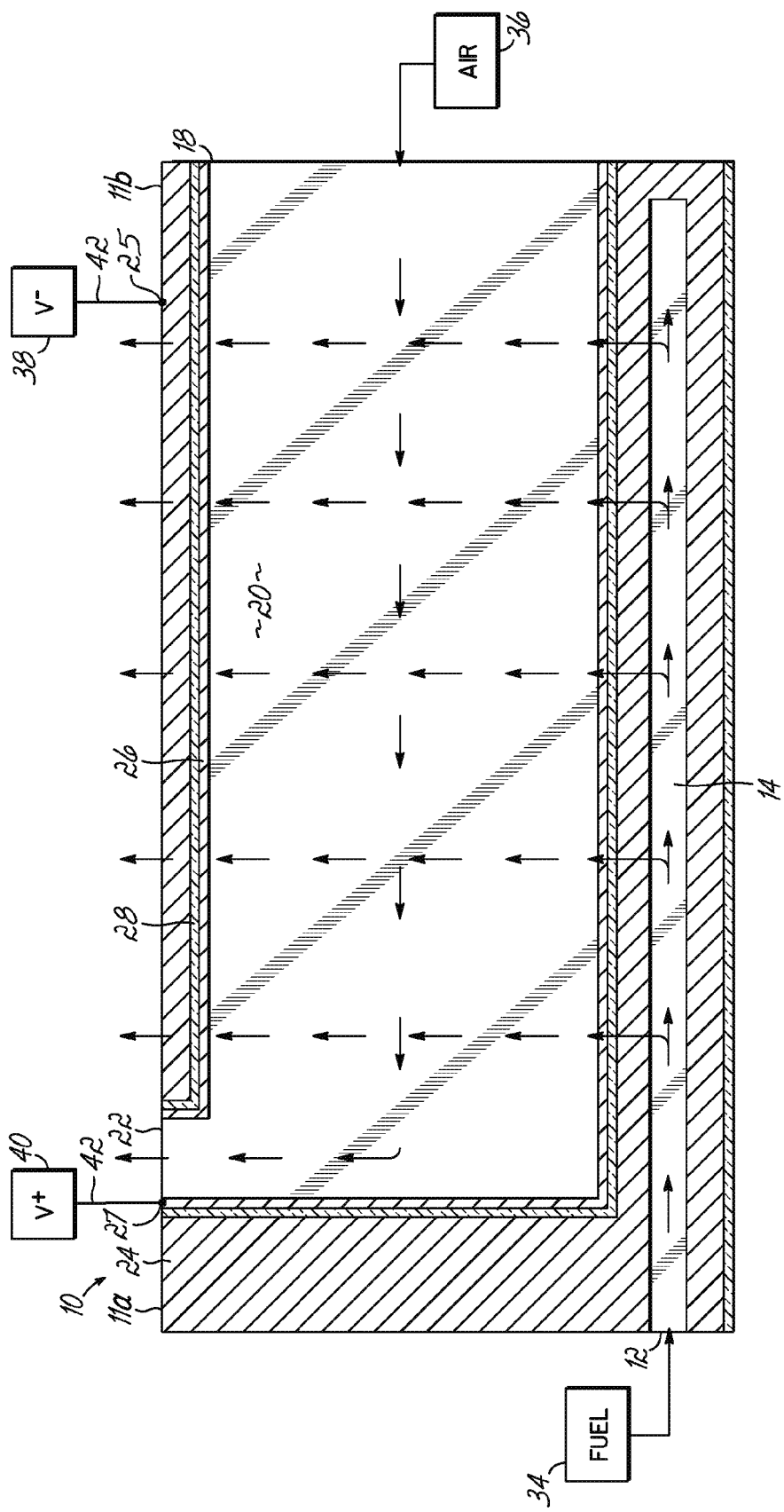

FIGS. 41A and 41B depict in schematic cross-sectional end view and schematic cross-sectional top view, respectively, another embodiment of an anode-supported version of an SOFC Stick™ device of the invention, in which multiple air passages are provided within the anode-supporting structure, and a single fuel passage is provided normal to the multiple air passages.

Figure 42A:
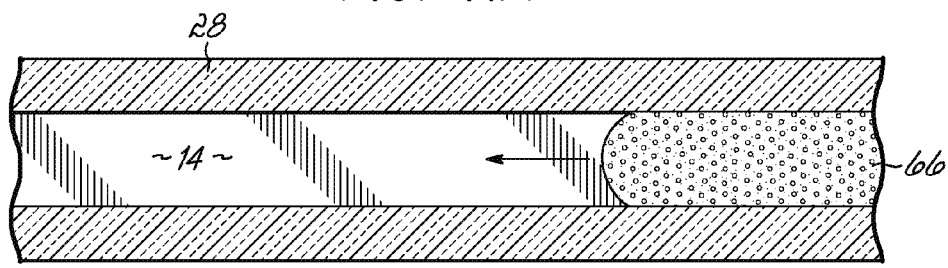
Figure 42B:
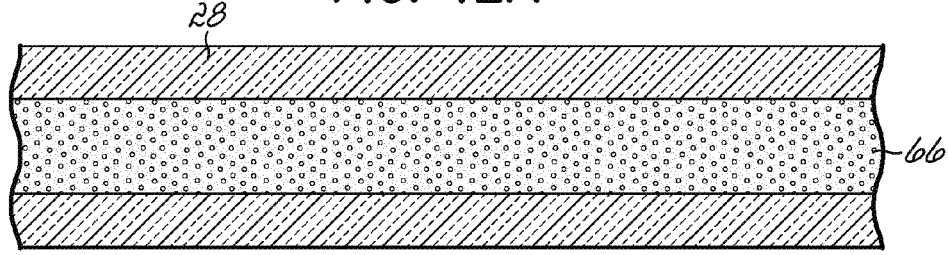
Figure 42C:
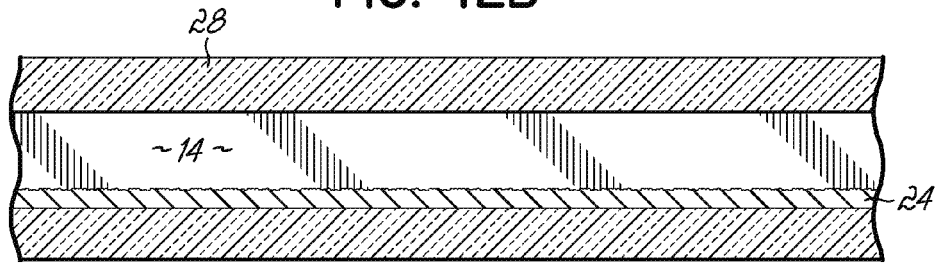

FIGS. 42A-42C depict in schematic cross-sectional view a method for forming an electrode layer in a passage of an SOFC Stick™ device of the invention, according to one embodiment.

Figure 43:
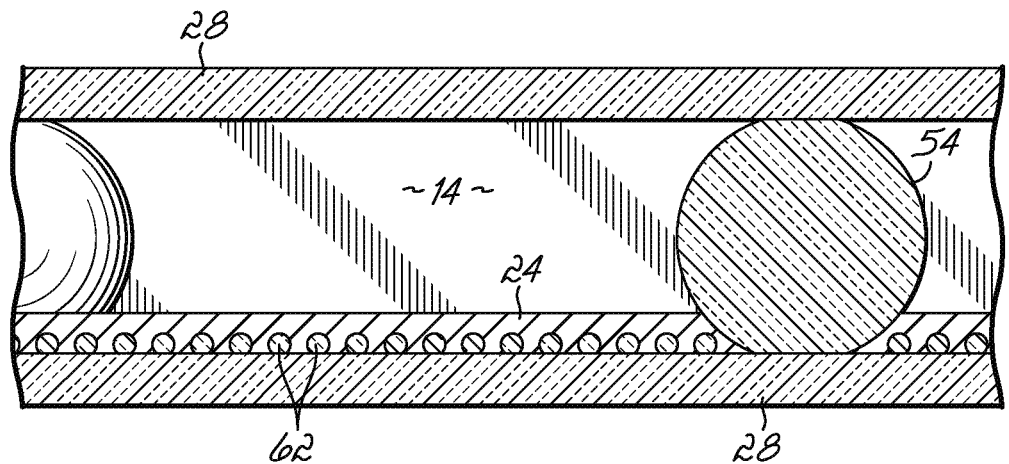

FIG. 43 depicts in schematic cross-sectional side view another embodiment of the invention in which the electrolyte layer is provided with an uneven topography to increase the surface area available to receive an electrode layer.

Figure 44:
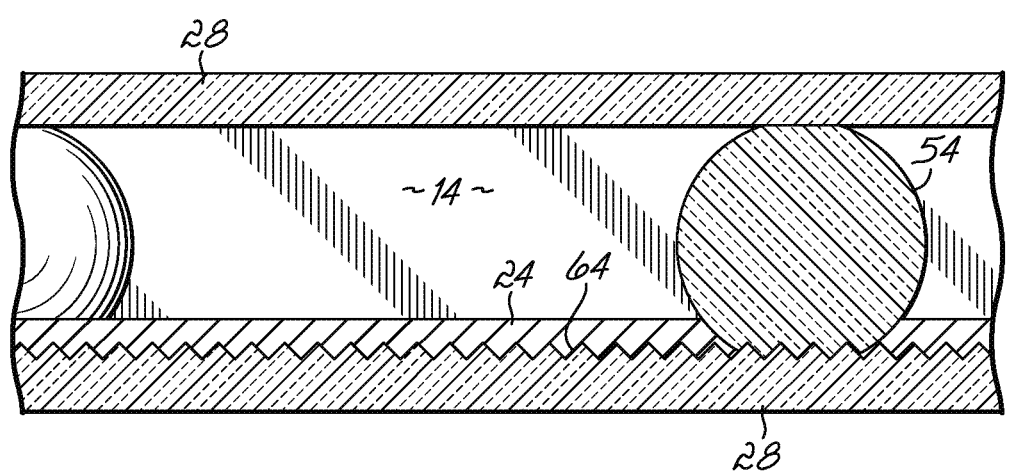

FIG. 44 depicts in schematic cross-sectional side view an alternative embodiment of the invention for providing uneven topography on the electrolyte layer.

Figure 45A:
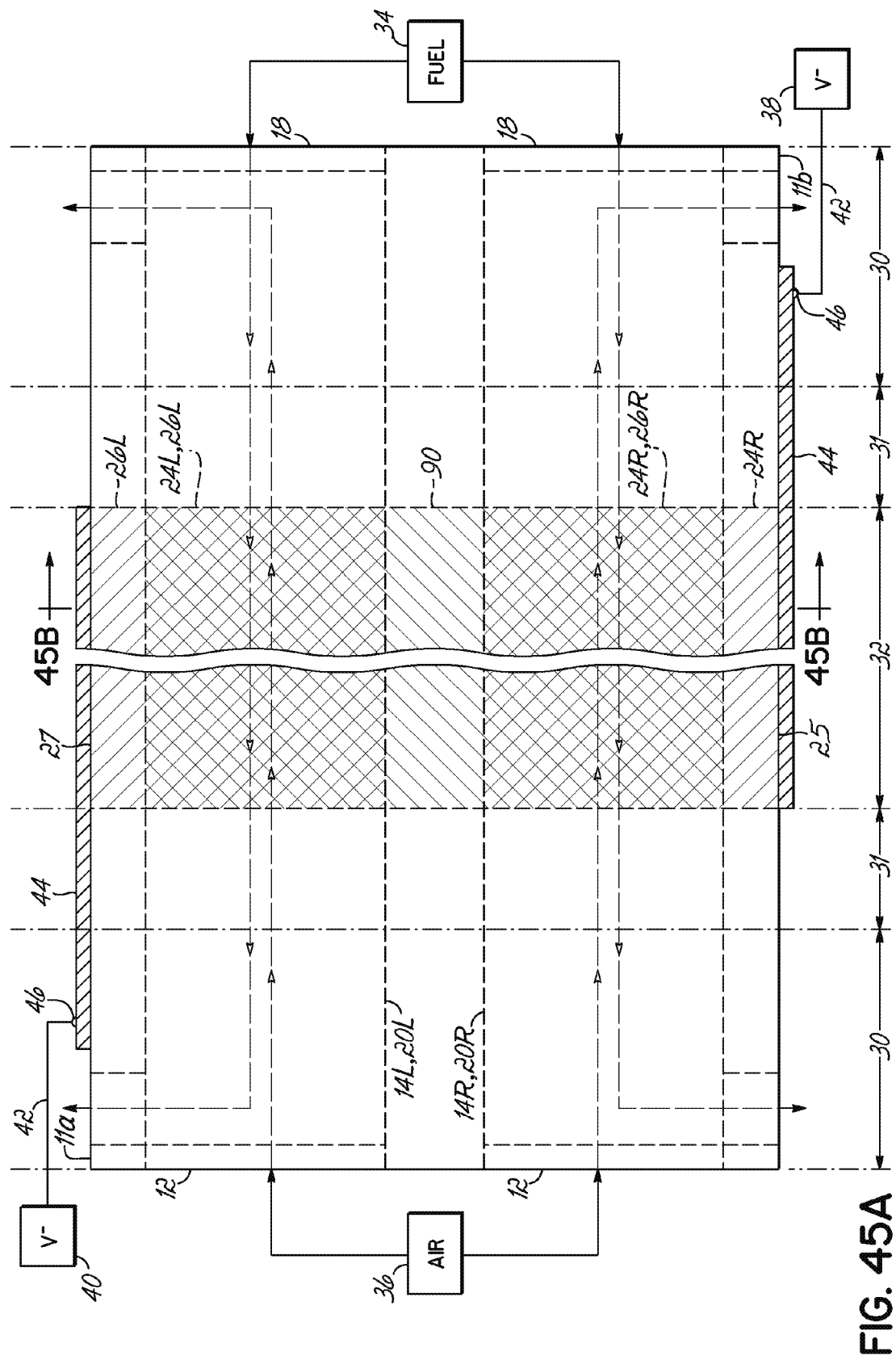
Figure 45B:
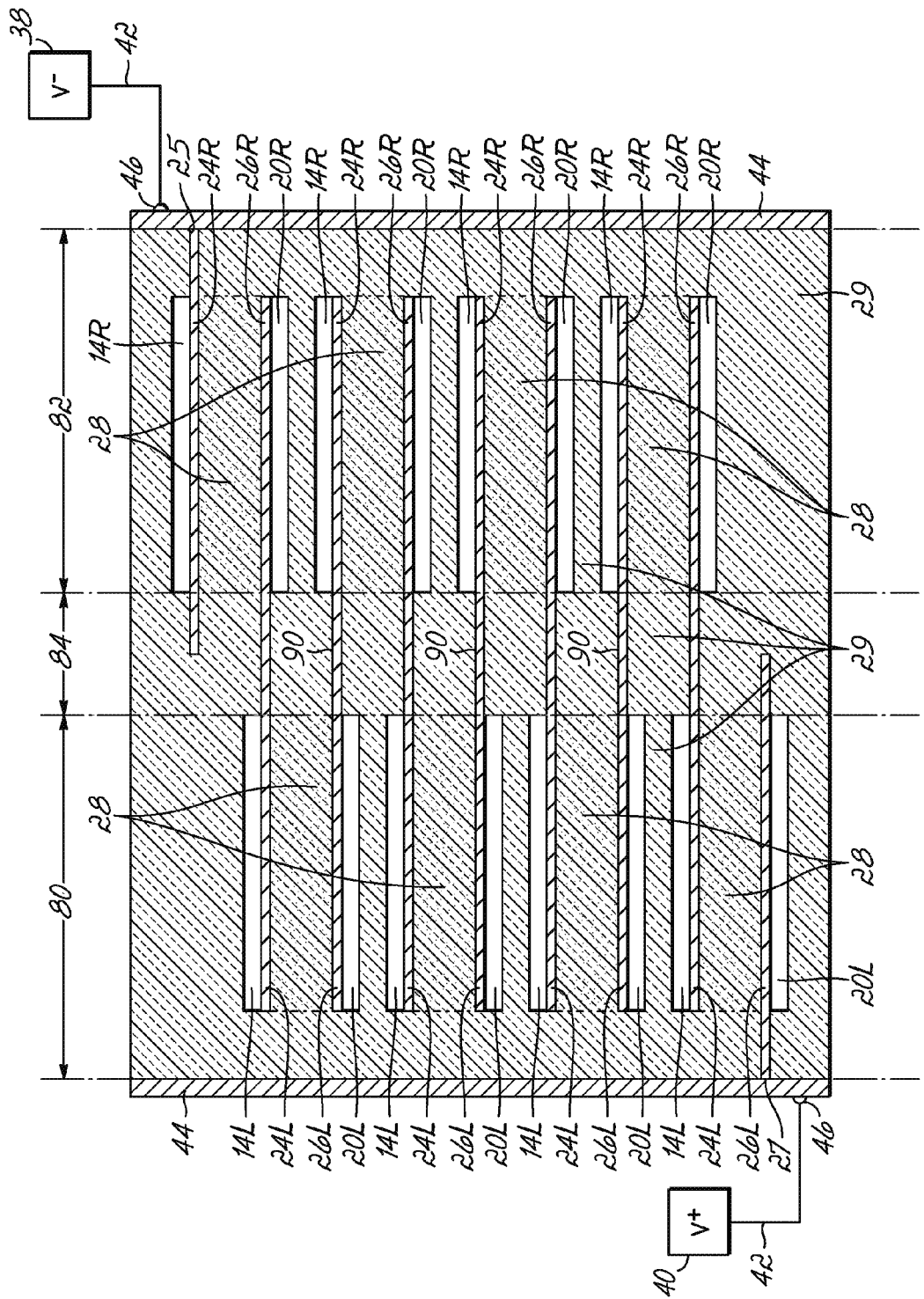

FIG. 45A depicts in schematic top view and FIG. 45B depicts in cross-sectional view through the hot zone an embodiment of an SOFC Stick™ device of the invention having a plurality of fuel cells on each of a left and right side of the device, with a bridging portion therebetween.

Figure 46A:
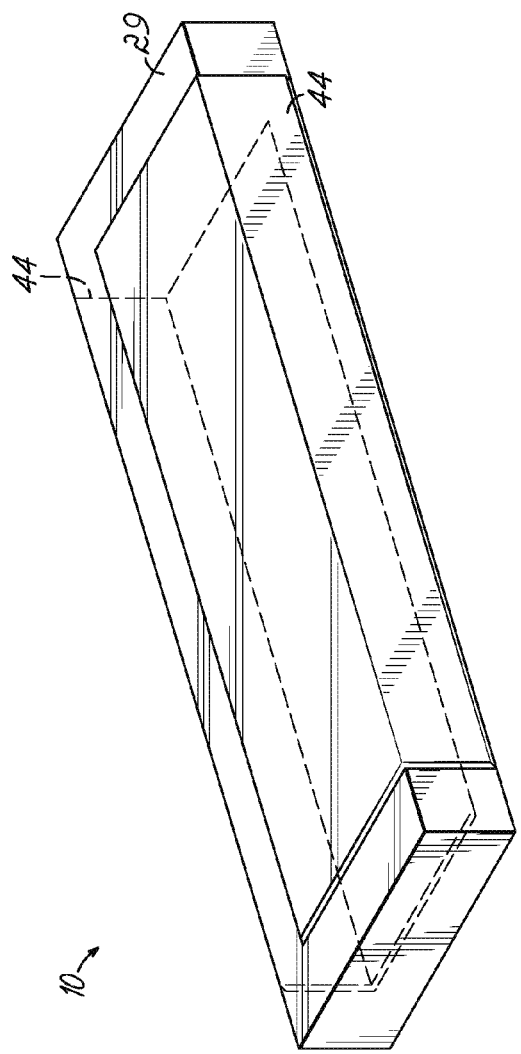
Figure 46B:
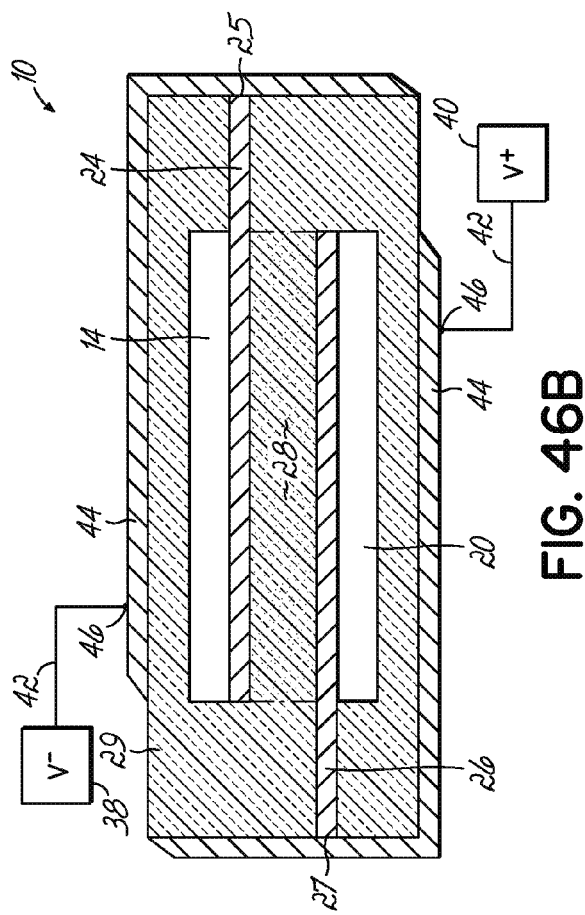

FIGS. 46A and 46B depict in schematic perspective view and schematic cross-sectional view, respectively, another embodiment of an SOFC Stick™ device of the invention having large exterior contact pads to provide a large or wide path of low resistance for electrons to travel to the cold end of the device.

Figure 47:
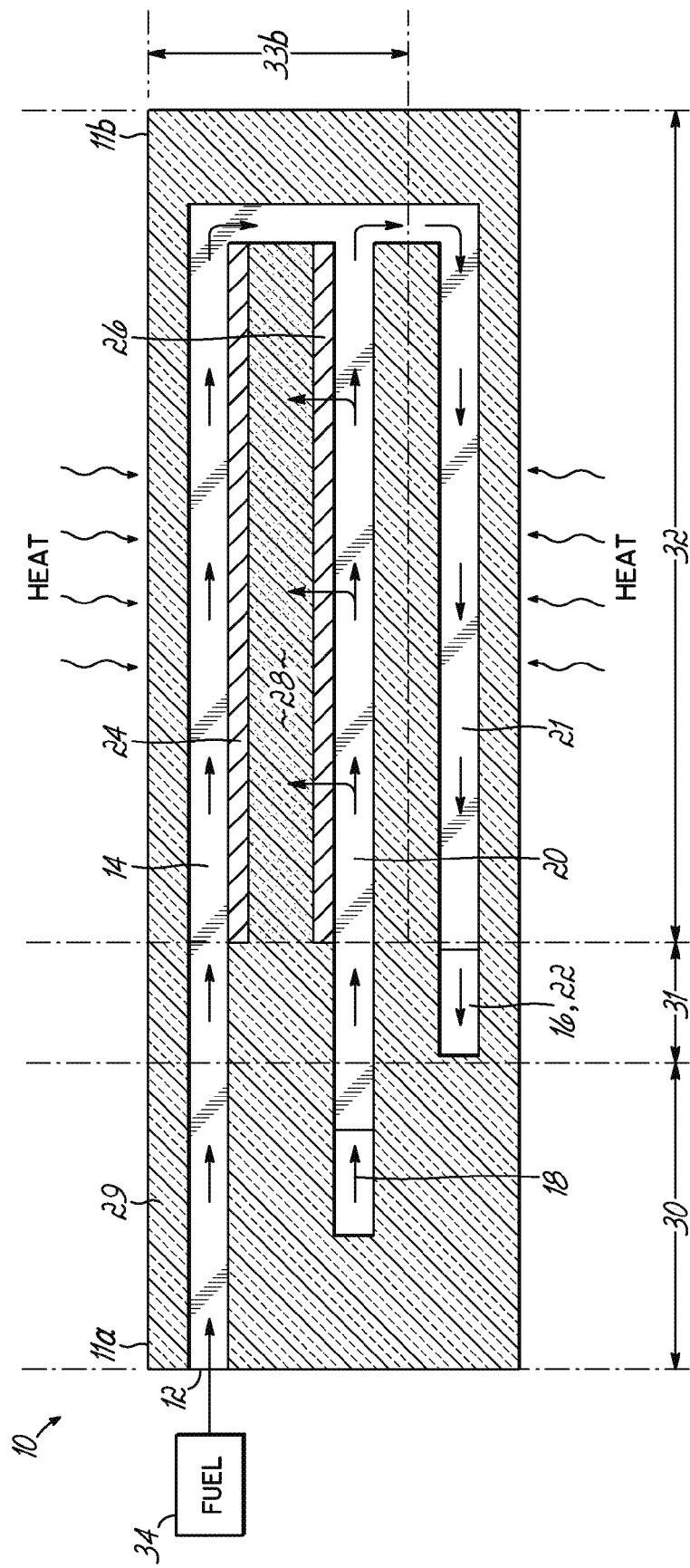

FIG. 47 depicts in schematic cross-sectional side view an SOFC Stick™ device according to another embodiment of the invention having a single exhaust passage for both spent fuel and air.

FIGS. 48A-48C depict an alternative embodiment referred to as an "end-rolled SOFC Stick™ device" having a thick portion and a thin rolled portion, wherein FIG. 48A depicts the unrolled device in perspective view, FIG. 48B depicts the rolled device in cross-sectional side view, and FIG. 48C depicts the rolled device in perspective view.

DETAILED DESCRIPTION

In one embodiment, the invention provides a SOFC device and system in which the fuel port and the air port are made in one monolithic structure. In one embodiment, the SOFC device is an elongate structure, essentially a relatively flat or rectangular stick (and thus, referred to as a SOFC Stick™ device), in which the length is considerably greater than the width or thickness. The SOFC Stick™ devices are capable of having cold ends while the center is hot (cold ends being <300° C.; hot center being >400° C., and most likely >700° C.). Slow heat conduction of ceramic can prevent the hot center from fully heating the colder ends. In addition, the ends are quickly radiating away any heat that arrives there. The invention includes the realization that by having cold ends for connection, it is possible to make easier connection to the anode, cathode, fuel inlet and $H_2O$ $CO_2$ outlet, and air inlet and air outlet. While tubular fuel cell constructions are also capable of having cold ends with a hot center, the prior art does not take advantage of this benefit of ceramic tubes, but instead, places the entire tube in the furnace, or the hot zone, such that high temperature connections have been required. The prior art recognizes the complexity and cost of making high temperature brazed connections for the fuel input, but has not recognized the solution presented herein. The SOFC Stick™ device of the invention is long and skinny so that it has the thermal property advantages discussed above that allow it to be heated in the center and still have cool ends. This makes it structurally sound with temperature, and makes it relatively easy to connect fuel, air and electrodes. The SOFC Stick™device is essentially a stand-alone system, needing only heat, fuel, and air to be added in order to make electricity. The structure is designed so that these things can be readily attached.

The SOFC Stick™ device of the invention is a multi-layer structure and may be made using a multi-layer co-fired approach, which offers several other advantages. First, the device is monolithic, which helps to make it structurally sound. Second, the device lends itself to traditional high volume manufacturing techniques such as those used in MLCC (multi-layer co-fired ceramic) production of capacitor chips. (It is believed that multi-layer capacitor production is the largest volume use of technical ceramics, and the technology is proven for high volume manufacturing.) Third, thin electrolyte layers can be achieved within the structure at no additional cost or complexity. Electrolyte layers of 2 μm thickness are possible using the MLCC approach, whereas it is hard to imagine a SOFC tube with less than a 60 μm electrolyte wall thickness. Hence, the SOFC Stick™ device of the invention can be about 30 times more efficient than a SOFC tube. Finally, the multi-layer SOFC Stick™ devices of the invention could each have many hundreds, or thousands, of layers, which would offer the largest area and greatest density.

Consider the surface area of a SOFC tube of the prior art versus a SOFC Stick™ device of the invention. For example, consider a 0.25" diameter tube versus a 0.25"×0.25" SOFC Stick™ device. In the tube, the circumference is 3.14×D, or 0.785". In the 0.25" SOFC Stick™ device, the usable width of one layer is about 0.2 inch. Therefore, it takes about 4 layers to give the same area as one tube. These figures are dramatically different than those for capacitor technology. The state of the art for Japanese multi-layer capacitors is currently 600 layers of 2 μm thickness. The Japanese will likely soon launch 1000 layer parts in production, and they make them now in the laboratory. These chip capacitors with 600 layers are only 0.060" (1500 μm). Applying this manufacturing technology to a SOFC Stick™ device of the invention, in a 0.25" device having a 2 μm electrolyte thickness and air/fuel passages with respective cathodes/anodes of 10 μm thickness, it would be feasible to produce a single device with 529 layers. That would be the equivalent of 132 tubes. Prior art strategies either add more tubes, increase diameter, and/or increase tube length to get more power, with result being very large structures for high power output. The invention, on the other hand, either adds more layers to a single SOFC Stick™ device to get more power and/or uses thinner layers or passages in the device, thereby enabling miniaturization for SOFC technology. Moreover, the benefit in the present invention is a squared effect, just like in capacitors. When the electrolyte layers are made half as thick, the power doubles, and then you can fit more layers in the device so power doubles again.

Another key feature of the invention is that it would be easy to link layers internally to increase the output voltage of the SOFC Stick™ device. Assuming 1 volt per layer, 12 volts output may be obtained by the SOFC Stick™ devices of the invention using via holes to link groups of 12 together. After that, further connections may link groups of 12 in parallel to achieve higher current. This can be done with existing methods used in capacitor chip technology. The critical difference is that the invention overcomes the brazing and complex wiring that other technologies must use.

The invention also provides a greater variety of electrode options compared to the prior art. Precious metals will work for both the anodes and cathodes. Silver is cheaper, but for higher temperature, a blend with Pd, Pt, or Au would be needed, with Pd possibly being the lowest priced of the three. Much research has focused on non-precious metal conductors. On the fuel side, attempts have been made to use nickel, but any exposure to oxygen will oxidize the metal at high temperature. Conductive ceramics are also known, and can be used in the invention. In short, the present invention may utilize any sort of anode/cathode/electrolyte system that can be sintered.

In an embodiment of the invention, it is possible that when a large area of 2 μm tape is unsupported, with air/gas on both sides, the layer might become fragile. It is envisioned to leave pillars across the gap. These would look something like pillars in caves where a stalactite and stalagmite meet. They could be spaced evenly and frequently, giving much better strength to the structure.

For attachment of the gas and air supply, it is envisioned that the end temperature is below 300° C., for example, below 150° C., such that high temperature flexible silicone tubes or latex rubber tubes, for example, may be used to attach to the SOFC Stick™ devices. These flexible tubes can simply stretch over the end of the device, and thereby form a seal. These materials are available in the standard McMaster catalog. Silicone is commonly used at 150° C. or above as an oven gasket, without losing its properties. The many silicone or latex rubber tubes of a multi-stick SOFC Stick™ system could be connected to a supply with barb connections.

The anode material or the cathode material, or both electrode materials, may be a metal or alloy. Suitable metals and alloys for anodes and cathodes are known to those of ordinary skill in the art. Alternatively, one or both electrode materials may be an electronically conductive green ceramic, which is also known to those of ordinary skill in the art. For example, the anode material may be a partially sintered metallic nickel coated with yttria-stabilized zirconia, and the cathode material may be a modified lanthanum manganite, which has a perovskite structure.

In another embodiment, one or both of the electrode materials may be a composite of a green ceramic and a conductive metal present in an amount sufficient to render the composite conductive. In general, a ceramic matrix becomes electronically conductive when the metal particles start to touch. The amount of metal sufficient to render the composite matrix conductive will vary depending mainly on the metal particle morphology. For example, the amount of metal will generally need to be higher for spherical powder metal than for metal flakes. In an exemplary embodiment, the composite comprises a matrix of the green ceramic with about 40-90% conductive metal particles dispersed therein. The green ceramic matrix may be the same or different than the green ceramic material used for the electrolyte layer.

In the embodiments in which one or both electrode materials include a ceramic, i.e., the electronically conductive green ceramic or the composite, the green ceramic in the electrode materials and the green ceramic material for the electrolyte may contain cross-linkable organic binders, such that during lamination, the pressure is sufficient to cross-link the organic binder within the layers as well as to link polymer molecular chains between the layers.

Reference will now be made to the drawings in which like numerals are used throughout to refer to like components. Reference numbers used in the Figures are as follows:

| | |
|---|---|
| 10 | SOFC Stick ™ device |
| 11a | First end |
| 11b | Second end |
| 12 | Fuel inlet |
| 13 | Fuel pre-heat chamber |
| 14 | Fuel passage |
| 16 | Fuel outlet |
| 18 | Air inlet |
| 19 | Air pre-heat chamber |
| 20 | Air passage |
| 21 | Exhaust passage |
| 22 | Air outlet |
| 24 | Anode layer |
| 25 | Exposed anode portion |
| 26 | Cathode layer |
| 27 | Exposed cathode portion |
| 28 | Electrolyte layer |
| 29 | Ceramic |
| 30 | Cold zone (or second temperature) |
| 31 | Transition zone |
| 32 | Hot zone (or heated zone or first temperature zone) |
| 33a | Pre-heat zone |
| 33b | Active zone |
| 34 | Fuel supply |
| 36 | Air supply |
| 38 | Negative voltage node |
| 40 | Positive voltage node |
| 42 | Wire |
| 44 | Contact pad |
| 46 | Solder connection |
| 48 | Spring clip |
| 50 | Supply tube |
| 52 | Tie wrap |
| 54 | Ceramic pillars |
| 56 | First via |
| 58 | Second via |
| 60 | Barrier coating |
| 62 | Surface particles |
| 64 | Textured surface layer |
| 66 | Anode suspension |
| 70 | Openings |
| 72 | Organic material |
| 80 | Left side |

-continued

| | |
|---|---|
| 82 | Right side |
| 84 | Bridging portion |
| 90 | Bridge |
| 100 | SOFC Stick ™ device |
| 102 | Elongate section |
| 104 | Large surface area section |
| 106 | Elongate section |
| 200 | Spiral Tubular SOFC Stick ™ device |
| 300 | Concentric Tubular SOFC Stick ™ device |
| 400 | End-rolled SOFC Stick ™ device |
| 402 | Thick portion |
| 404 | Thin portion |

FIGS. 1 and 1A depict, in side cross-sectional view and top cross-sectional view, respectively, one embodiment of a basic SOFC Stick™ device 10 of the invention, having a single anode layer 24, cathode layer 26 and electrolyte layer 28, wherein the device is monolithic. The SOFC Stick™ device 10 includes a fuel inlet 12, a fuel outlet 16 and a fuel passage 14 therebetween. Device 10 further includes an air inlet 18, an air outlet 22 and an air passage 20 therebetween. The fuel passage 14 and the air passage 20 are in an opposing and parallel relation, and the flow of fuel from fuel supply 34 through the fuel passage 14 is in a direction opposite to the flow of air from air supply 36 through air passage 20. The electrolyte layer 28 is disposed between the fuel passage 14 and the air passage 20. The anode layer 24 is disposed between the fuel passage 14 and the electrolyte layer 28. Similarly, the cathode layer 26 is disposed between the air passage 20 and the electrolyte layer 28. The remainder of the SOFC Stick™ device 10 comprises ceramic 29, which may be of the same material as the electrolyte layer 28 or may be a different but compatible ceramic material. The electrolyte layer 28 is considered to be that portion of the ceramic lying between opposing areas of the anode 24 and cathode 26, as indicated by dashed lines. It is in the electrolyte layer 28 that oxygen ions pass from the air passage to the fuel passage. As shown in FIG. 1, $O_2$ from the air supply 36 travels through the air passage 20 and is ionized by the cathode layer 26 to form $2O^-$, which travels through the electrolyte layer 28 and through the anode 24 into the fuel passage 14 where it reacts with fuel, for example, a hydrocarbon, from the fuel supply 34 to first form CO and $H_2$ and then to form $H_2O$ and $CO_2$. While FIG. 1 depicts the reaction using a hydrocarbon as the fuel, the invention is not so limited. Any type of fuel commonly used in SOFCs may be used in the present invention. Fuel supply 34 may be any hydrocarbon source or hydrogen source, for example. Methane ($CH_4$), propane ($C_3H_8$) and butane ($C_4H_{10}$) are examples of hydrocarbon fuels.

For the reaction to occur, heat must be applied to the SOFC Stick™ device 10. In accordance with the invention, the length of the SOFC Stick™ device 10 is long enough that the device can be divided into a hot zone 32 (or heated zone) in the center of the device and cold zones 30 at each end 11a and 11b of the device 10. Between the hot zone 32 and the cold zones 30, a transition zone 31 exists. The hot zone 32 will typically operate above 400° C. In exemplary embodiments, the hot zone 32 will operate at temperatures >600° C., for example >700° C. The cold zones 30 are not exposed to a heat source, and due to the length of the SOFC Stick™ device 10 and the thermal property advantages of the ceramic materials, heat dissipates outside the hot zone, such that the cold zones 30 have a temperature <300° C. It is believed that heat transfer from the hot zone down the length of the ceramic to the end of the cold zone is slow, whereas the heat transfer from the ceramic material outside the heat zone into the air is relatively faster. Thus, most of the heat inputted in the hot zone is lost to the air (mainly in the transition zone) before it can reach the end of the cold zone. In exemplary embodiments of the invention, the cold zones 30 have a temperature <150° C. In a further exemplary embodiment, the cold zones 30 are at room temperature. The transition zones 31 have temperatures between the operating temperature of the hot zone 32 and the temperature of the cold zones 30, and it is within the transition zones 31 that the significant amount of heat dissipation occurs.

Because the dominant coefficient of thermal expansion (CTE) is along the length of the SOFC Stick™ device 10, and is therefore essentially one-dimensional, fast heating of the center is permitted without cracking. In exemplary embodiments, the length of the device 10 is at least 5 times greater than the width and thickness of the device. In further exemplary embodiments, the length of the device 10 is at least 10 times greater than the width and thickness of the device. In yet further exemplary embodiments, the length of the device 10 is at least 15 times greater than the width and thickness of the device. In addition, in exemplary embodiments, the width is greater than the thickness, which provides for greater area. For example, the width may be at least twice the thickness. By way of further example, a 0.2 inches thick SOFC Stick™ device 10 may have a width of 0.5 inch. It may be appreciated that the drawings are not shown to scale, but merely give a general idea of the relative dimensions.

In accordance with the invention, electrical connections to the anode and cathode are made in the cold zones 30 of the SOFC Stick™ device 10. In an exemplary embodiment, the anode 24 and the cathode 26 will each be exposed to an outer surface of the SOFC Stick™ device 10 in a cold zone 30 to allow an electrical connection to be made. A negative voltage node 38 is connected via a wire 42, for example, to the exposed anode portion 25 and a positive voltage node 40 is connected via a wire 42, for example, to the exposed cathode portion 27. Because the SOFC Stick™ device 10 has cold zones 30 at each end 11a, 11b of the device, low temperature rigid electrical connections can be made, which is a significant advantage over the prior art, which generally requires high temperature brazing methods to make the electrical connections.

Figure 2:
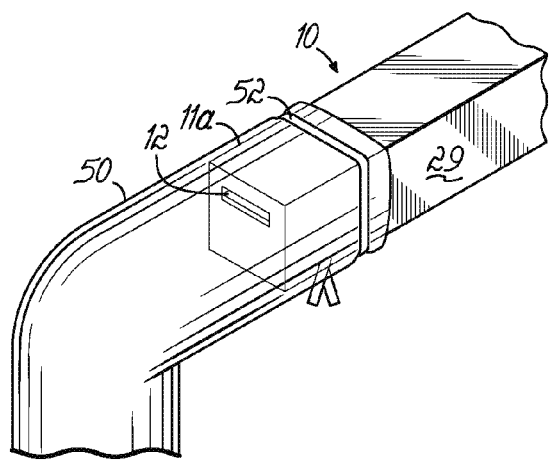
FIG. 2 depicts in perspective view a first end of one embodiment of a SOFC Stick™ device of the invention with a fuel supply tube connected thereto.

FIG. 2 depicts in perspective view a first end 11a of SOFC Stick™ device 10 with a supply tube 50 attached over the end and secured with a tie wrap 52. Fuel from fuel supply 34 will then be fed through the supply tube 50 and into the fuel inlet 12. As a result of first end 11a being in the cold zone 30, flexible plastic tubing or other low temperature type connection material may be used to connect the fuel supply 34 to the fuel inlet 12. The need for high temperature brazing to make the fuel connection is eliminated by the invention.

Figure 3A:
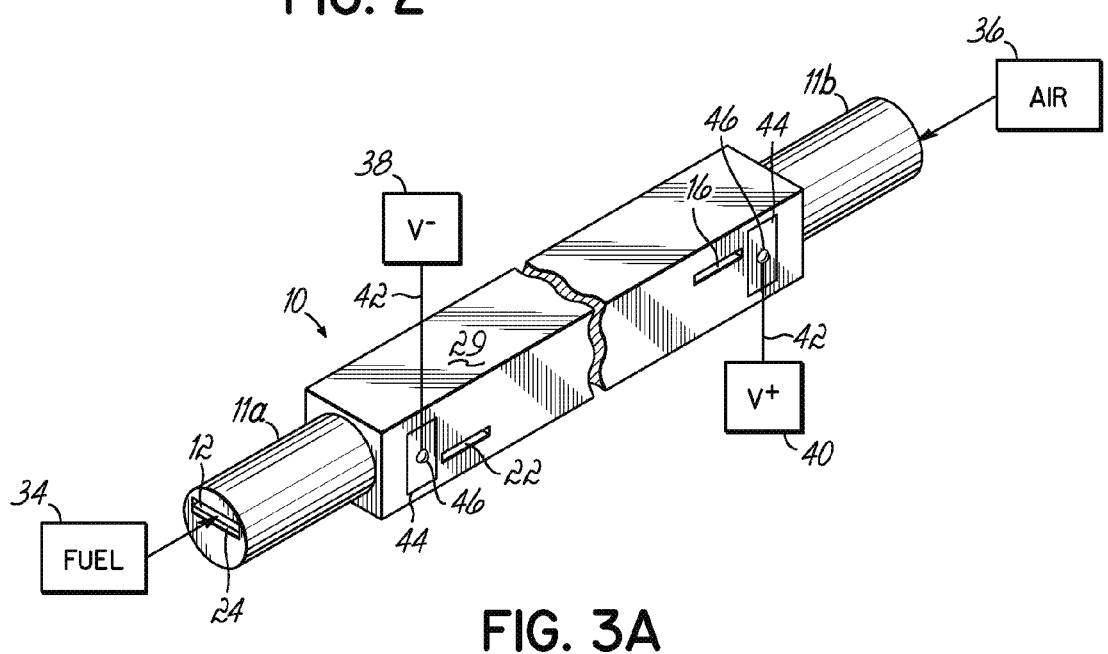
FIG. 3A depicts in perspective view a SOFC Stick™ device according to one embodiment of the invention, but having modified ends.
Figure 3B:
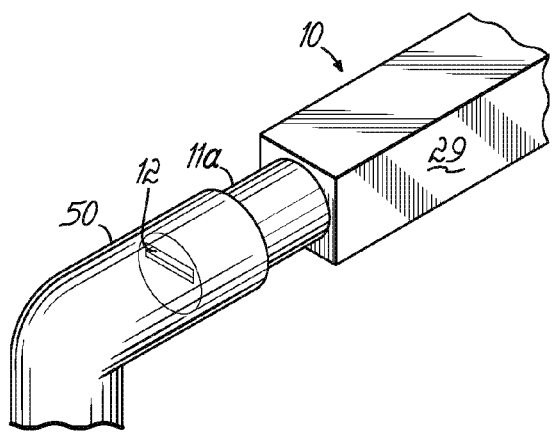
FIG. 3B depicts in perspective view a fuel supply tube connected to one modified end of the device of FIG. 3A.

FIG. 3A depicts in perspective view a SOFC Stick™ device 10 similar to that depicted in FIG. 1, but having modified first and second ends 11a, 11b. Ends 11a, 11b have been machined to form cylindrical end portions to facilitate connection of the fuel supply 34 and air supply 36. FIG. 3B depicts in perspective view a supply tube 50 connected to the first end 11a for feeding fuel from fuel supply 34 to the fuel inlet 12. By way of example, supply tube 50 can be a silicone or latex rubber tube that forms a tight seal by virtue of its elasticity to the first end 11a. It may be appreciated that the flexibility and elasticity of the supply tubes 50 can provide a shock-absorbing holder for the SOFC Stick™ devices when the use is in a mobile device subject to vibrations. In the prior art, the tubes or plates were rigidly brazed, and thus subject to crack failure if used in a dynamic environment. Therefore, the additional function of the supply tubes 50 as vibration dampers offers a unique advantage compared to the prior art.

Referring back to FIG. 3A, contact pads 44 are provided on the outer surface of the SOFC Stick™ device 10 so as to make contact with the exposed anode portion 25 and the exposed cathode portion 27. Material for the contact pads 44 should be electrically conductive so as to electrically connect the voltage nodes 38, 40 to their respective anode 24 and cathode 26. It may be appreciated that any suitable method may be used for forming the contact pads 44. For example, metal pads may be printed onto the outer surface of a sintered SOFC Stick™ device 10. The wires 42 are secured to the contact pads 44 by a solder connection 46, for example, to establish a reliable connection. Solders are a low temperature material, which can be used by virtue of being located in the cold zones 30 of the SOFC Stick™ device 10. For example, a common 10Sn88Pb2Ag solder can be used. The present invention eliminates the need for high temperature voltage connections, thereby expanding the possibilities to any low temperature connection material or means.

Also depicted in FIG. 3A, in perspective view, are the fuel outlet 16 and the air outlet 22. The fuel enters through the fuel inlet 12 at first end 11a, which is in one cold zone 30, and exits out the side of SOFC Stick™ device 10 through outlet 16 adjacent the second end 11b. Air enters through air inlet 18 located in the second end 11b, which is in the cold zone 30, and exits from the air outlet 22 in the side of the SOFC Stick™ device 10 adjacent the first end 11a. While the outlets 16 and 22 are depicted as being on the same side of the SOFC Stick™ device 10, it may be appreciated that they may be positioned at opposing sides, for example, as depicted below in FIG. 4A.

By having air outlet 22 close to fuel inlet 12 (and similarly fuel outlet 16 close to air inlet 18), and through the close proximity of the overlapping layers (anode, cathode, electrolyte), the air outlet 22 functions as a heat exchanger, usefully pre-heating the fuel that enters the device 10 through fuel inlet 12 (and similarly, fuel outlet 16 pre-heats air entering through air inlet 18). Heat exchangers improve the efficiency of the system. The transition zones have overlapping areas of spent air and fresh fuel (and spent fuel and fresh air), such that heat is transferred before the fresh fuel (fresh air) reaches the hot zone. Thus, the SOFC Stick™ device 10 of the invention is a monolithic structure that includes a built-in heat exchanger.

With respect to FIG. 4A, there is depicted in perspective view the connection of a plurality of SOFC Stick™ devices 10, in this case two SOFC Stick™ devices, by aligning each contact pad 44 connected to the exposed anode portions 25 and soldering (at 46) a wire 42 connected to the negative voltage node 38 to each of the contact pads 44. Similarly, the contact pads 44 that are connected to the exposed cathode portions 27 are aligned and a wire 42 connecting the positive voltage node 40 is soldered (at 46) to each of those aligned contact pads 44, as shown partially in phantom. As may be appreciated, because the connection is in the cold zone 30, and is a relatively simple connection, if one SOFC Stick™ device 10 in a multi-SOFC Stick™ system or assembly needs replacing, it is only necessary to break the solder connections to that one device 10, replace the device with a new device 10, and re-solder the wires 42 to the contact pads of the new SOFC Stick™ device 10.

FIG. 4B depicts in an end view the connection between multiple SOFC Stick™ devices 10, where each SOFC Stick™ device 10 includes a plurality of anodes and cathodes. For example, the specific embodiment depicted in FIG. 4B includes three sets of opposing anodes 24 and cathodes 26, with each anode 24 exposed at the right side of the SOFC Stick™ device 10 and each cathode exposed at the left side of the SOFC Stick™ device 10. A contact pad is then placed on each side of the SOFC Stick™ device 10 to contact the respective exposed anode portions 25 and exposed cathode portions 27. On the right side, where the anodes 24 are exposed, the negative voltage node 38 is connected to the exposed anode portions 25 by securing wire 42 to the contact pad 44 via a solder connection 46. Similarly, positive voltage node 40 is connected electrically to the exposed cathode portions 27 on the left side of the SOFC Stick™ device 10 by securing wire 42 to contact pad 44 via the solder connection 46. Thus, while FIGS. 1-4A depicted a single anode 24 opposing a single cathode 26, it may be appreciated, as shown in FIG. 4B, that each SOFC Stick™ device 10 may include multiple anodes 24 and cathodes 26, with each being exposed to an outer surface of the SOFC Stick™ device 10 for electrical connection by means of a contact pad 44 applied to the outer surface for connection to the respective voltage node 38 or 40. The number of opposing anodes and cathodes in the structure may be tens, hundreds and even thousands.

FIG. 5 depicts in an end view a mechanical attachment for making the electrical connection between wire 42 and the contact pad 44. In this embodiment, the SOFC Stick™ devices 10 are oriented such that one set of electrodes is exposed at the top surface of each SOFC Stick™ device 10. The contact pad 44 has been applied to each top surface at one end (e.g., 11a or 11b) in the cold zone 30. Spring clips 48 may then be used to removably secure the wire 42 to the contact pads 44. Thus, metallurgical bonding may be used to make the electrical connections, such as depicted in FIGS. 3A, 4A and 4B, or mechanical connection means may be used, as depicted in FIG. 5. The flexibility in selecting an appropriate attachment means is enabled by virtue of the cold zones 30 in the SOFC Stick™ devices of the invention. Use of spring clips or other mechanical attachment means further simplifies the process of replacing a single SOFC Stick™ device 10 in a multi-stick assembly.

Figure 6A:
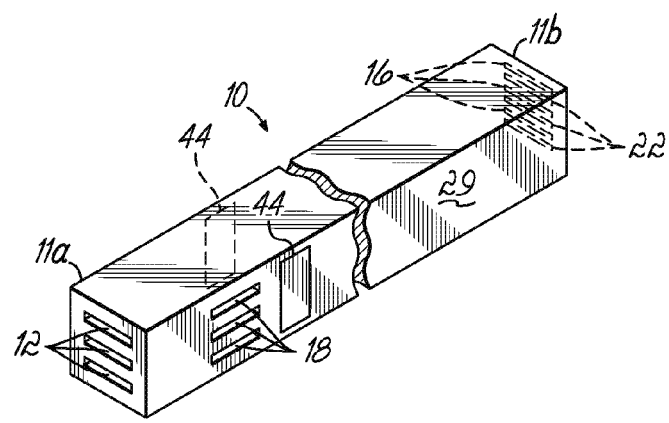
FIGS. 6A and 6B depict in perspective views an alternative embodiment having a single cold zone at one end of a SOFC Stick™ device to which fuel and air supply tubes are attached, with the other end being in the hot zone.
Figure 6B:
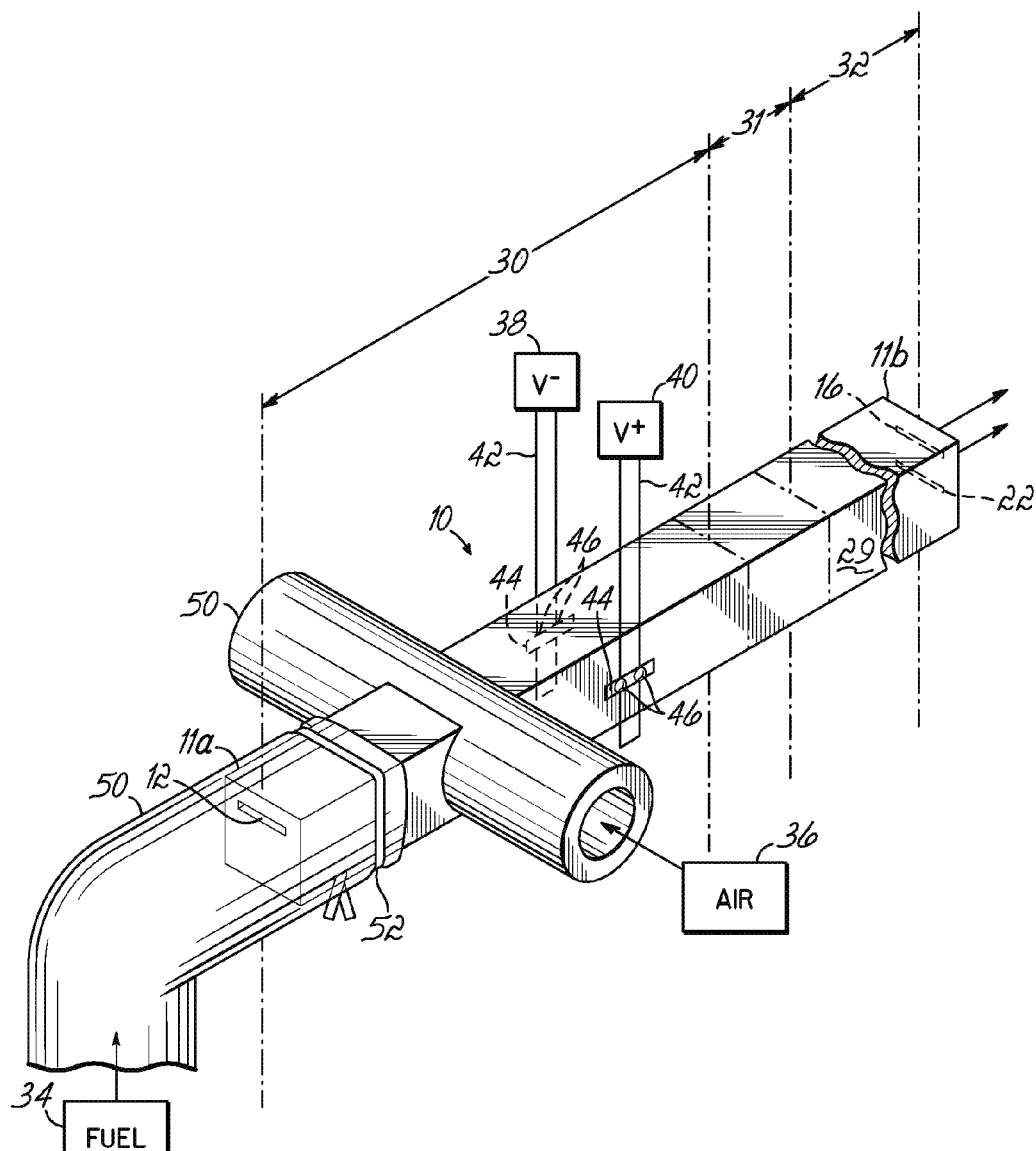

FIGS. 6A and 6B depict in perspective views an alternative embodiment having a single cold zone 30 at the first end 11a of SOFC Stick™ device 10, with the second end 11b being in the hot zone 32. In FIG. 6A, the SOFC Stick™ device 10 includes three fuel cells in parallel, whereas the SOFC Stick™ device 10 of FIG. 6B includes a single fuel cell. Thus, embodiments of the invention may include a single cell design or a multi-cell design. To enable the single end input of both the fuel and the air, the air inlet 18 is reoriented to be adjacent the first end 11a at the side surface of the SOFC Stick™ device 10. The air passage 20 (not shown) again runs parallel to the fuel passage 14, but in this embodiment, the flow of air is in the same direction as the flow of fuel through the length of the SOFC Stick™ device 10. At the second end 11b of the device 10, the air outlet 22 is positioned adjacent the fuel outlet 16. It may be appreciated that either the fuel outlet 16 or the air outlet 22, or both, can exit from a side surface of the SOFC Stick™ device 10, rather than both exiting at the end surface.

As depicted in FIG. 6B, the supply tube 50 for the air supply 36 is formed by making holes through the side of the supply tube 50 and sliding the device 10 through the side holes so that the supply tube 50 for the air supply 36 is perpendicular to the supply tube 50 for the fuel supply 34. Again, a silicone rubber tube or the like may be used in this embodiment. A bonding material may be applied around the joint between the tube 50 and the device 10 to form a seal. The electrical connections are also made adjacent the first end 11a in the cold zone 30. FIGS. 6A and 6B each depict the positive voltage connection being made on one side of the SOFC Stick™ device 10 and the negative voltage connection being made on the opposing side of the SOFC Stick™ device 10. However, it may be appreciated that the invention is not so limited. An advantage of the single end input SOFC Stick™ device 10 is that there is only one cold-to-hot transition instead of two transition zones 31, such that the SOFC Stick™ could be made shorter.

Figure 7B:
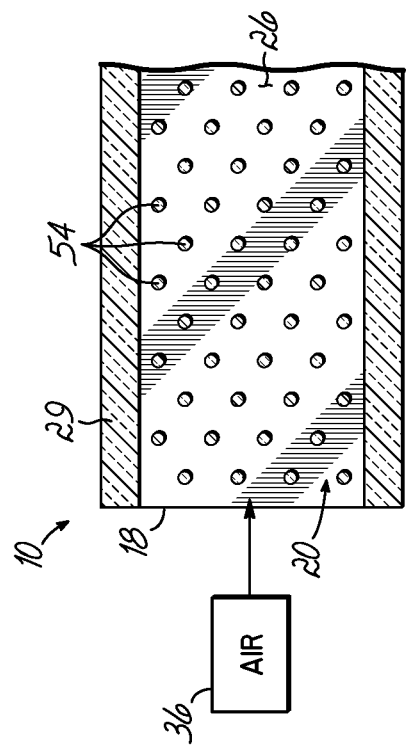
FIGS. 7A and 7B are cross-sectional side and top views, respectively, illustrating a plurality of support pillars in the air and fuel passages according to one embodiment of the invention.
Figure 7A:
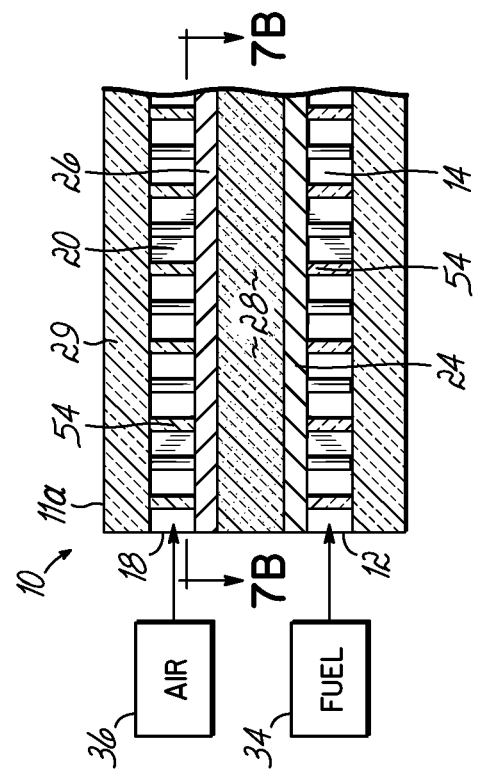

One benefit of the invention is the ability to make the active layers very thin, thereby enabling an SOFC Stick™ to incorporate multiple fuel cells within a single device. The thinner the active layers are, the greater the chance of an air passage 20 or fuel passage 14 caving in during manufacture of the SOFC Stick™ device 10, thereby obstructing flow through the passage. Therefore, in one embodiment of the invention, depicted in FIGS. 7A and 7B, a plurality of ceramic pillars 54 are provided in the passages 14 and 20 to prevent distortion of the electrolyte layer and obstruction of the passages. FIG. 7A is a cross-sectional side view, whereas FIG. 7B is a cross-sectional top view through the air passage 20. According to one method of the invention, using the tape casting method, a sacrificial tape layer may be used, with a plurality of holes formed in the sacrificial layer, such as by means of laser removal of the material. A ceramic material is then used to fill the holes, such as by spreading a ceramic slurry over the sacrificial tape layer to penetrate the holes. After the various layers are assembled together, the sacrificial material of the sacrificial layer is removed, such as by use of a solvent, leaving the ceramic pillars 54 remaining.

Figure 7C:
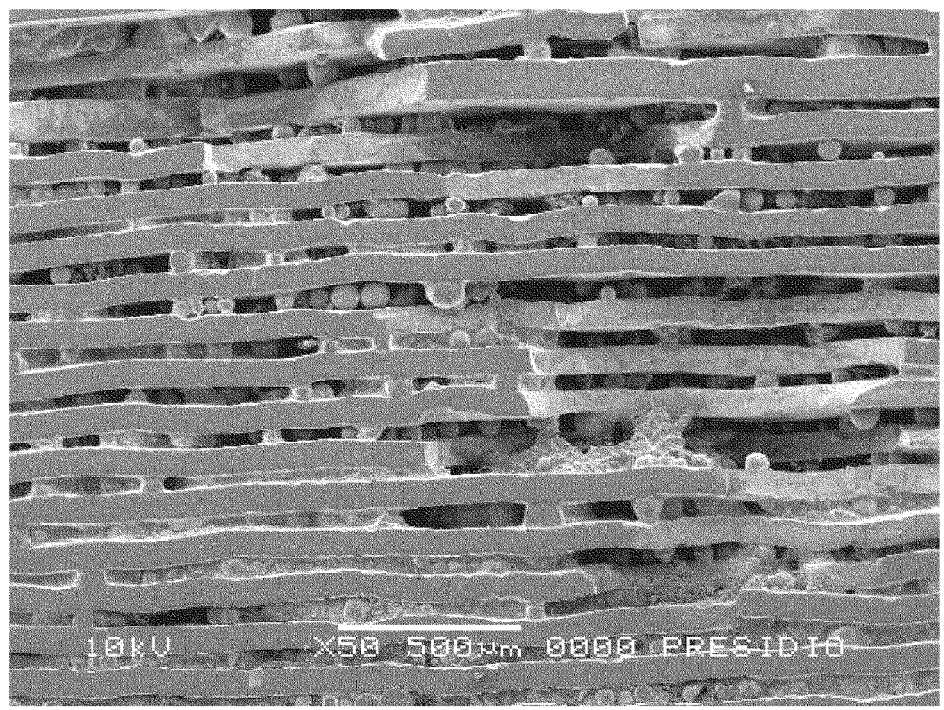
FIGS. 7C and 7D are micrographs depicting the use of spherical balls in the fuel and air passages as the support pillars according to another embodiment of the invention.
Figure 7D:
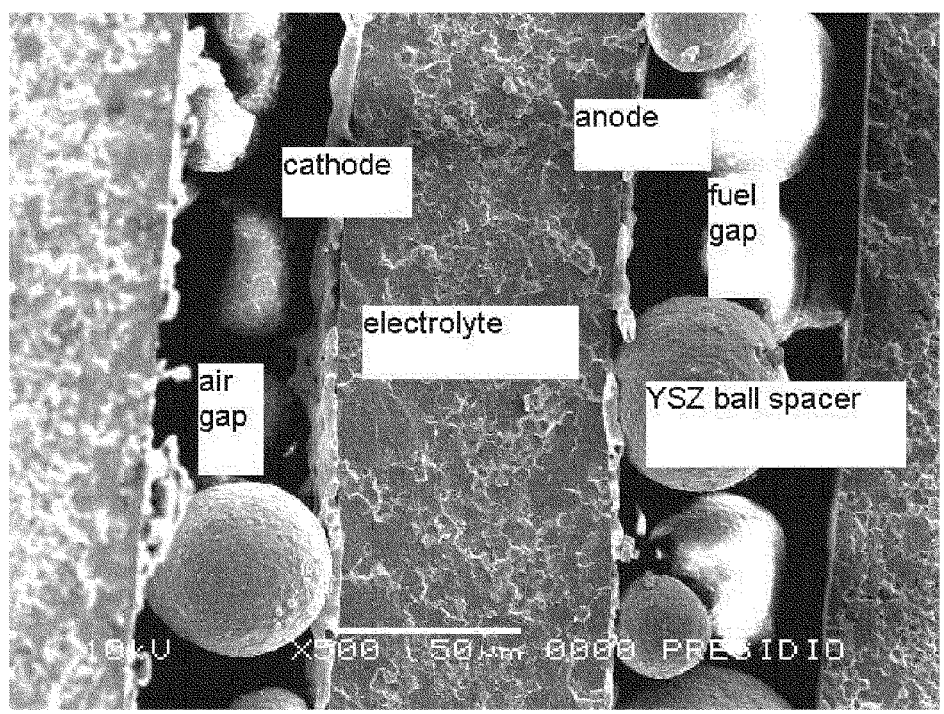

In another embodiment for forming the ceramic pillars 54, large particles of a pre-sintered ceramic can be added to an organic vehicle, such as plastic dissolved in a solvent, and stirred to form a random mixture. By way of example and not limitation, the large particles may be spheres, such as 0.002 in. diameter balls. The random mixture is then applied to the green structure, such as by printing in the areas where the fuel and air passages 14 and 20 are to be located. During the sintering (bake/fire) process, the organic vehicle leaves the structure (e.g. is burned out), thereby forming the passages, and the ceramic particles remain to form the pillars 54 that physically hold open the passages. The resultant structure is shown in the micrographs of FIGS. 7C and 7D. The pillars 54 are randomly positioned, with the average distance being a function of the loading of the ceramic particles in the organic vehicle.

Figure 8A:
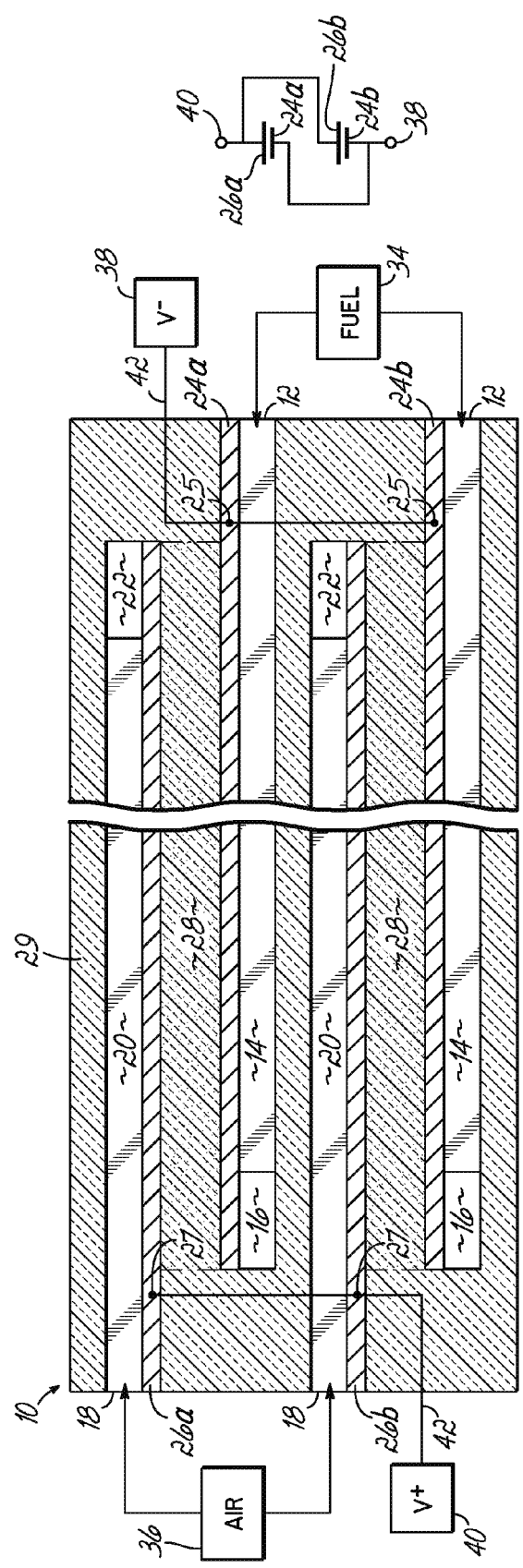
FIG. 8A depicts in cross-section one embodiment of the invention containing two fuel cells connected externally in parallel.

FIG. 8A depicts in cross-section one embodiment of the invention containing two fuel cells in parallel. Each active electrolyte layer 28 has an air passage 20 and cathode layer 26a or 26b on one side and a fuel passage 14 and anode layer 24a or 24b on the opposing side. The air passage 20 of one fuel cell is separated from the fuel passage 14 of the second fuel cell by ceramic material 29. The exposed anode portions 25 are each connected via wire 42 to the negative voltage node 38 and the exposed cathode portions 27 are each connected via a wire 42 to the positive voltage node 40. A single air supply 36 can then be used to supply each of the multiple air passages 20 and a single fuel supply 34 may be used to supply each of the multiple fuel passages 14. The electrical circuit established by this arrangement of the active layers is depicted at the right side of the figure.

Figure 8B:
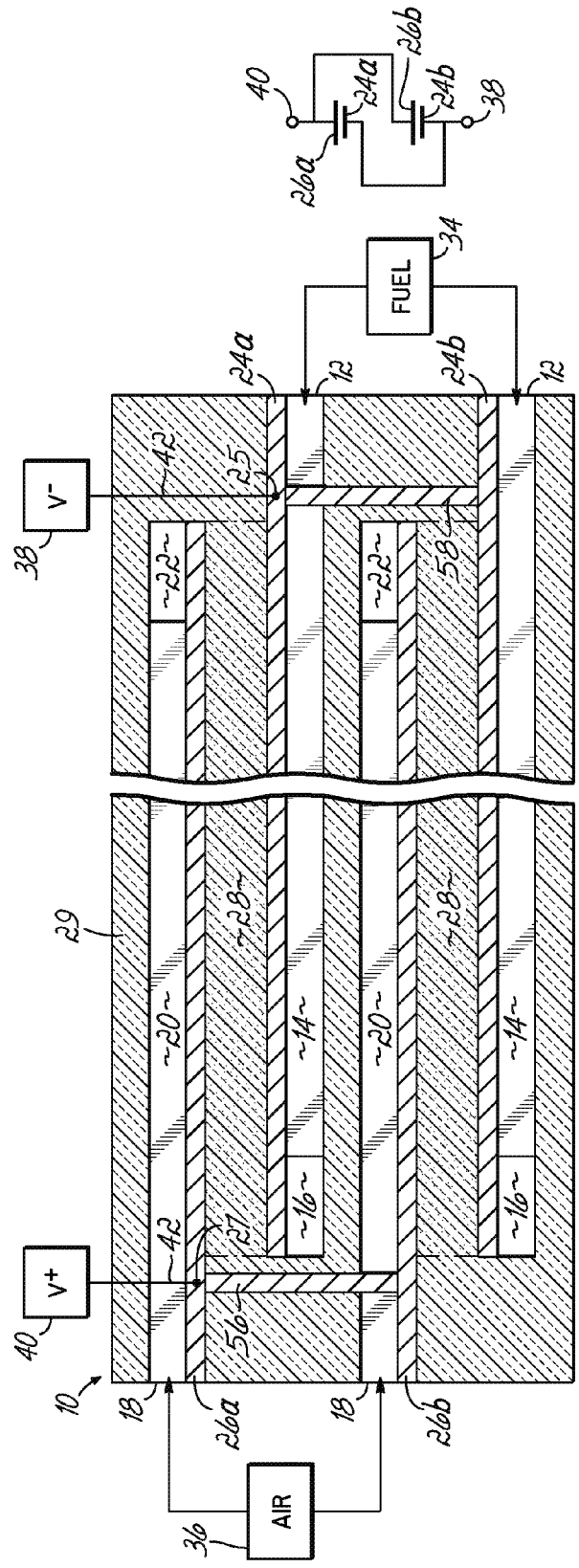
FIG. 8B depicts in cross-sectional view another embodiment of the invention similar to FIG. 8A, but having the two fuel cells connected internally in parallel through the use of vias.

In the cross-sectional view of FIG. 8B, the SOFC Stick™ device 10 is similar to that depicted in FIG. 8A, but instead of having multiple exposed anode portions 25 and multiple exposed cathode portions 27, only anode layer 24a is exposed at 25 and only one cathode layer 26a is exposed at 27. A first via 56 connects cathode layer 26a to cathode layer 26b and a second via 58 connects anode layer 24a to anode layer 24b. By way of example, laser methods may be used during formation of the green layers to create open vias, which are then subsequently filled with electrically conductive material to form the via connections. As shown by the circuit at the right of FIG. 8B, the same electrical path is formed in the SOFC Stick™ device 10 of FIG. 8B as in the SOFC Stick™ device 10 of FIG. 8A.

Figure 9A:
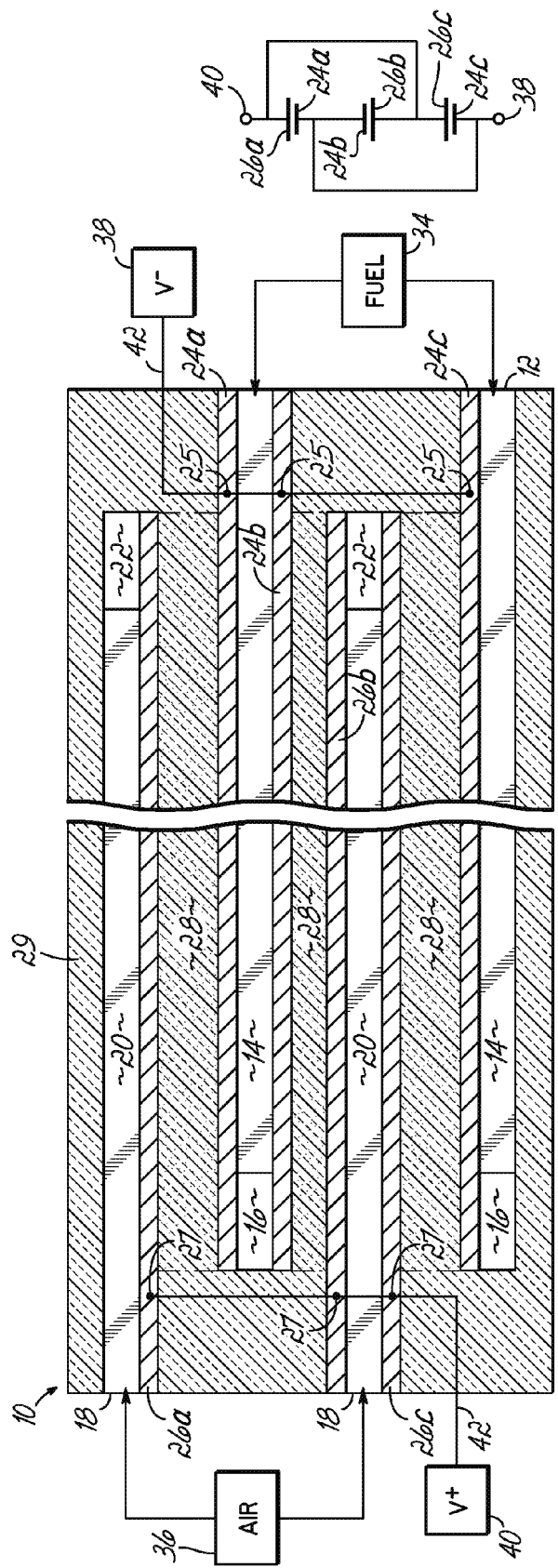
FIGS. 9A and 9B depict in cross-sectional views a multi-fuel cell design according to an embodiment of the invention having shared anodes and cathodes, where
Figure 9B:
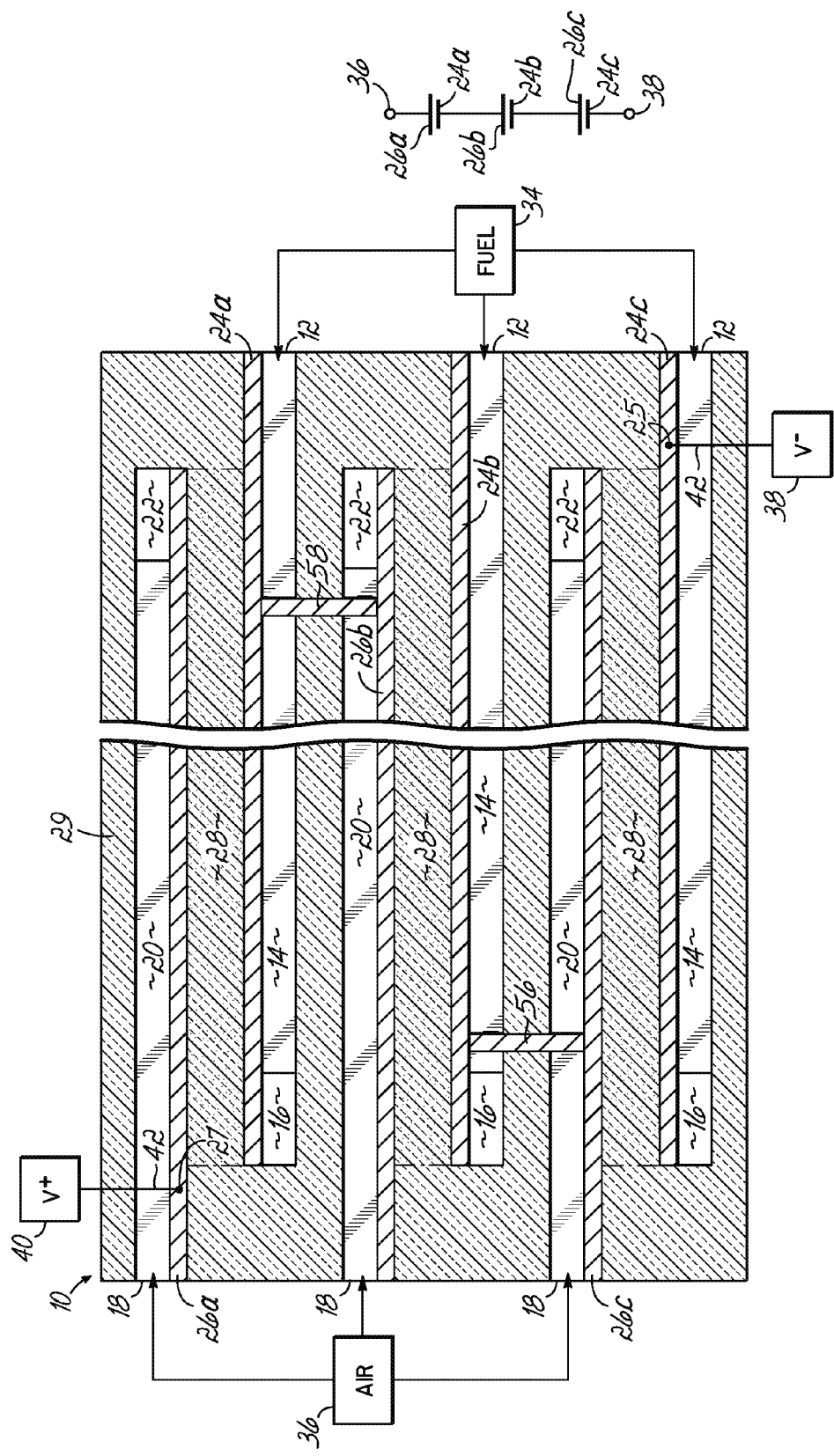

FIGS. 9A and 9B also depict, in cross-section views, multi-fuel cell designs, but with shared anodes and cathodes. In the embodiment of FIG. 9A, the SOFC Stick™ device 10 includes two fuel passages 14 and two air passages 20, but rather than having two fuel cells, this structure includes three fuel cells. The first fuel cell is formed between anode layer 24a and cathode layer 26a with intermediate electrolyte layer 28. Anode layer 24a is on one side of a fuel passage 14, and on the opposing side of that fuel passage 14 is a second anode layer 24b. Second anode layer 24b opposes a second cathode layer 26b with another electrolyte layer there between, thereby forming a second fuel cell. The second cathode layer 26b is on one side of an air passage 20 and a third cathode layer 26c is on the opposing side of that air passage 20. Third cathode layer 26c opposes a third anode layer 24c with an electrolyte layer 28 therebetween, thus providing the third fuel cell. The portion of the device 10 from anode layer 24a to cathode layer 26c could be repeated numerous times within the device to provide the shared anodes and cathodes thereby multiplying the number of fuel cells within a single SOFC Stick™. Each anode layer 24a, 24b, 24c includes an exposed anode portion 25 to which electrical connections can be made at the outer surface of the SOFC Stick™ device 10 to connect to a negative voltage node 38 via a wire 42, for example. Similarly, each cathode layer 26a, 26b, 26c includes an exposed cathode portion 27 to the outside surface for connection to a positive voltage node 40 via a wire 42, for example. A single air supply 36 may be provided at one cold end to supply each of the air passages 20 and a single fuel supply 34 may be provided at the opposite cold end to supply each of the fuel passages 14. The electrical circuit formed by this structure is provided at the right side of FIG. 9A. This SOFC Stick™ device 10 contains three fuel cell layers in parallel trebling the available power. For example, if each layer produces 1 volt and 1 amp, then each fuel cell layer produces 1 watt of power output (volt×amp=watt). Therefore, this three-layer layout would then produce 1 volt and 3 amps for a total of 3 watts of power output.

In FIG. 9B, the structure of FIG. 9A is modified to provide a single electrical connection to each of the voltage nodes to create three fuel cells in series, as shown by the circuit at the right side of FIG. 9B. The positive voltage node 40 is connected to cathode layer 26a at exposed cathode portion 27. Anode layer 24a is connected to cathode layer 26b by via 58. Anode layer 24b is connected to cathode layer 26c by via 56. Anode layer 24c is then connected at exposed anode portion 25 to the negative voltage node 38. Thus, using the same 1 amp/1 volt per layer assumption, this three cell structure would produce 3 volts and 1 amp for a total of 3 watts of power output.

Figure 10:
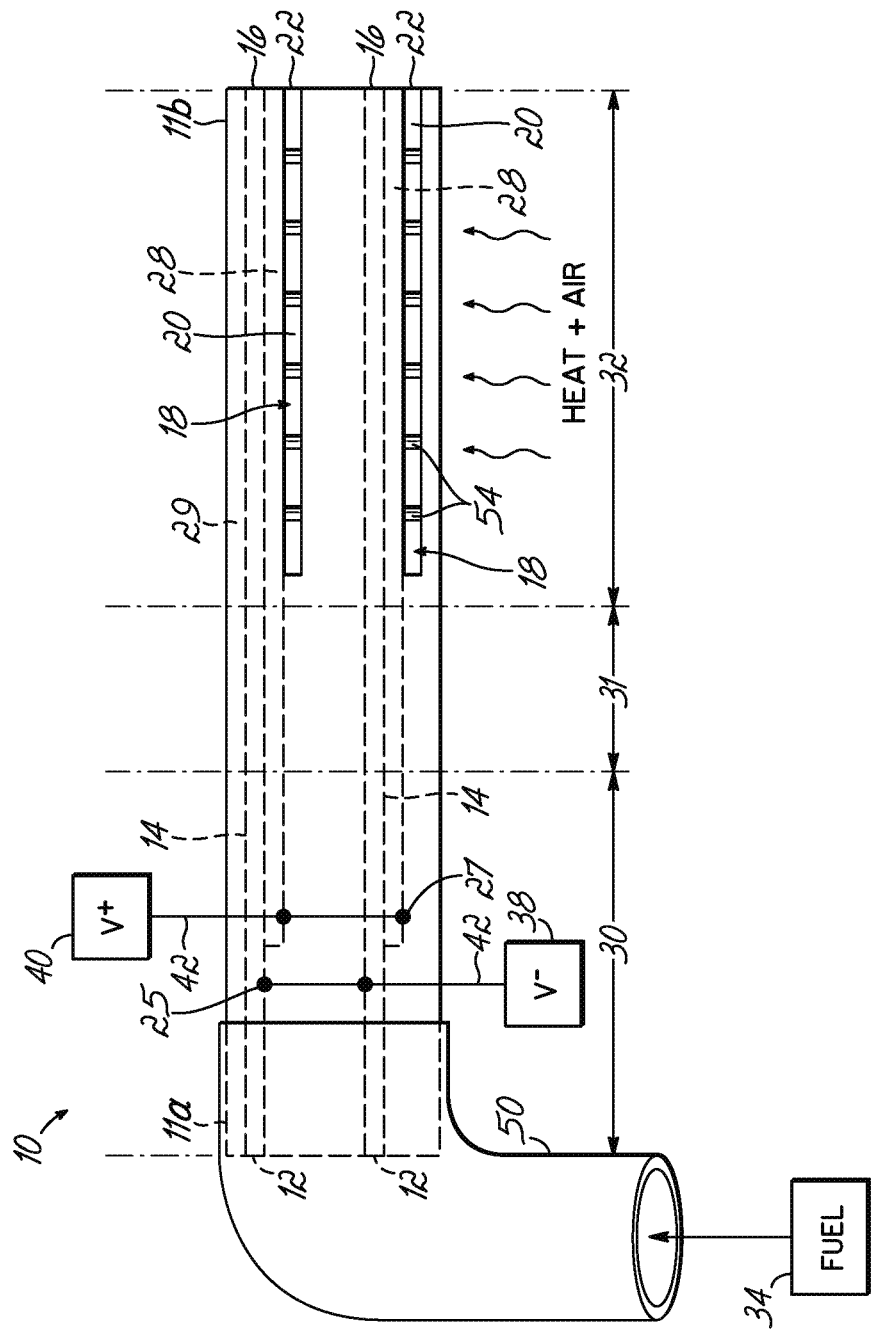
FIG. 10 depicts in schematic side view an SOFC Stick™ device according to one embodiment of the invention having a fuel supply tube connected to a cold end of the device and a side of the device open in the hot zone to an air passage for supply of heated air to the device in the hot zone.

Another embodiment of the invention is depicted in side view in FIG. 10. In this embodiment, the SOFC Stick™ device 10 has a single cold zone 30 at the first end 11a with the second end 11b being in the hot zone 32. As in other embodiments, the fuel inlets 12 are at the first end 11a and connected to a fuel supply 34 by a supply tube 50. In this embodiment, the fuel passages 14 extend the length of the SOFC Stick™ device 10 with the fuel outlet 16 being at second end 11b. Thus, the fuel supply connection is made in the cold zone 30 and the outlet for the fuel reactants (e.g., $CO_2$ and $H_2O$) is in the hot zone 32. Similarly, the anodes have an exposed anode portion 25 in the cold zone 30 for connecting to the negative voltage node 38 via a wire 42.

In the embodiment of FIG. 10, the SOFC Stick™ device 10 is open at least at one side, and potentially at both opposing sides, to provide both air inlets 18 and air passages 20 in the hot zone 32. The use of supporting ceramic pillars 54 may be particularly useful in this embodiment within the air passages 20. The air outlet can be at the second end 11b, as depicted. Alternatively, although not shown, the air outlet may be at an opposing side from the air inlet side if the passages 20 extend through the width and the air supply is directed only toward the input side, or if the passages 20 do not extend through the width. Instead of providing only heat to the hot zone 32, in this embodiment, air is also provided. In other words, the sides of the device 10 in the hot zone 32 are open to heated air instead of supplying air through a forced air tube.

FIG. 10A shows in side view a variation of the embodiment depicted in FIG. 10. In FIG. 10A, the SOFC Stick™ device 10 includes opposing cold zones 30 with a central heated zone 32 separated from the cold zones 30 by transition zones 31. The air inlet 18 is provided in the central heated zone 32, in at least a portion thereof, to receive the heated air. However, in this embodiment, the air passage is not completely open to the side of the SOFC Stick™ device 10 for an appreciable length as in FIG. 10. Rather, as shown more clearly in FIG. 10B, air passage 20 is open in a portion of the hot zone 32 and then is close to the sides for the remainder of the length and then exits at air outlet 22 at second end 11b of the SOFC Stick™ device 10. This embodiment allows heated air to be supplied in the hot zone 32 rather than a forced air supply tube, but also allows for the fuel and air to exit at one end 11b of the device 10 in a cold zone 30.

While specific embodiments have been depicted and described in detail, the scope of the invention should not be so limited. More general embodiments of the invention are described below and may be understood more fully with reference to the schematic views depicted in FIGS. 11-24. FIG. 11 provides a key for the components depicted schematically in FIGS. 12-24. Where fuel (F) or air (A) is shown by an arrow going into the SOFC Stick™ device, that indicates forced flow, such as through a tube connected to the input access point. Where air input is not depicted, that indicates that heated air is supplied in the hot zone by means other than a forced flow connection and the SOFC Stick™ is open to the air passage at an access point within the hot zone.

One embodiment of the invention is an SOFC Stick™ device that includes at least one fuel passage and associated anode, at least one oxidant pathway and associated cathode, and an electrolyte therebetween, where the cell is substantially longer than it is wide or thick so as to have a CTE in one dominant axis and operating with a portion thereof in a heated zone having a temperature of greater than about 400° C. In this embodiment, the SOFC Stick™ device has integrated access points for both air and fuel input at one end of the device according to the dominant CTE direction, or air input at one end and fuel input at the other end according to the dominant CTE direction, and air and fuel inputs being located outside the heated zone. For example, see FIGS. 20 and 24.

In another embodiment of the invention, the fuel cell has a first temperature zone and a second temperature zone, wherein the first temperature zone is the hot zone, which operates at a temperature sufficient to carry out the fuel cell reaction, and the second temperature zone is outside the heated zone and operates at a lower temperature than the first temperature zone. The temperature of the second temperature zone is sufficiently low to allow low temperature connections to be made to the electrodes and a low temperature connection for at least the fuel supply. The fuel cell structure extends partially into the first temperature zone and partially into the second temperature zone. For example, see FIGS. 12, 13 and 17.

In one embodiment of the invention, the fuel cell includes a first temperature zone that is the heated zone and a second temperature zone operating at a temperature below 300° C. The air and fuel connections are made in the second temperature zone using rubber tubing or the like as a low temperature connection. Low temperature solder connections or spring clips are used to make the electrical connections to the anode and cathode for connecting them to the respective negative and positive voltage nodes. Further, the fuel outlet for carbon dioxide and water and the air outlet for depleted oxygen are located in the first temperature zone, i.e., the heated zone. For example, see FIG. 17.

In another embodiment, the fuel cell structure has a central first temperature zone that is the heated zone, and each end of the fuel cell is located outside the first temperature zone in a second temperature zone operating below 300° C. Fuel and air inputs are located in the second temperature zone, as are solder connections or spring clips for electrical connection to the anode and cathode. Finally, output for the carbon dioxide, water and depleted oxygen are located in the second temperature zone. For example, see FIGS. 19, 20 and 24.

In another embodiment of the invention, fuel inputs may be provided at each end according to the dominant CTE direction in a second temperature zone operating below 300° C. with a first temperature zone being the heated zone provided in the center between the opposing second temperature zones. The output for the carbon dioxide, water, and depleted oxygen may be located in the central heated zone. For example, see FIGS. 15 and 18. Alternatively, the output for the carbon dioxide, water and depleted oxygen may be located in the second temperature zone, i.e., outside of the heated zone. For example, see FIGS. 16 and 19.

In another embodiment, both the fuel and air input access points are located outside the first temperature zone, which is the heated zone, in a second temperature zone operating below 300° C. thereby allowing use of low temperature connections, such as rubber tubing for air and fuel supply. In addition, solder connections or spring clips are used in the second temperature zone for connecting the voltage nodes to anodes and cathodes. In one embodiment, the fuel and air input are both at one end according to the dominate CTE direction, with the other end of the SOFC Stick™ being in the first heated temperature zone with the outputs of carbon dioxide, water and depleted oxygen being in the heated zone. For example, see FIG. 17. Thus, the SOFC Stick™ has one heated end and one non-heated end.

In another embodiment, fuel and air are inputted into one end according to the dominant CTE direction outside the heated zone and exit at the opposite end also outside the heated zone, such that the heated zone is between two opposing second temperature zones. For example, see FIG. 20. In yet another alternative, fuel and air are inputted into both of opposing ends located in second temperature zones with the fuel and air outputs being in the central heated zone. For example, see FIG. 18.

In yet another alternative, fuel and air are inputted into both of opposing ends located in second temperature zones with the respective outputs being in the second temperature zone at the opposite end from the input. For example, see FIG. 19. Thus, the fuel cell has a central heated zone and opposing ends outside the heated zone, with fuel and air both inputted into the first end with the respective reaction outputs exiting adjacent the second end, and both fuel and air being inputted into the second end and the reaction outputs exiting adjacent the first end.

In yet another embodiment, fuel input may be at one end outside the heated zone and air input may be at the opposite end outside the heat zone. For example, see FIGS. 21-24. In this embodiment, the reaction outputs from both the air and fuel may be within the heated zone (see FIG. 21), or they both may be outside the heated zone adjacent the opposite end from the respective input (see FIG. 24). Alternatively, the carbon dioxide and water output may be in the hot zone while the depleted oxygen output is outside the hot zone (see FIG. 22), or conversely, the depleted oxygen output may be in the heated zone and the carbon dioxide and water output outside the heated zone (see FIG. 23). The variations with respect to fuel and air output depicted in FIGS. 22 and 23 could also be applied in the embodiments depicted in FIGS. 18-20, for example.

In another embodiment of the invention, depicted in top plan view in FIGS. 25A and 27A and in side view in FIG. 27B, an SOFC Stick™ device 100 is provided having what may be referred to as a panhandle design. The SOFC Stick™ device 100 has an elongate section 102, which may be similar in dimension to the Stick™ devices depicted in prior embodiments, that has a CTE in one dominant axis, i.e., it is substantially longer than it is wide or thick. The SOFC Stick™ device 100 further has a large surface area section 104 having a width that more closely matches the length. Section 104 may have a square surface area or a rectangular surface area, but the width is not substantially less than the length, such that the CTE does not have a single dominant axis in section 104, but rather has a CTE axis in the length direction and the width direction. The large surface area section 104 is located in the hot zone 32, whereas the elongate section 102 is at least partially located in the cold zone 30 and the transition zone 31. In an exemplary embodiment, a portion of the elongate section 102 extends into the hot zone 32, but this is not essential. By way of example, the fuel and air supplies may be connected to the elongate section 102 in the manner depicted in FIG. 6B, as well as the electrical connections.

In FIGS. 25B and 26A, a top plan view is provided and in FIG. 26B a side view is provided of an alternative embodiment similar to that shown in FIGS. 25A, 27A and 27B but further having a second elongate section 106 opposite the elongate section 102 so as to position the large surface area section 104 between the two elongate sections 102 and 106. Elongate section 106 is also at least partially located in a cold zone 30 and a transition zone 31. In this embodiment, fuel may be inputted into elongate section 102 and air inputted into elongate section 106. By way of example, the air supply and the fuel supply could then be connected to the elongate sections 106 and 102, respectively, in the manner depicted in FIG. 2 or FIG. 3B. As depicted in FIG. 25B, the air output may be located in the elongate section 102 adjacent the fuel input, and the fuel output may be located in elongate section 106 adjacent the air input.

Alternatively, one or both of the air and fuel outputs may be located in the large surface area section 104 in the hot zone 32, as depicted in FIGS. 26A and 26B in top and side views, respectively. It may be appreciated that in the embodiments of FIGS. 25A and 25B, the surface area of the opposing anode and cathode with intervening electrolyte may be increased in the hot zone to increase the reaction area, thereby increasing the power generated by the SOFC Stick™ device 100.

Another benefit of the SOFC Stick™ devices 10, 100 of the invention is low weight. Typical combustion engines weigh on the order of 18-30 lbs per kW of power. An SOFC Stick™ device 10, 100 of the invention can be made with a weight on the order of 0.5 lbs per kW of power.

FIGS. 28A-D depict an alternative embodiment of a Tubular SOFC Stick™ device 200 of the invention, having a spiral or rolled, tubular configuration. FIG. 28A is a schematic top view of device 200, in the unrolled position. The unrolled structure of device 200 has a first end 202 and a second end 204 of equal length L that will correspond to the length of the rolled or spiral Tubular SOFC Stick™ device 200. Fuel inlet 12 and air inlet 18 are shown on opposing sides adjacent first end 202. Fuel passage 14 and air passage 20 then extend along the width of the unrolled structure of device 200 to the second end 204 such that the fuel outlet 16 and air outlet 22 are at the second end 204, as further shown in the schematic end view of the unrolled structure of device 200 in FIG. 28B and the schematic side view of the unrolled structure of device 200 in FIG. 28C. The fuel passage 14 and air passage 20 are shown as extending nearly the length L of the unrolled structure of device 200 so as to maximize fuel and air flow, but the invention is not so limited. To form the spiral Tubular SOFC Stick™ device 200, first end 202 is then rolled toward second end 204 to form the spiral tube structure of device 200 depicted in the schematic perspective view of FIG. 28D. Air supply 36 may then be positioned at one end of the spiral Tubular SOFC Stick™ device 200 for input into air inlet 18, while the fuel supply 34 may be positioned at the opposite end of the spiral Tubular SOFC Stick™ device 200 to input fuel into the fuel inlet 12. The air and the fuel will then exit the spiral Tubular SOFC Stick™ device 200 along the length L of the device 200 through fuel outlet 16 and air outlet 22. The voltage nodes 38, 40 can be soldered to contact pads 44 formed on or adjacent to opposing ends of the spiral Tubular SOFC Stick™ device 200.

FIGS. 29A-29G depict an alternative embodiment of the invention wherein the SOFC Stick™ device is in a tubular concentric form. FIG. 29A depicts in schematic isometric view a concentric Tubular SOFC Stick™ device 300. FIGS. 29B-29E depict cross-sectional views of the concentric device 300 of FIG. 29A. FIG. 29F depicts an end view at the air input end of the device 300, and FIG. 29G depicts an end view at the fuel input end of device 300. The particular embodiment shown includes three air passages 20, one being in the center of the tubular structure and the other two being spaced from and concentric therewith. The concentric Tubular SOFC Stick™ device 300 also has two fuel passages 14 between and concentric with the air passages 20. As shown in FIGS. 29A-29D, the concentric Tubular SOFC Stick™ device 300 includes a fuel outlet 16 connecting the fuel passages 14 at one end and an air outlet 22 connecting the air passages 20 at the other end opposite their respective inlets. Each air passage 20 is lined with cathodes 26 and each fuel passage 14 is lined with anodes 24, with electrolyte 28 separating opposing anodes and cathodes. As shown in FIGS. 29A-29B and 29F-29G, electrical connection may be made to the exposed anodes 25 and exposed cathodes 27 at opposing ends of the concentric Tubular SOFC Stick™ device 300. Contact pads 44 may be applied to the ends to connect the exposed anodes 25 and exposed cathodes 27, and although not shown, the contact pads 44 can be run along the outside of the device 300 to permit the electrical connection to be made at a point along the length of the device 300 rather than at the ends. Concentric Tubular SOFC Stick™ device 300 may include pillars 54 positioned within the air and fuel passages 14, 20 for structural support.

In the embodiments of the invention having two cold zones 30 at opposing ends 11a, 11b, with air input and fuel output at one end and fuel input and air output at the opposing end, the spent fuel or air is in a heated state as it exits the central hot zone 32. The heated air and fuel cool as they travel through the transition zones 31 to the cold zones 30. Thin layers of electrodes and/or ceramic/electrolyte separate an air passage from a parallel fuel passage, and vice-versa. In one passage, heated air is exiting the hot zone, and in an adjacent parallel passage, fuel is entering the hot zone, and vice-versa. The heated air, through heat exchange principles, will heat up the incoming fuel in the adjacent parallel passage, and vice-versa. Thus, there is some pre-heating of the air and fuel through heat exchange. However, due to the rapid loss of heat outside the hot zone, as discussed above, heat exchange may not be sufficient to pre-heat the air and fuel to the optimal reaction temperature before it enters the active region in the hot zone. In addition, in embodiments where the SOFC Stick™ device 10 includes one cold end and one hot end, fuel and air are inputted into the same cold end and exit through the same opposing hot end, such that there is no cross-flow of fuel and air for heat-exchange to occur. Only limited heat exchange to the incoming fuel and air is available from the electrode and ceramic materials of the SOFC Stick™ device.

FIGS. 30A-33C depict various embodiments of an SOFC Stick™ device 10 having integrated pre-heat zones 33a for heating the fuel and air before it enters an active zone 33b in which the anodes 24 and cathodes 26 are in opposing relation. These embodiments include SOFC Stick™ devices in which there are two cold ends with an intermediate hot zone and fuel and air input at opposing cold ends, and SOFC Stick™ devices in which there is one hot end and one cold end with fuel and air input both at the single cold end. In these embodiments, the amount of electrode material used can be limited to the active zone 33b with only a small amount leading to the cold zone for the external connection to the voltage nodes 38, 40. Another benefit in these embodiments, which will be described in more detail later, is that the electrons have the shortest possible path to travel to the external voltage connection, which provides a low resistance.

FIG. 30A depicts a schematic cross-sectional side view of a first embodiment of an SOFC Stick™ device 10 having one cold zone 30 and one opposing hot zone 32 with an integrated pre-heat zone 33a. FIG. 30B depicts in cross-section a view through the anode 24 looking up toward the fuel passage 14, and FIG. 30C depicts in cross-section a view through the cathode 26 looking down toward the air passage 20. As shown in FIGS. 30A and 30B, the fuel from fuel supply 34 enters through fuel inlet 12 and extends along the length of the device 10 through fuel passage 14 and exits from the opposite end of the device 10 through fuel outlet 16. The cold zone 30 is at the first end 11a of SOFC Stick™ device 10 and the hot zone 32 is at the opposing second end 11b. Between the hot and cold zones is the transition zone 31. The hot zone 32 includes an initial pre-heat zone 33a through which the fuel first travels, and an active zone 33b that includes the anode 24 adjacent the fuel passage 14. As shown in FIG. 30B, the cross-sectional area of the anode 24 is large in the active zone 33b. The anode 24 extends to one edge of the SOFC Stick™ device 10 and an exterior contact pad 44 extends along the outside of the device 10 to the cold zone 30 for connection to the negative voltage node 38.

Similarly, as shown in FIGS. 30A and 30C, the air from air supply 36 enters through the air inlet 18 positioned in the cold zone 30 and the air extends along the length of the SOFC Stick™ device 10 through air passage 20 and exits from the hot zone 32 through the air outlet 22. Because the air and fuel are entering at the same end and traveling along the length of the SOFC Stick™ device 10 in the same direction, there is limited pre-heating of the air and fuel by heat exchange prior to the hot zone 32. The cathode 26 is positioned in the active zone 33b in opposing relation to the anode 24 and extends to the opposite side of the SOFC Stick™ device 10 where it is exposed and connected to an external contact pad 44 that extends from the active hot zone 33b to the cold zone 30 for connection to the positive voltage node 40. It is not necessary, however, that the exposed cathode 27 be on an opposite side of the device 10 as the exposed anode 25. The exposed anode 25 and exposed cathode 27 could be on the same side of the device and the contact pads 44 could be formed as stripes down the side of the SOFC Stick™ device 10. By this structure, the air and fuel are first heated in the pre-heat zone 33a, where no reaction is taking place, and the majority of the anode and cathode material is limited to the active zone 33b where the heated air and fuel enters and react by virtue of the opposed anode and cathode layers 24, 26.

The embodiment depicted in FIGS. 31A-31C is similar to that depicted in FIGS. 30A-30C, but rather than having one hot end and one cold end, the embodiment of FIGS. 31A-C includes opposing cold zones 30 with a central hot zone 32. Fuel from fuel supply 34 enters through the first end 11a of device 10 through fuel inlet 12 in the cold zone 30 and exits from the opposite second end 11b through fuel outlet 16 positioned in the opposing cold zone 30. Similarly, air from air supply 36 enters through the opposite cold zone 30 through air inlet 18 and exits at the first cold zone 30 through air outlet 22. The fuel enters the hot zone 32 and is pre-heated in pre-heat zone 33a, while the air enters at the opposite side of the hot zone 32 and is pre-heated in another pre-heat zone 33a. There is thus a cross-flow of fuel and air. The anode 24 opposes the cathode 26 in an active zone 33b of hot zone 32 and the reaction occurs in the active zone 33b involving the pre-heated fuel and air. Again, the majority of electrode material is limited to the active zone 33b. The anode is exposed at one edge of the SOFC Stick™ device 10, and the cathode is exposed at the other side of device 10. An external contact pad 44 contacts the exposed anode 25 in the hot zone 32 and extends toward the first cold end 11a for connection to negative voltage node 38. Similarly, an external contact pad 44 contacts the exposed cathode 27 in hot zone 32 and extends toward the second cold zone 11b for connection to positive voltage node 40.

The pre-heat zones 33a provide the advantage of fully heating the gas to the optimal reaction temperature before it reaches the active region. If the fuel is colder than the optimum temperature, the efficiency of the SOFC system will be lower. As the air and fuel continue on their paths, they warm up. As they warm up, the efficiency of the electrolyte increases in that region. When the fuel, air and electrolyte reach the full temperature of the furnace, then the electrolyte is working under its optimal efficiency. To save money on the anode and cathode, which may be made out of precious metal, the metal can be eliminated in those areas that are still below the optimal temperature. The amount of the pre-heat zone, in terms of length or other dimensions, depends on the amount of heat transfer from the furnace to the SOFC Stick™ device, and from the SOFC Stick™ device to the fuel and air, as well as whether any heat exchange is occurring due to cross-flow of the fuel and air. The dimensions further depend on the rate of flow of fuel and air; if the fuel or air is moving quickly down the length of the SOFC Stick™ device, a longer pre-heat zone will be advantageous, whereas if the flow rate is slow, the pre-heat zone may be shorter.

FIGS. 32A and 32B depict an embodiment similar to that shown in FIGS. 31A-31C, but the SOFC Stick™ device 10 includes a pre-heat chamber 13 between the fuel inlet 12 and fuel passage 14 that extends into the hot zone 32 for pre-heating in the pre-heat zone 33a a large volume of fuel before it passes through the more narrow fuel passage 14 into the active zone 33b. The SOFC Stick™ device 10 similarly includes a pre-heat chamber 19 between the air inlet 18 and the air passage 20 that extends into the hot zone 32 for pre-heating a large volume of air in the pre-heat zone 33a before it passes through the more narrow air passage 20 to the active zone 33b. As disclosed in embodiments above, the SOFC Stick™ device 10 may include multiple fuel passages 14 and air passages 20, each of which would receive flow from a respective pre-heat chamber 13, 19.

With respect to a high-volume pre-heat chamber instead of a pre-heat channel, it may be imagined, by way of example only, that if it takes 5 seconds for a molecule of air to heat up to the optimal temperature, then if the molecules of air are traveling down the SOFC Stick™ device 10 at 1 inch per second, the SOFC Stick™ device would need a pre-heat channel that is 5 inches in length before the air enters the active zone 33b. If, however, a large volume chamber is provided instead of a channel, the volume permits the molecules to spend additional time in the cavity before entering the more narrow channel to the active zone, such that the air molecules are heated in the chamber and then a short length of channel may be used for feeding the heated air molecules to the active zone. Such a cavity or pre-heat chamber could be prepared in a number of different ways, including taking a green (i.e., before sintering) assembly and drilling into the end of the assembly to form the chamber, or by incorporating a large mass of organic material within the green stack as it is formed, whereby the organic material is baked out of the SOFC Stick™ device during sintering.

FIGS. 33A-33C depict yet another embodiment for pre-heating the air and fuel prior to the air and fuel reaching the active zone 33b. FIG. 33A is a schematic cross-sectional side view, essentially through the longitudinal center of the SOFC Stick™ device 10. FIG. 33B is a cross-sectional top view taken along the line 33B-33B where the fuel passage 14 and anode 24 intersect, while FIG. 33C is a cross-sectional bottom view taken along the line 33C-33C where the air passage 20 intersects the cathode 26. The SOFC Stick™ device 10 has two opposing cold zones 30 and a central hot zone 32, with a transition zone 31 between each cold zone 30 and the hot zone 32. Fuel from fuel supply 34 enters the first end 11a of SOFC Stick™ device 10 through fuel inlet 12 and travels through the fuel passage 14, which extends toward the opposite end of the hot zone 32, where it makes a U-turn and travels back to the cold zone 30 of first end 11a, where the spent fuel exits through fuel outlet 16. Similarly, air from air supply 36 enters the second end 11b of SOFC Stick™ device 10 through the air inlet 18 and travels through the air passage 20, which extends toward the opposing end of the hot zone 32, where it makes a U-turn and travels back to the second end 11b, where the air exits from the cold zone 30 through air outlet 22. By means of these U-turned passages, the portion of the fuel passage 14 and air passage 20 from the initial entry into the hot zone 32 through the bend (U-turn) constitute a pre-heat zone for heating the fuel and air. After the bends, or U-turns, in the passages 14, 20, the passages are lined with a respective anode 24 or cathode 26, which are in opposing relation with an electrolyte 28 therebetween, which region constitutes the active zone 33b in hot zone 32. Thus, the fuel and air is heated in the pre-heat zone 33a prior to entry into the active zone 33b to increase the efficiency of the SOFC Stick™ device 10, and to minimize the usage of electrode material. The anode 24 is extended to the exterior of the device 10 in the cold zone 30 for connection to negative voltage node 38. Similarly, cathode 26 is extended to the exterior of the device 10 for electrical connection to positive voltage node 40. The fuel and air outlets 16 and 22 also may exit from the cold zones 30.

In many of the embodiments shown and described above, the anodes 24 and cathodes 26 travel within the layers of the SOFC Stick™ device 10, essentially in the center area of each layer, i.e., internal to the device, until they reach the end of the device. At that point, the anodes 24 and cathodes 26 are tabbed to the outside of the SOFC Stick™ device 10 where the exposed anode 25 and exposed cathode 27 are metallized with a contact pad, such as by applying a silver paste, and then a wire is soldered to the contact pad. For example, see FIGS. 4A-4B. It may be desirable, however, to build up the layers in the SOFC Stick™ device 10 into higher voltage combinations, for example as shown in FIGS. 8A-9B. If it is desired to make an SOFC Stick™ device that produces 1 kW of power, the power is divided between the voltage and the current. One standard is to use 12 volts, such that 83 amps would be needed to create the total 1 kW of power. In FIGS. 8B and 9B, vias were used to interconnect the electrode layers to form parallel or series combinations.

Alternative embodiments for interconnecting the electrode layers are depicted in FIGS. 34A to 37. Rather than interconnecting the electrode layers in the interior of the SOFC Stick™ device 10, these alternative embodiments use exterior stripes (narrow contact pads), for example of silver paste, along the sides of the SOFC Stick™ device 10, in particular, multiple small stripes. Using the striping technique, a simple structure is formed that can provide series and/or parallel combinations to achieve any current/voltage ratios needed. Moreover, the external stripes will have loose mechanical tolerances compared to the internal vias, thereby simplifying manufacturing. Also, the external stripes will likely have a lower resistance (or equivalent series resistance) than the vias. Lower resistance in a conductor path will result in lower power loss along that path, such that the external stripes provide the ability to remove the power from the SOFC Stick™ device 10 with a lower loss of power.

Referring now specifically to FIGS. 34A and 34B, an external anode/cathode interconnect in series is depicted. FIG. 34A provides a schematic oblique front view of the alternating anodes 24a, 24b, 24c and cathodes 26a, 26b, 26c. Along the length of the SOFC Stick™ device 10, the anodes 24a, 24b, 24c and cathodes 26a, 26b, 26c include a tab out to the edge of the device 10 to provide the exposed anodes 25 and exposed cathodes 27. An external contact pad 44 (or stripe) is then provided on the outside of the SOFC Stick™ device over the exposed anodes 25 and cathodes 27, as best shown in the schematic side view of FIG. 34B. By connecting the three pairs of opposed anodes 24a, 24b, 24c and cathodes 26a, 26b, 26c in series, the SOFC Stick™ device 10 provides 3 volts and 1 amp. In FIG. 35, the structure is doubled and the two structures are connected by long stripes down the sides of the device 10, thereby providing an external anode/cathode interconnect in a series parallel design that provides 3 volts and 2 amps.

FIGS. 36A and 36B provide an embodiment for a low equivalent series resistance path for providing low power loss. In this embodiment, the hot zone 32 is in the center of the SOFC Stick™ device 10 with the first end 11a and second end 11b being in cold zones 30. Fuel is inputted through fuel inlets 12 in first end 11a and air is inputted through air inlets 18 in second end 11b. Within the hot zone 32, which is the active area of the SOFC Stick™ device 10, the anodes 24 and cathodes 26 are exposed to the sides of the device, with the anodes 24 exposed to one side, and the cathodes 26 exposed to the opposite side. Contact pads 44 (or stripes) are applied over the exposed anodes 25 and cathodes 27. Then, the edges of the SOFC Stick™ device 10 are metallized along the length of the sides of the device 10 until the metallization reaches the cold zones 30, where the low temperature solder connection 46 is made to the negative voltage node 38 and the positive voltage node 40. The anodes 24 and cathodes 26 cannot be optimized only for low resistance because they have other functions. For example, the electrodes must be porous to allow the air or fuel to pass through to the electrolyte, and porosity increases resistance. Further, the electrodes must be thin to allow for good layer density in a multi-layer SOFC Stick™ device 10, and the thinner the electrode, the higher the resistance. By adding thicker contact pads 44 to the edges (sides) of the SOFC Stick™ device, it is possible to provide a low resistance path toward the solder connection 46. The thicker the contact pad 44, the lower the resistance. If an electron must travel 10 inches, for example, down the electrode within the SOFC Stick™ device 10, past all the voids in the electrode layer, the path of least resistance would be to travel 0.5 inch, for example, to the side edge of the device 10, and then travel the 10 inches down the exterior non-porous contact pad 44. Thus, the long contact pads 44 along the exterior of the SOFC Stick™ device that extend to the cold zones 30 allow for the power to be removed from the SOFC Stick™ device 10 with a lower loss by providing a lower resistance conductor path. Thus, the striping technique may be used in the active area (hot zone 32) of the SOFC Stick™ device 10 for making series and parallel connections to increase power, and a long stripe down the side of the device to the cold ends allows that power to be efficiently removed from the SOFC Stick™ device 10.

FIG. 37 depicts, in schematic isometric view, an embodiment similar to that depicted in FIG. 36B, but having a single cold zone 30 at the first end 11a of the SOFC Stick™ device 10, with the hot zone 32 being at the second end 11b of device 10. Multiple vertical stripes or contact pads 44 are provided within the hot zone 32 to make the series and/or parallel connections, and the horizontal long stripes 44 down the sides of the device 10 are provided from the hot zone 32 to the cold zone 30 for making the low temperature solder connections 46 to the positive voltage node 40 and negative voltage node 38.

One method for forming the fuel passages 14 and air passages 20 is to place an organic material within the green, layered structure that can then bake out during a later sintering step. To build individual SOFC Sticks™ having high power output, such as 1 kW or 10 kW output, the SOFC Stick™ must be long, wide and have a high layer count. By way of example, the SOFC Stick™ devices may be on the order of 12 inches to 18 inches long. When baking the green structure to sinter the ceramic and remove the organic material, the organic material used to form the fuel passage 14 must exit through openings 12 and 16 that form the fuel inlet and fuel outlet, respectively. Similarly, the organic material used to form the air passage 20 must bake out through the openings 18 and 22 that form the air inlet and air outlet, respectively. The longer and wider the devices, the more difficult it is for the organic material to exit through these openings. If the device is heated too fast during bake-out, the various layers can delaminate because the decomposition of the organic material occurs faster than the material can exit the structure.

FIGS. 38A and 38B depict, in schematic cross-sectional side view, an alternative embodiment that provides multiple exit gaps for bake-out of the organic material 72. As shown in FIG. 38A, multiple openings 70 are provided on one side of the SOFC Stick™ device 10 to provide multiple bake-out paths for the organic material 72 to exit the structure. As depicted in FIG. 38B, after bake-out, the multiple openings 70 are then closed by applying a barrier coating 60 to the side of the SOFC Stick™ device 10. By way of example, the barrier coating may be a glass coating. In another example, the barrier coating may be a glass containing a ceramic filler. In yet another embodiment, the barrier coating 60 may be a contact pad 44, for example filled with paste, which would then also serve as the low resistance path for the generated power. The silver paste may also contain glass for increased adhesion. In an exemplary embodiment, the bake-out paths for the cathode are vented to one side of the SOFC Stick™ device 10 and the bake-out paths for the anode are vented to the opposing side of the device 10 to avoid shorting between opposite electrodes.

In an alternative embodiment for an SOFC Stick™ device 10, 100, 200, 300, rather than having an open air passage 20 and fuel passage 14 lined with a cathode 26 or anode 24, respectively, the cathode and air channel may be combined and the anode and fuel channel may be combined through use of porous electrode materials that permit flow of the air or fuel. The cathodes and anodes must be porous anyway to permit the reaction to occur, so in combination with forced air and fuel input, sufficient flow could be achieved through the SOFC Stick™ device to permit the power generating reaction to occur.

Another embodiment of the present invention is depicted in schematic cross-sectional end view in FIG. 39. This embodiment is essentially an anode-supported version of an SOFC Stick™ device 10. As with other embodiments, the SOFC Stick™ device 10 may have a hot end and a cold end or two cold ends with an intermediate hot zone. Rather than having the device 10 supported by ceramic 29, the anode-supported version uses the anode material as the supporting structure. Within the anode structure, a fuel passage 14 and an air passage 20 are provided in opposing relation. The air channel 20 is lined with an electrolyte layer 28, and then with a cathode layer 26. Chemical vapor deposition could be used to deposit the internal layers, or by using solutions of viscous pastes.

In FIGS. 40A and 40B, a further embodiment is shown for an anode-supported version of the SOFC Stick™ device 10. In this embodiment, the separate open fuel passage 14 is eliminated, such that the porous anode 24 also serves as the fuel passage 14. In addition, the SOFC Stick™ device 10 is coated with a barrier coating 60, such as a glass coating or a ceramic coating, to prevent the fuel from exiting out the sides of the device 10. The SOFC Stick™ device 10 may have as many air passages with associated electrolyte and cathode in the anode structure as desired. As depicted in FIG. 40B, the fuel from fuel supply 34 is forced into first end 11a through the porous anode 24, which serves as the fuel passage 14, and passes through the electrolyte layers 28 and the cathodes 26 to react with air from air supply 36, and the spent air and fuel can then exit out the air outlet 22.

In another embodiment depicted in a schematic cross-sectional end view in FIG. 41A and a schematic cross-sectional top view in FIG. 41B, the SOFC Stick™ device 10 may include a plurality of air passages 20 provided within the anode-supporting structure, and a single fuel passage 14 normal to the multiple air passages 20 for feeding fuel from the fuel supply 34 through the single fuel inlet 12 to multiple air passages 20. Again, the air passages 20 are lined first with an electrolyte layer 28 and then with a cathode 26. The fuel passes from the single fuel passage 14 through the anode structure 24, through the electrolyte 28, and through the cathode 26 to react with the air in the air passage 20, and the spent fuel and air exits from the air outlet 22. The spent fuel can also seep out the side of the SOFC Stick™ device 10 that does not include the barrier coating 60, which uncoated side would be located on the opposing side of the device from the orientation of the single fuel passage 14.

In the embodiments pertaining to an anode-supported structure, it may be appreciated that the structure may be essentially reversed to be a cathode-supported structure. Fuel channels coated with an electrolyte layer and an anode layer would then be provided within the cathode structure. A separate air channel or multiple air channels could also be provided, or the porosity of the cathode could be used for the air flow.

FIGS. 42A-42C depict a method for forming the electrodes within the air and fuel passages. Taking the fuel passage 14 and anode 24 as an example, rather than building up a green structure layer by layer using layers of green ceramic and metal tape layers, or printing metallizations, in the present embodiment, the SOFC Stick™ device 10 is first built without the electrodes. In other words, green ceramic material is used to form the electrolyte and ceramic supporting portions of the SOFC Stick™ and the organic material is used to form the passages, such as fuel passage 14. After the SOFC Stick™ device has been sintered, the fuel passage 14 is filled with an anode paste or solution. The paste may be thick like that of a printing ink, or runny like that of a high-content water solution. The anode material can be filled into the fuel passage 14 by any desired means, such as sucking it in via a vacuum, by capillary forces, or forcing it in via air pressure.

Alternatively, as shown in FIGS. 42A-42C, the anode material is dissolved in solution, flowed into the fuel passage 14, and then precipitated. For example, through a change of pH, the anode particles can be precipitated and the solution drawn out. In another alternative, the anode particles can be simply allowed to settle, and then the liquid dried or baked out of the fuel passage 14. This settling can be accomplished by creating an ink or liquid carrier that will not keep the particles in suspension for any extended period of time, for example, due to low viscosity. A centrifuge could also be used to force the settling. The centrifuge can easily allow preferential settling of most particles onto one surface of the fuel passage 14 to thereby conserve electrode material and to ensure that only one surface of the fuel passage 14 acts as an electrolyte.

As shown in FIG. 42A, the anode particle-containing solution 66 is pulled into the fuel passage 14 until the passage 14 is completely filled, as shown in FIG. 42B. The particles then settle to the bottom of the passage 14 to form an anode layer 24, as shown in FIG. 42C. Flooding in of the solution 66 can be accelerated by gravity, vacuum, or centrifuge, as compared to normal capillary forces. Of course, while the anode 24 and fuel passage 14 were used as an example, any of these alternative embodiments may also be used with a cathode paste or solution to create a cathode layer 26 in an air passage 20.

In another alternative, a ceramic electrode material (anode or cathode) could be infused into the passage (fuel or air) in a liquid sol-gel state, and then deposited inside the passage. It is also possible to repeat the filling operation multiple times, such as in the case where the concentration of the desired electrode material in the liquid is low, or to provide a gradient of properties in the electrode (such as to provide a different amount of YSZ in the electrode close to the electrolyte versus the amount of YSZ in the electrode farther from the electrolyte), or if there is a desire to put multiple layers of dissimilar materials together (such as a cathode made of LSM near the electrolyte, and then silver over the top of the LSM for better conductivity).

Referring back to FIGS. 7C and 7D, in which ceramic spheres or balls were used to provide structural support to the air and fuel passages 20, 14, ceramic particles may also be used to increase the effective surface area for a greater reaction area, thus giving a higher output. Very fine-sized ceramic balls or particles can be used inside the fuel passage 14 and the air passage 20 prior to applying the electrode layer. As shown in FIG. 43 in schematic cross-sectional side view, surface particles 62 line the passage 14 to provide the electrolyte layer 28 with an uneven topography that increases the surface area available to receive the electrode layer. The anode 24 is then applied over the uneven topography with the anode material coating all around the surface particles 62 thereby increasing the reaction area.

In an alternative embodiment, depicted in schematic cross-sectional side view in FIG. 44, the electrolyte layer 28 may be laminated so as to provide the uneven topography or textured surface layer 64, such as by pressing the green electrolyte layer against a fine grading having a V-shaped pattern, which pattern is then imparted to the electrolyte layer 28. After the electrolyte layer 28 is sintered to solidify the ceramic and the textured surface layer 64, the anode layer 24 may then be applied, such as by using the backfill process described above in FIGS. 42A-42C, to provide an anode with a high reaction area.

Yet another embodiment of the invention is depicted in FIGS. 45A and 45B. FIG. 45A is a schematic top view depicting the air and fuel flow through air and fuel passages and the arrangement of the electrodes, and FIG. 45B is a cross-sectional view through the hot zone 32. Along the length of SOFC Stick™ device 10, the device is divided into a left side 80 and a right side 82 with an intermediate or bridging portion 84 therebetween. A plurality of air passages 20L extend from the first end 11a of SOFC Stick™ device 10 along the length through the left side 80 and exit out the left side 80 adjacent second end 11b, and a plurality of air passages 20R extend from first end 11a along the length through the right side 82 and exit the SOFC Stick™ device 10 on the right side adjacent the second end 11b. The air passages 20L are offset from the air passages 20R, as best shown in FIG. 45B. A plurality of fuel passages 14L extend from the second end 11b of SOFC Stick™ device 10 along the length through the left side 80 and exit on the left side 80 adjacent first end 11a, and a plurality of fuel passages 14R extend from second end 11b along the length through the right side 82 and exit the right side 82 adjacent first end 11a. The fuel passages 14L are offset from the fuel passages 14R. In addition, with the exception of one fuel passage and one air passage, each fuel passage 14L is paired with and slightly offset from an air passage 20R and each air passage 20L is paired with and slightly offset from a fuel passage 14R. For each offset pair of fuel passages 14L and air passages 20R, a metallization extends along each fuel passage 14L from the left side 80 to the right side 82, where it then extends along the slightly offset air passage 20R. Similarly, for each offset pair of fuel passages 14R and air passages 20L, a metallization extends along each air passage 20L from the left side 80 to the right side 82, where it then extends along the slightly offset fuel passage 14R. The metallization serves as an anode 24L or 24R when the metallization extends along a fuel passage 14L or 14R, and the metallization serves as a cathode 26L or 26R when the metallization extends along an air passage 20L or 20R. In the bridging portion 84 of the SOFC Stick™ device 10, where the metallizations do not extend along any air or fuel passage, the metallization simply serves as a bridge 90 between an anode and a cathode. In one embodiment of the present invention, the metallization may comprise the same material along its length, such that the anode 24L or 24R, the bridge 90 and the cathode 26L or 26R each comprise the same material. For example, the metallizations may each comprise platinum metal, which functions well as either an anode or a cathode. Alternatively, the metallization may comprise different materials. For example, the cathodes 26R or 26L may comprise lanthanum strontium manganite (LSM), while the anodes 24R or 24L comprise nickel, NiO, or NiO+YSZ. The bridges 90 may comprise palladium, platinum, LSM, nickel, NiO, or NiO+YSZ. The present invention contemplates any combination or type of materials suitable for use as a cathode or an anode, or a bridging material therebetween, and the invention is not limited to the specific materials identified above.

On one side of the SOFC Stick™ device 10, shown here at the right side 82, a fuel channel 14R is provided with an associated anode 24R that extends to the right edge of the SOFC Stick™ device 10 to provide the external exposed anode 25. There is no offset air passage 20L associated with this fuel passage 14R, and the anode 24R need not extend into the left side 80. As depicted in FIG. 45A, an exterior contact pad 44 is applied over the exposed anode 25 and extends along the length of the SOFC Stick™ device into the cold zone 30. Negative voltage node 38 can then be connected by wire 42 and solder connection 46 to the contact pad 44. The anode 24R could extend, as shown, to the right edge throughout the hot zone 32, or could just extend in a small tab portion to reduce the amount of electrode material used. Also, the anode 24R could extend to the right edge of the SOFC Stick™ device 10 along the length of the fuel passage 14R, although such embodiment would involve an unnecessary use of electrode material.

Similarly, on the other side of the SOFC Stick™ device 10, shown as the left side 80, a single air passage 20L is provided with an associated cathode 26L that extends to the left side of the SOFC Stick™ device 10 to form the exposed cathode 27. This air passage 20L is not associated with an offset fuel passage 14R, and it is not necessary that the cathode 26L extend to the right side 82. A contact pad 44 may be applied along the exterior of the left side 80 of the SOFC Stick™ device 10 from the exposed cathode 27 to a cold end 30, where a positive voltage node 40 may be connected via wire 42 and solder connection 46 to the contact pad 44.

In FIG. 45B, the single fuel passage 14R and associated anode 24R are shown at the top of the right side 82, while the single air passage 20L and associated cathode 26L are shown at the bottom of the left side 80 of the SOFC Stick™ device 10. However, the invention is not limited to that arrangement. For example, air passage 20L and associated cathode 26L could be provided also at the top of device 10 on the left side 80, in a similar offset manner to the single fuel passage 14R and its associated anode 24R, but the metallization would not run from the left side 80 through the bridging portion 84 to the right side 82. Rather, the bridge 90 would be absent such that the anode 24R is electrically separated from the cathode 26L. Additional arrangements are contemplated in which an SOFC Stick™ device 10 may be provided with two unique air pathway stacks and two unique fuel pathway stacks within a single SOFC Stick™ device 10, with the cells connected in series. The embodiment depicted in FIGS. 45A and 45B has an advantage of raising the voltage without raising the current, and while maintaining a low resistance. Further, this embodiment provides a high density within the SOFC Stick™ device 10.

In FIGS. 46A and 46B, an alternative embodiment is depicted in schematic perspective view and schematic cross-sectional view, respectively. Previous embodiments (e.g., FIG. 37) provided external stripes along the exterior sides or edges of the SOFC Stick™ device 10 from the hot zone 32 to the cold zone(s) 30 to provide a path of low resistance for the electrons to travel to the cold-end. In the embodiment of FIGS. 46A and 46B, instead of stripes down the sides or edges of the device 10, a contact pad 44 is applied along one side and one of the top and bottom surfaces for the external connection to the anode 24 and another contact pad 44 is applied along the opposing side and the other of the top and bottom surfaces for the external connection to the cathode 26. Thus, the electrons have a large or wide path along which to travel, thereby providing an even lower resistance. These large conductor pads 44 that are applied on two adjacent surfaces could be used in any of the embodiments disclosed herein.

In FIG. 47, yet another embodiment is depicted, in schematic cross-sectional side view, of an SOFC Stick™ device 10 that takes advantage of heat exchange principles. After the heated air and fuel pass through the active zone 33b of the hot zone 32 (i.e., the portion of the hot zone 32 where the anode 24 is in opposing relation to the cathode 26 with an electrolyte therebetween), the fuel passage 14 and air passage 20 are joined into a single exhaust passage 21. Any un-reacted fuel will burn when combined with the heated air, thus producing additional heat. The exhaust passage 21 travels back toward the cold zone 30 adjacent the active zone 33b, with the direction of flow of the exhaust (spent fuel and air) being opposite that of the incoming fuel and air in the adjacent fuel and air passages 14, 20. The additional heat generated in the exhaust passage 21 is transferred to the adjacent passages 14, 20 to heat the incoming fuel and air.

FIGS. 48A-48C depict an "end-rolled SOFC Stick™ device" 400 having a thick portion 402 having a greater thickness than a thin portion 404, as depicted in FIG. 48A. The fuel and air inlets 12, 18 are positioned adjacent first end 11a, which is at the end of thick portion 402, and while not shown, the air and fuel outlets 16, 22 may be provided at the sides of the device 400 adjacent opposing second end 11b, which is at the end of the thin portion 404. The thick portion 402 should be thick enough to provide mechanical strength. This may be achieved by providing thick ceramic 29 around the adjacent fuel and air inlets 12, 18. The thin portion 404 will include the active zone 33b (not shown) that includes an anode (not shown) in opposing relation to a cathode (not shown) with an electrolyte (not shown) therebetween (as in prior embodiments). The thin portion 404 should be thin enough to permit it to be rolled while in the green (unfired) state, as shown in FIG. 48B. After the thin portion 404 is rolled to a desired tightness, the device 400 is fired. The rolled thin portion 404 can then be heated to cause the reaction, while the thick portion 402 is a cold end, as discussed in other embodiments. The end-rolled SOFC Stick™ device 400 is a large surface area device that can fit in a small space by virtue of rolling the thin portion 404. Moreover, the thin cross-section of the active zone 33b in the thin portion 404 reduces the heat transfer out along the ceramic and allows good temperature cycle performance.

In embodiments in which the anode 24 and cathode 26 are exposed at the edges (sides) of the SOFC Stick™ device 10 in the active (reaction) zone 32 and/or 33b, the ceramic 29 at the top or bottom of the device 10 may be recessed in the area of the active zone 32 and/or 33b. This allows access to both the cathode 26 and anode 24 from the top and/or bottom for making the electrical connections. Contact pads 44 (e.g., metallization stripes) may then be applied along the top surface and/or the bottom surface of the SOFC Stick™ device 10 from the active zone 32 and/or 33b to the cold zone(s) to provide connections to outside of the hot zone chamber/furnace. By way of example, the anode may be exposed on the top of the SOFC Stick™ device 10 in the form of a recessed ceramic cover, and the cathode may be exposed on the bottom of the stick in the form of a recessed ceramic cover, which will allow for larger metallization stripes on the stick and thereby lower resistance losses in the stripe.

In another embodiment in which the SOFC Stick™ device 10 includes two cold zones 30 at the opposing ends 11a, 11b and the hot zone 32 in the middle, contact pad(s) 44 (e.g., metallization stripes) for the anode(s) 24 and/or the cathode(s) 26 can go from the hot zone 32 out toward both ends 11a, 11b of the SOFC Stick™ device 10, for example, as shown in FIG. 36B. Two separate electrical connections can then be made to each of the anode(s) 24 and cathode(s) 26. By way of example and not limitation, one set of connections can be used to monitor voltage output from the cell, while the other set of connections can connect the load and allow the current flow. The ability to measure voltage separately, at the cell itself, has the advantage of giving a better idea of the total power output from the cell.

For the contact pads 44 (e.g., metallization stripes), any suitable conducting material known to those of ordinary skill in the art may be used. Examples include silver, LSM and NiO. Combinations of materials may also be used. In one embodiment, non-precious metal materials may be used along the surface of the SOFC Stick™ device 10 in the hot zone 32. LSM, for example, may be used where the atmosphere of the hot zone chamber/furnace is oxidizing. NiO, for example, may be used where the atmosphere of the hot zone chamber/furnace is reducing. In either case, however, the non-precious metal materials lose conductivity if the material extends outside the hot zone chamber/furnace such that the metallization material must be transitioned to a precious metal or corrosion resistant material just before the SOFC Stick™ device 10 exits the hot zone chamber/furnace. Silver paste is a convenient precious metal material. By way of further explanation, certain materials such as LSM will become non-conducting as the temperature drops from the reaction temperature to room temperature, and other materials such as nickel will become non-conducting when exposed to air at the cold end of the stick. Thus, the metallization material for the contact pads in the cold end regions of the SOFC Stick™ device 10 must be conductive in air (i.e., no protective atmosphere) and at low temperature. Precious metals such as silver work across the temperature/atmosphere transition area, such that the metallization material can be transitioned to the precious metal before the SOFC Stick™ device 10 exits the hot zone chamber/furnace. The use of a combination of materials allows for material selection based on the particular needs of conductance in a hot zone versus a cold zone, and allows for reducing cost by reducing the amount of expensive precious metals used.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A solid oxide fuel cell device comprising:
   an elongate substrate having a length between first and second ends that is at least five times greater than the width, opposing first and second sides along the length, a first non-active end region adjacent the first end, a second non-active end region adjacent the second end, and an active zone between the first and second non-active end regions;
   a first multi-layer anode-cathode structure comprising a plurality of anodes in opposing relation with a plurality of cathodes within the elongate substrate in the active zone and an electrolyte disposed between each of the opposing anodes and cathodes for undergoing a fuel cell reaction when supplied with heat, fuel and oxidizer, wherein the first and second non-active end regions lack the anodes and cathodes in opposing relation and extend length-wise away from the active zone without being heated to dissipate heat and to thereby remain at a lower temperature than the active zone when the active zone is supplied with heat;
   at least one tab portion extending from each one of the plurality of anodes and cathodes within the active zone of the elongate substrate to one of the opposing first and second sides to form electrical pathways to a respective plurality of exposed anode and cathode surfaces in the active zone;
   at least one first exterior metallization on one of the opposing first and second sides in contact with at least one exposed anode in the active zone and extending length-wise to one of the first and second non-active end regions for electrical connection at the lower temperature;
   at least one second exterior metallization on one of the opposing first and second sides in contact with at least one exposed cathode in the active zone and extending length-wise to one of the first and second non-active end regions for electrical connection at the lower temperature; and
   one or more third exterior metallizations on one or both of the opposing first and second sides, applied over at least one pair of adjacent exposed anode and cathode surfaces to electrically connect respective anodes and cathodes in series in the active zone.

2. The fuel cell device of claim 1 wherein one or more tab portions of the anodes extend to the first side and one or more tab portions of the cathodes extend to the second side, and wherein the first metallization extends on the first side from the active zone to the first non-active end region and the second metallization extends on the second side from the active zone to the second non-active end region.

3. The fuel cell device of claim 2 further comprising a first electrical connection to the first exterior metallization in the first non-active end region and a second electrical connection to the second exterior metallization in the second non-active end region.

4. The fuel cell device of claim 1 wherein each anode is associated with a fuel passage extending from a fuel inlet in the first non-active end region to a fuel outlet in the second non-active end region, and each cathode is associated with an oxidizer passage extending from an oxidizer inlet in the second non-active end region to an oxidizer outlet in the first non-active end region.

5. The fuel cell device of claim 4 further comprising:
   a fuel supply coupled to the fuel inlet for supplying a fuel flow into the fuel passages; and
   an air supply coupled to the oxidizer inlet for supplying an air flow into the oxidizer passages.

6. The fuel cell device of claim 5 wherein the fuel supply and the air supply are each coupled by a flexible rubber or plastic tube secured over the respective fuel and oxidizer inlets.

7. The fuel cell device of claim 1 wherein the one or more third exterior metallizations include metallizations applied over each pair of adjacent opposed exposed anode and cathode surfaces to connect all of the anodes and cathodes of the first multi-layer anode-cathode structure in series.

8. The fuel cell device of claim 1 further comprising one or more repeating multi-layer anode-cathode structures stacked adjacent the first multi-layer anode-cathode structure and configured identically thereto with the plurality of anodes in opposing relation with the plurality of cathodes within the elongate substrate in the active zone, the electrolyte disposed between each of the opposing anodes and cathodes, and each of the plurality of anodes and cathodes having the at least one tab portion extending therefrom within the elongate substrate to one of the opposing first and second sides to form the electrical pathways to the respective plurality of exposed anode and cathode surfaces, and
   wherein the plurality of third exterior metallizations includes metallizations applied over respective pairs of opposed exposed anode and cathode surfaces in the first and one or more repeating multi-layer anode-cathode structures to electrically connect the anodes and cathodes in series within each first and repeating multi-layer anode-cathode structure and in parallel between the first and repeating multi-layer anode-cathode structures.

9. The fuel cell device of claim 1, further comprising one or more fourth exterior metallizations on one or both of the opposing first and second sides, applied over exposed anodes to connect the anodes in parallel, and applied over exposed cathodes to connect the cathodes in parallel.

10. The fuel cell device of claim 1 further comprising:
    a heat source positioned adjacent the active zone to heat the active zone to the operating reaction temperature; and
    an insulating region between the heat source and the first and second non-active end regions adapted to maintain the first and second non-active end regions at the lower temperature below the operating reaction temperature.

11. A solid oxide fuel cell system comprising:
a hot zone chamber;
a plurality of the solid oxide fuel cell devices of claim 1, each positioned with the active zone in the hot zone chamber and the first and second non-active end regions extending outside the hot zone chamber;
a heat source coupled to the hot zone chamber and adapted to heat the active zones to the operating reaction temperature within the hot zone chamber;
a first voltage connection to the first exterior metallizations in the first or second non-active end region in electrical contact with the electrical pathways of the anodes; and
a second voltage connection to the second exterior metallizations in the first or second non-active end region in electrical contact with the electrical pathways of the cathodes.

12. The fuel cell system of claim 11 further comprising an insulating region between the heat source and each of the first and second non-active end regions adapted to maintain the temperature below the operating reaction temperature.

13. The fuel cell system of claim 11 wherein each anode is associated with a fuel passage extending from a fuel inlet in the first non-active end region to a fuel outlet in the second non-active end region, and each cathode is associated with an oxidizer passage extending from an oxidizer inlet in the second non-active end region to an oxidizer outlet in the first non-active end region.

14. The fuel cell system of claim 13 further comprising:
a fuel supply coupled to the fuel inlet for supplying a fuel flow into the fuel passages; and
an air supply coupled to the oxidizer inlet for supplying an air flow into the oxidizer passages.

15. A method of using the device of claim 1, comprising:
positioning the elongate substrate with the active zone in a hot zone chamber and the first and second non-active end regions extending outside the hot zone chamber;
applying heat in the hot zone chamber to heat the active zone to an operating temperature above 400° C. while maintaining the first and second non-active end regions at a low temperature less than 300° C.;
supplying fuel and air to the heated active zone whereby the fuel and air react and produce electrons that travel along the electrical pathways of the anodes and cathodes to the respective first and second exterior metallizations.

16. A method of using the device of claim 2, comprising:
positioning the elongate substrate with the active zone in a hot zone chamber and the first and second non-active end regions extending outside the hot zone chamber;
connecting a first voltage to the first exterior metallization in the first non-active end region;
connecting a second voltage to the second exterior metallization in the second non-active end region;
applying heat in the hot zone chamber to heat the active zone to an operating temperature above 400° C. while maintaining the first and second non-active end regions at a low temperature less than 300° C.;
supplying fuel and air to the heated active zone whereby the fuel and air react and produce electrons that travel along the electrical pathways of the anodes and cathodes to the respective first and second voltage connections.

17. A method of using the system of claim 11, comprising:
applying heat in the hot zone chamber to heat the active zones to an operating temperature above 400° C. while maintaining the first and second non-active end regions at a low temperature less than 300° C.;
supplying fuel and air to the heated active zones to react the fuel and air and produce electrons that travel to the respective first and second exterior metallizations and to the respective first and second voltage connections.

* * * * *